M. B. LLOYD.
WIRE COILING AND WEAVING MACHINE.
APPLICATION FILED DEC. 19, 1908.
933,476.
Patented Sept. 7, 1909.
17 SHEETS—SHEET 1.
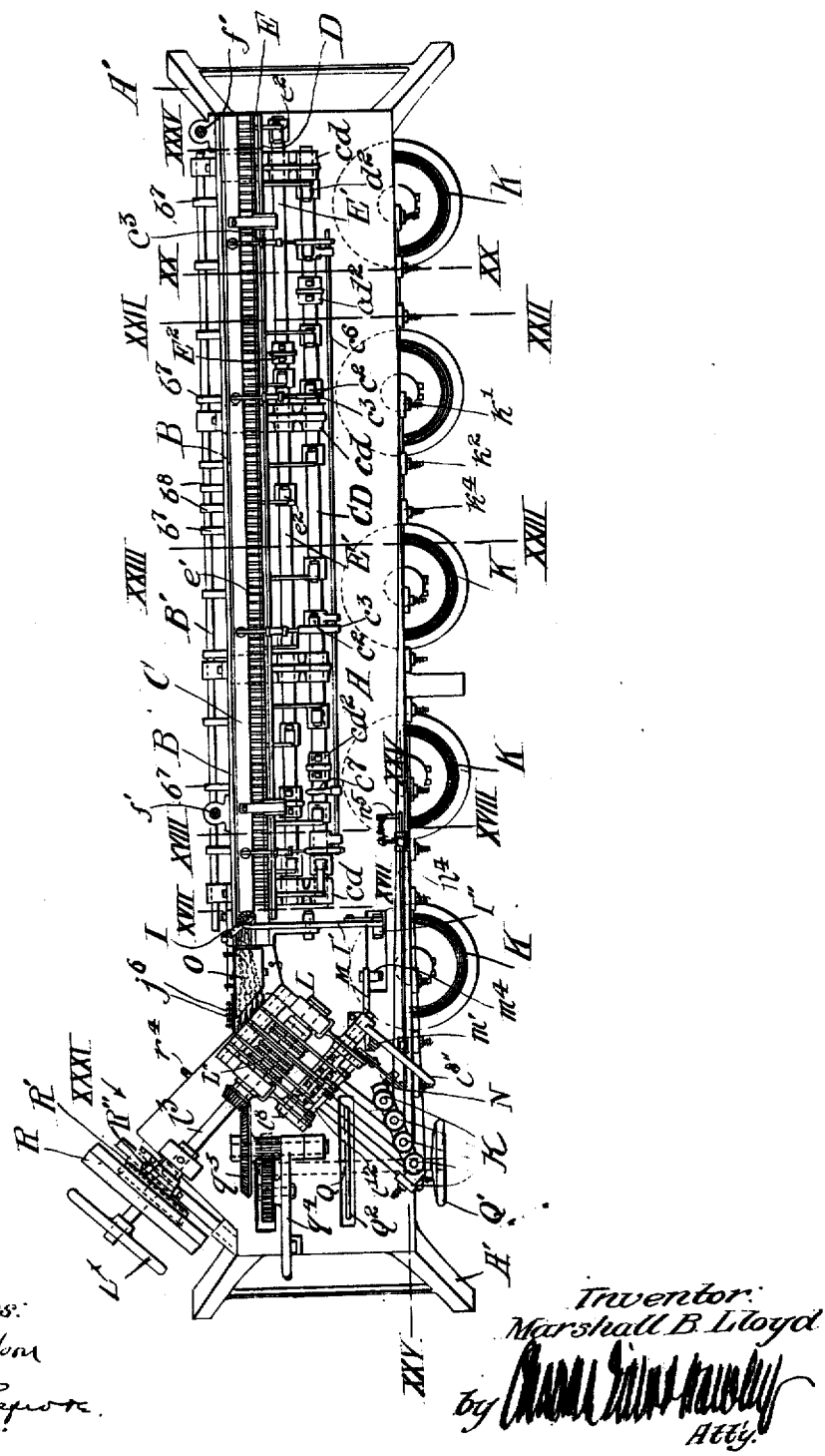
Fig. 1.
Witnesses:
Inventor:
Marshall B. Lloyd
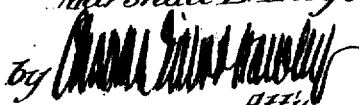
Atty.

M. B. LLOYD.
WIRE COILING AND WEAVING MACHINE.
APPLICATION FILED DEC. 19, 1908.
933,476.
Patented Sept. 7, 1909.
17 SHEETS—SHEET 2.
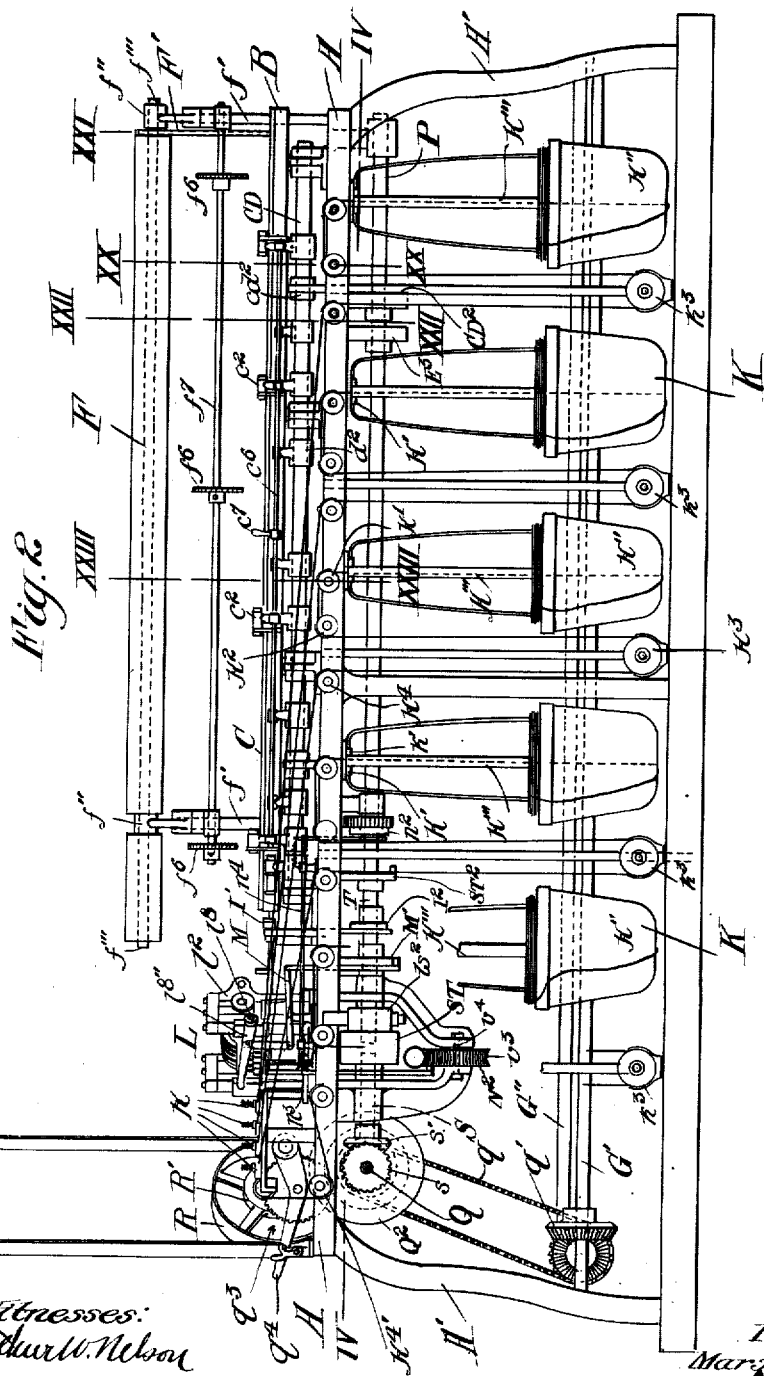
Witnesses:
Arthur W. Nelson
John R. Lepurse.
Inventor:
Marshall B Lloyd
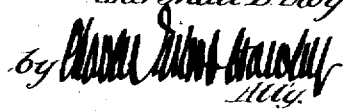
Atty.

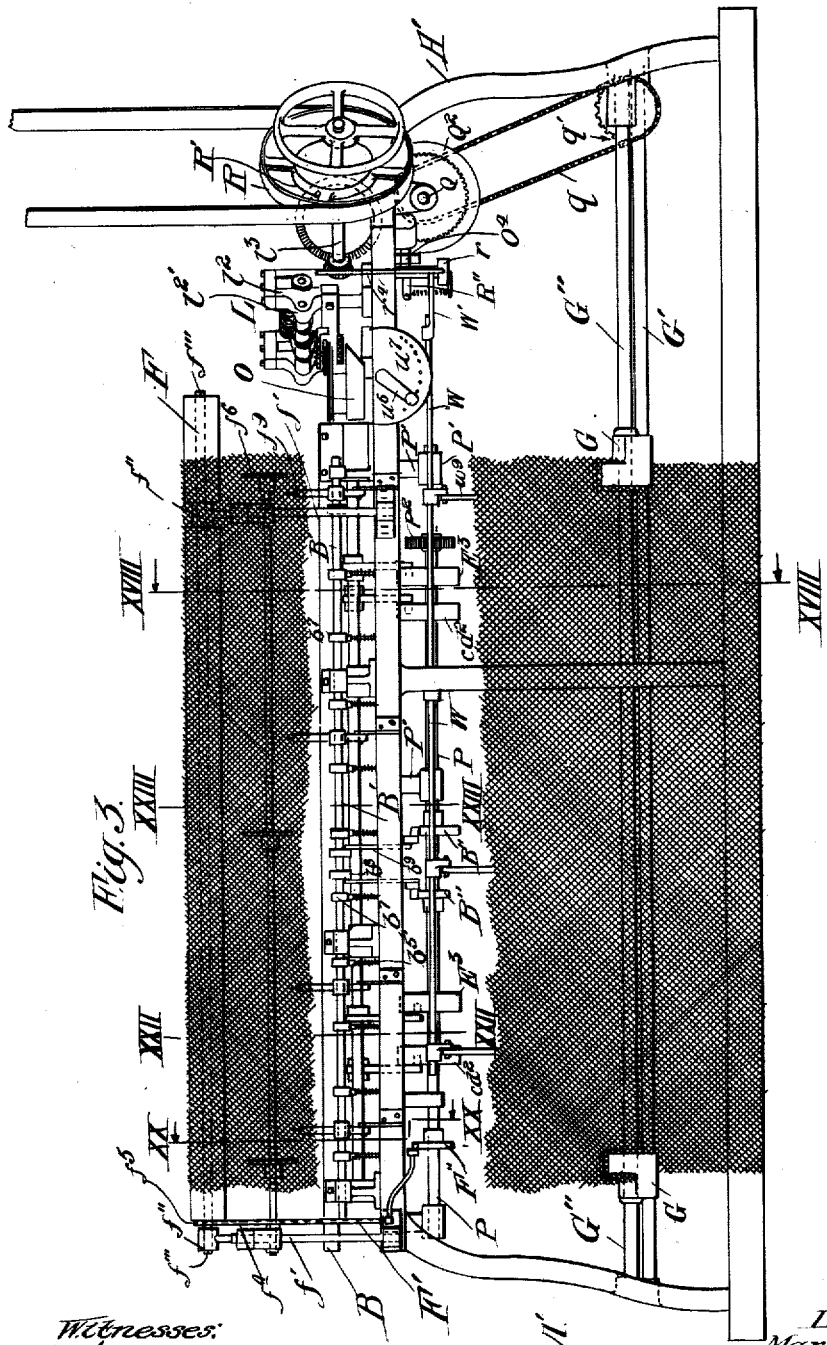

M. B. LLOYD.
WIRE COILING AND WEAVING MACHINE.
APPLICATION FILED DEC. 19, 1908.
933,476.
Patented Sept. 7, 1909.
17 SHEETS—SHEET 4.
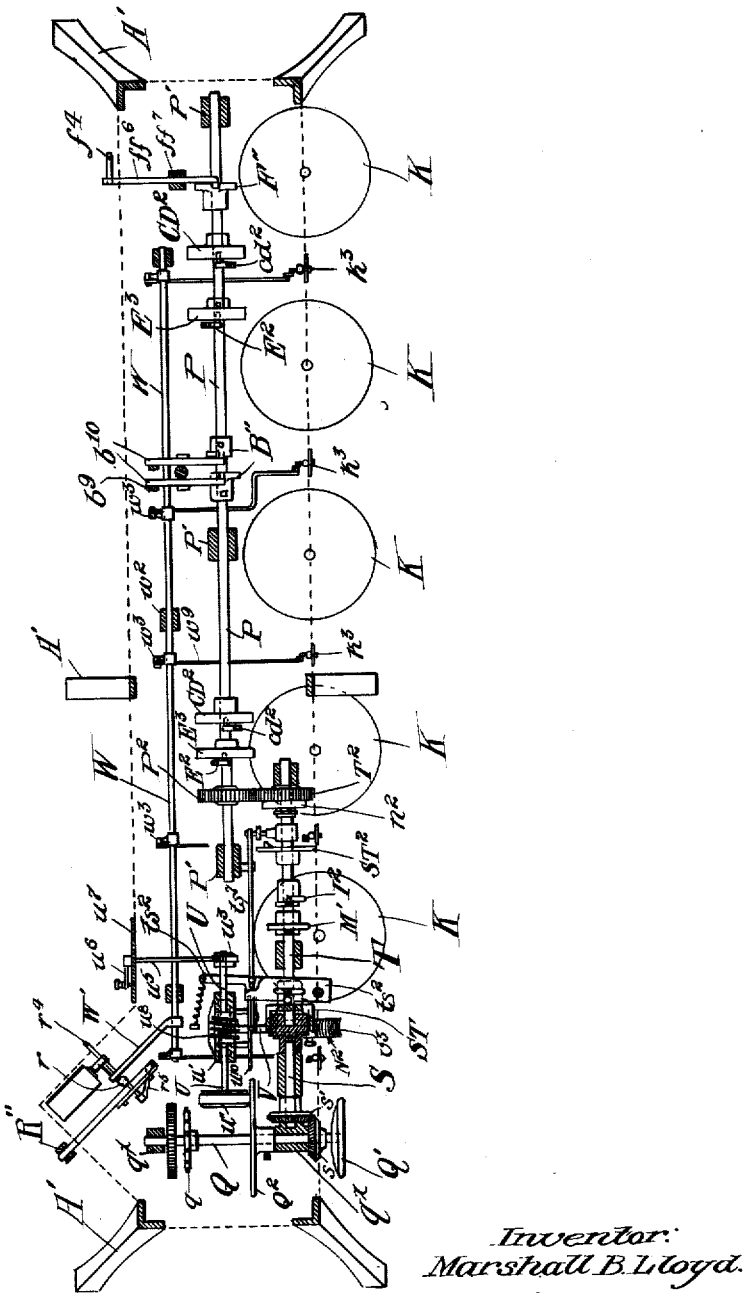
Witnesses:
Arthur W Nelson
John R. Lepore.
Inventor:
Marshall B. Lloyd.
by 
Atty.

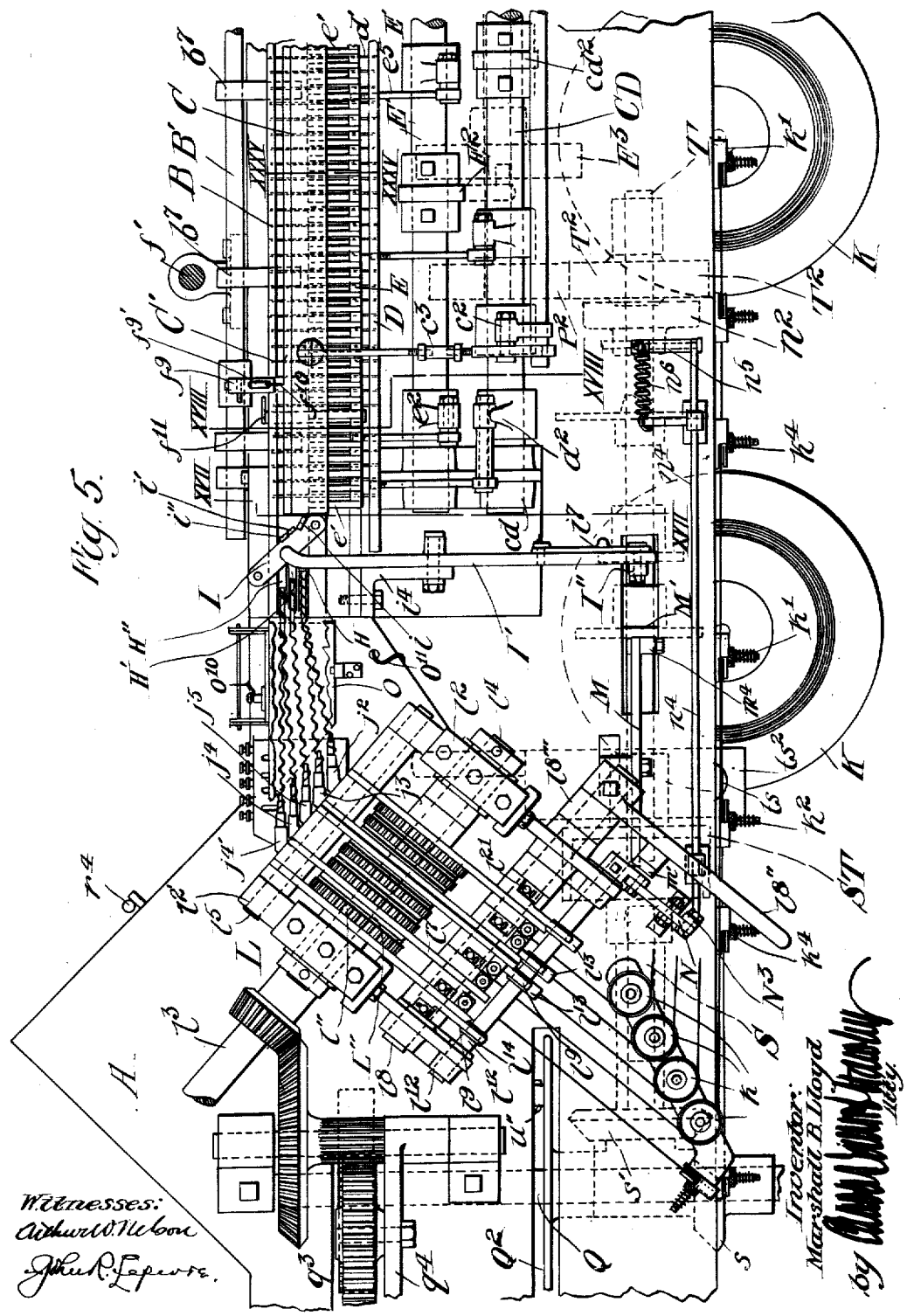

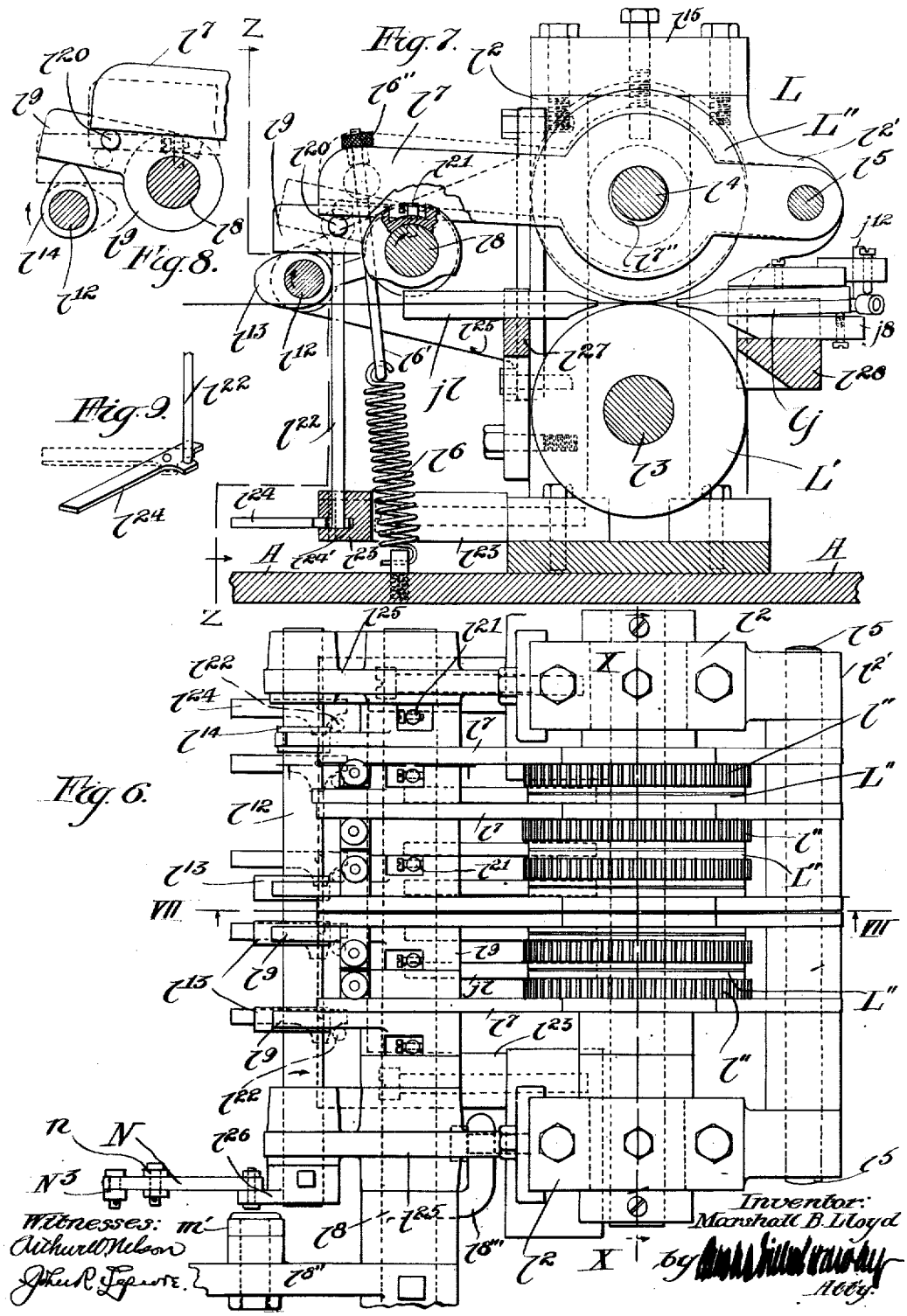

M. B. LLOYD.
WIRE COILING AND WEAVING MACHINE.
APPLICATION FILED DEC. 19, 1908.
933,476.
Patented Sept. 7, 1909.
17 SHEETS—SHEET 7.
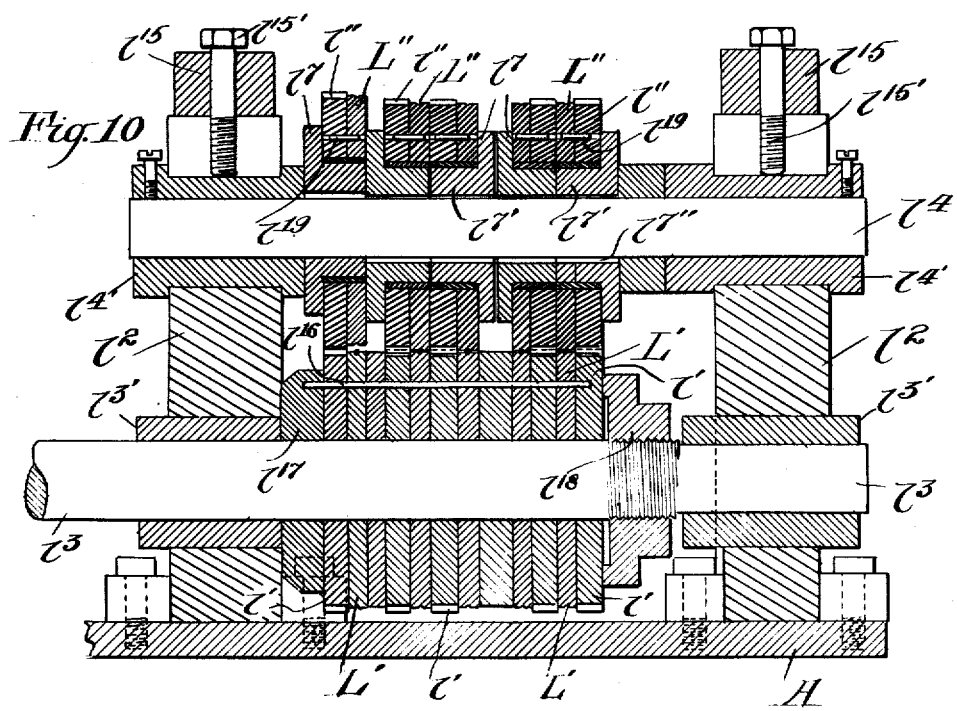
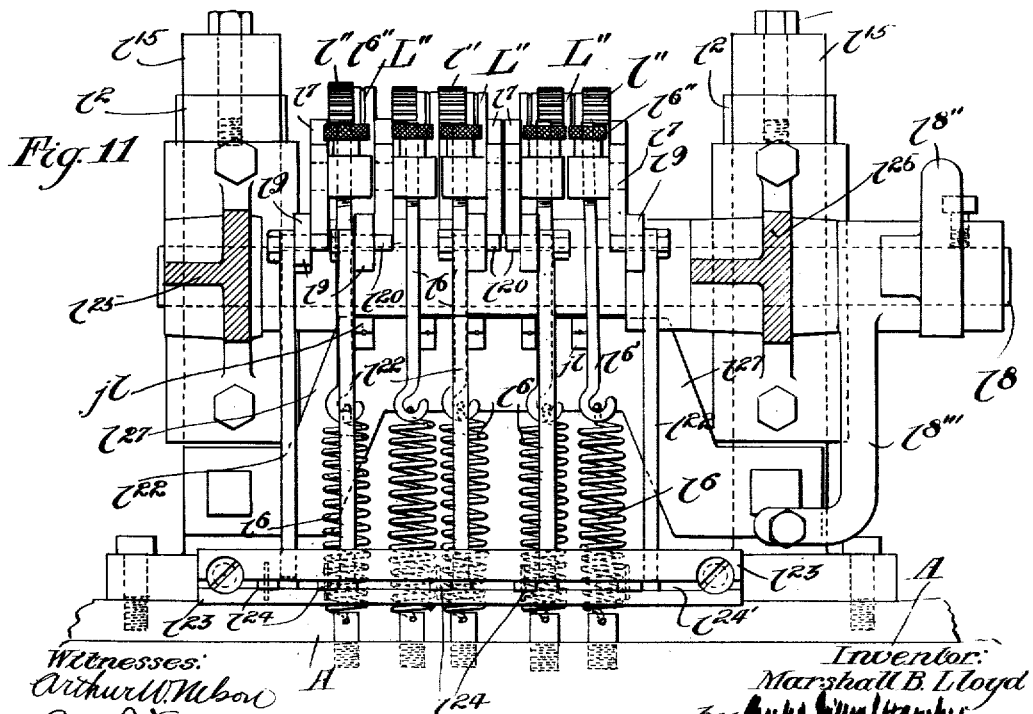

M. B. LLOYD.
WIRE COILING AND WEAVING MACHINE.
APPLICATION FILED DEC. 19, 1908.
933,476.
Patented Sept. 7, 1909.
17 SHEETS—SHEET 8.
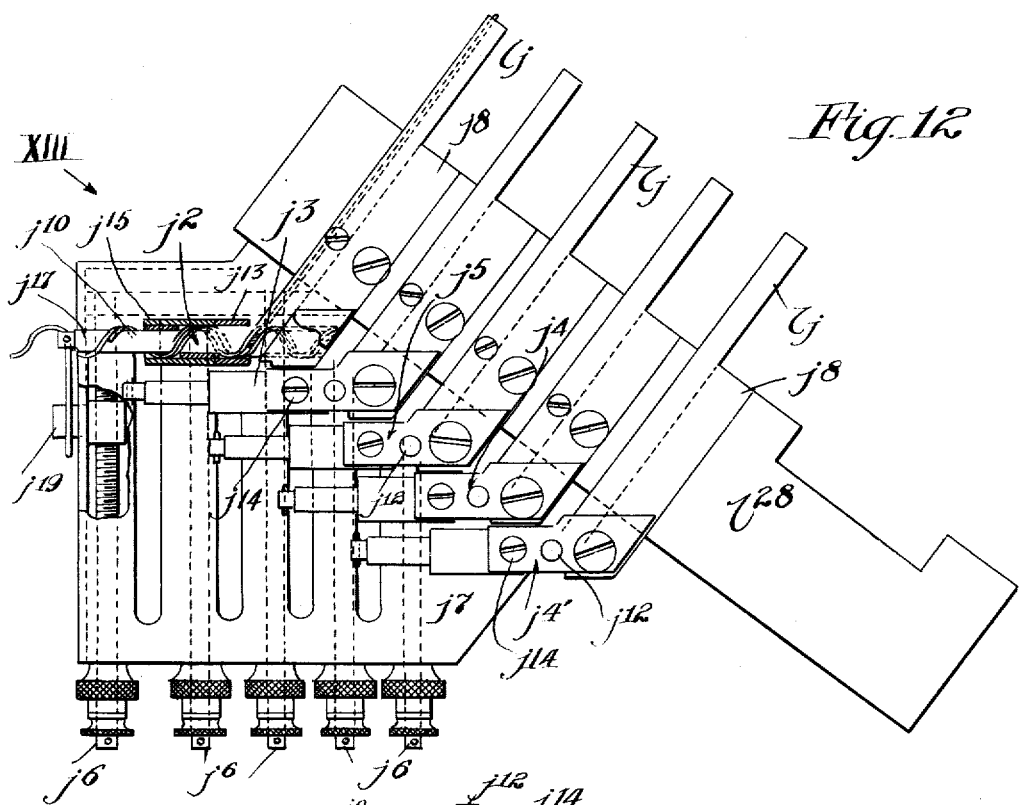
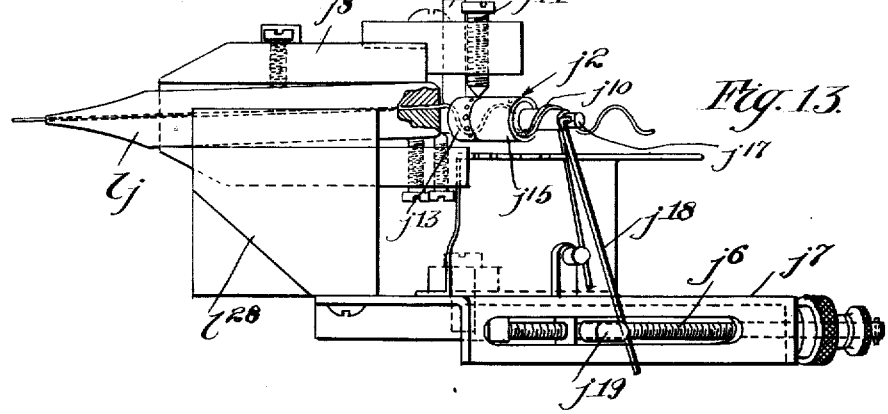
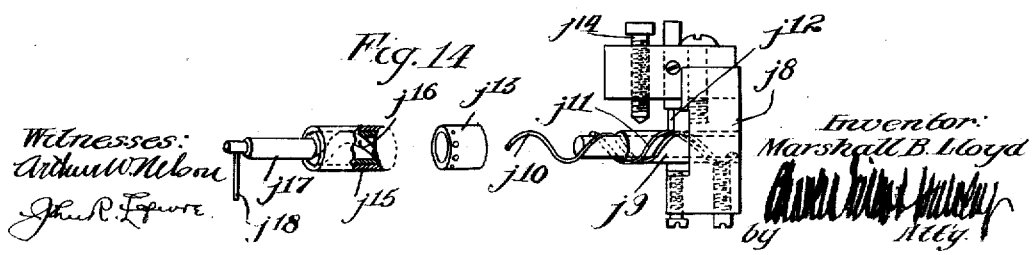
Witnesses:
Inventor:
Marshall B. Lloyd
by Atty.

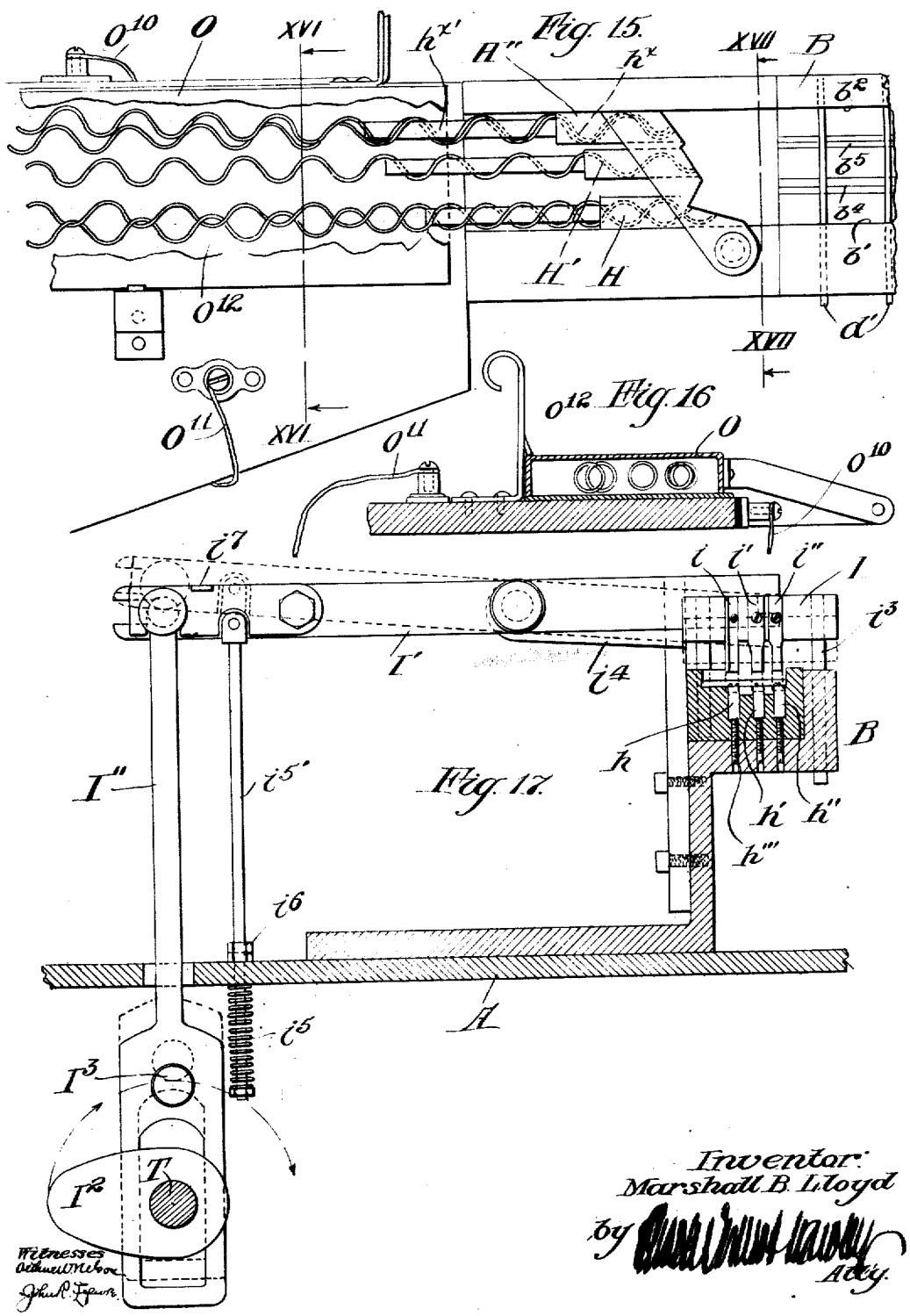

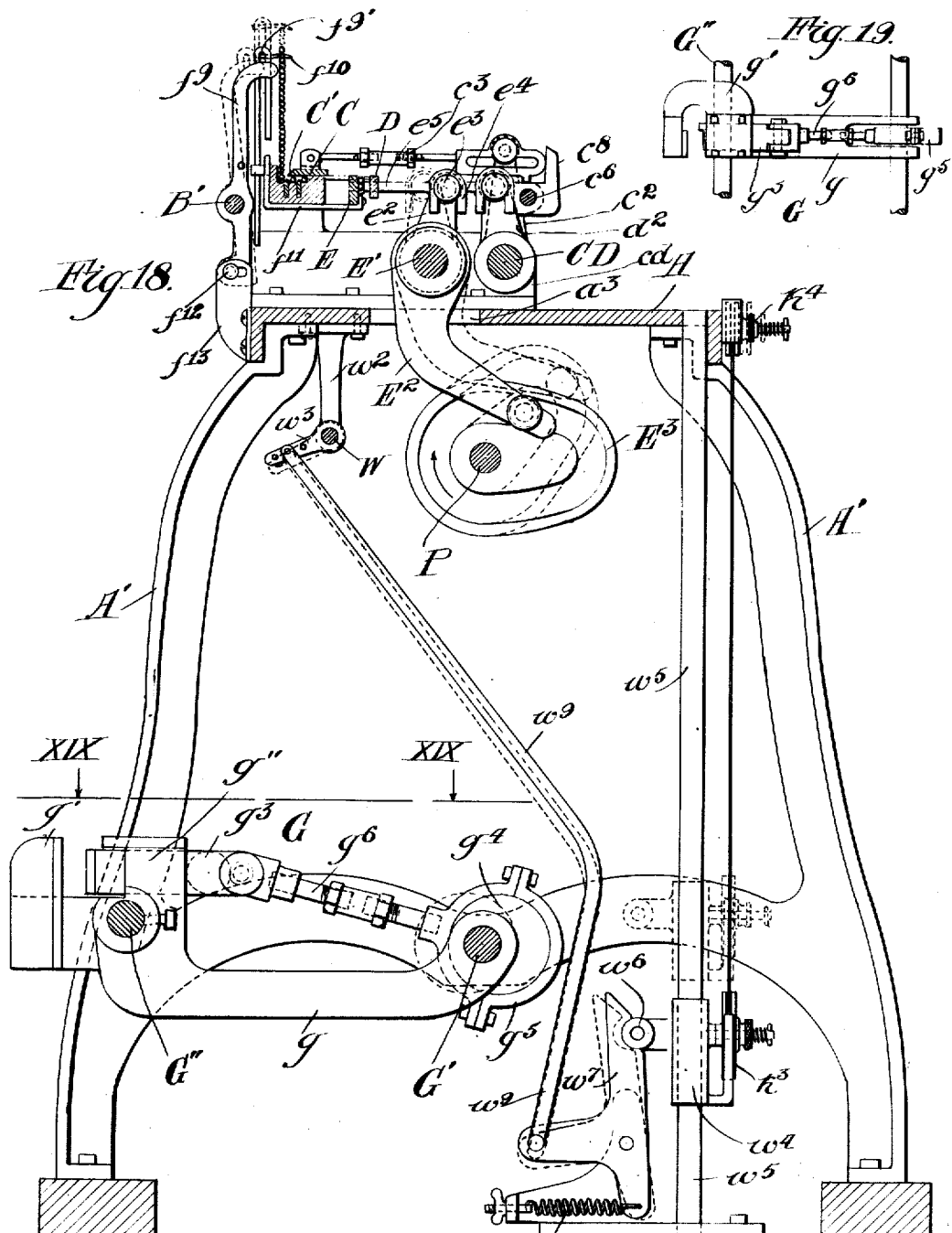

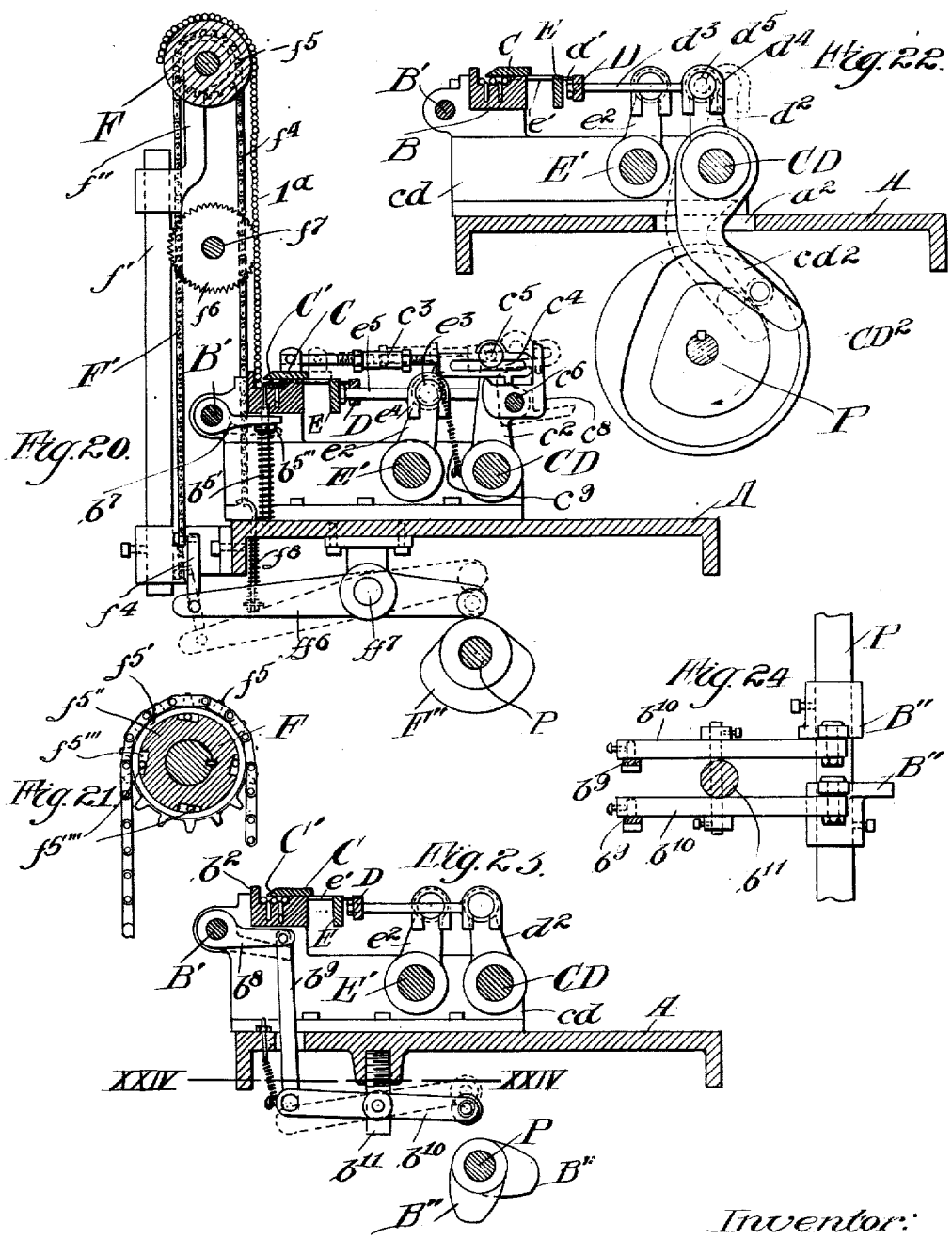

M. B. LLOYD.
WIRE COILING AND WEAVING MACHINE.
APPLICATION FILED DEC. 19, 1908.
933,476.
Patented Sept. 7, 1909.
17 SHEETS—SHEET 12.
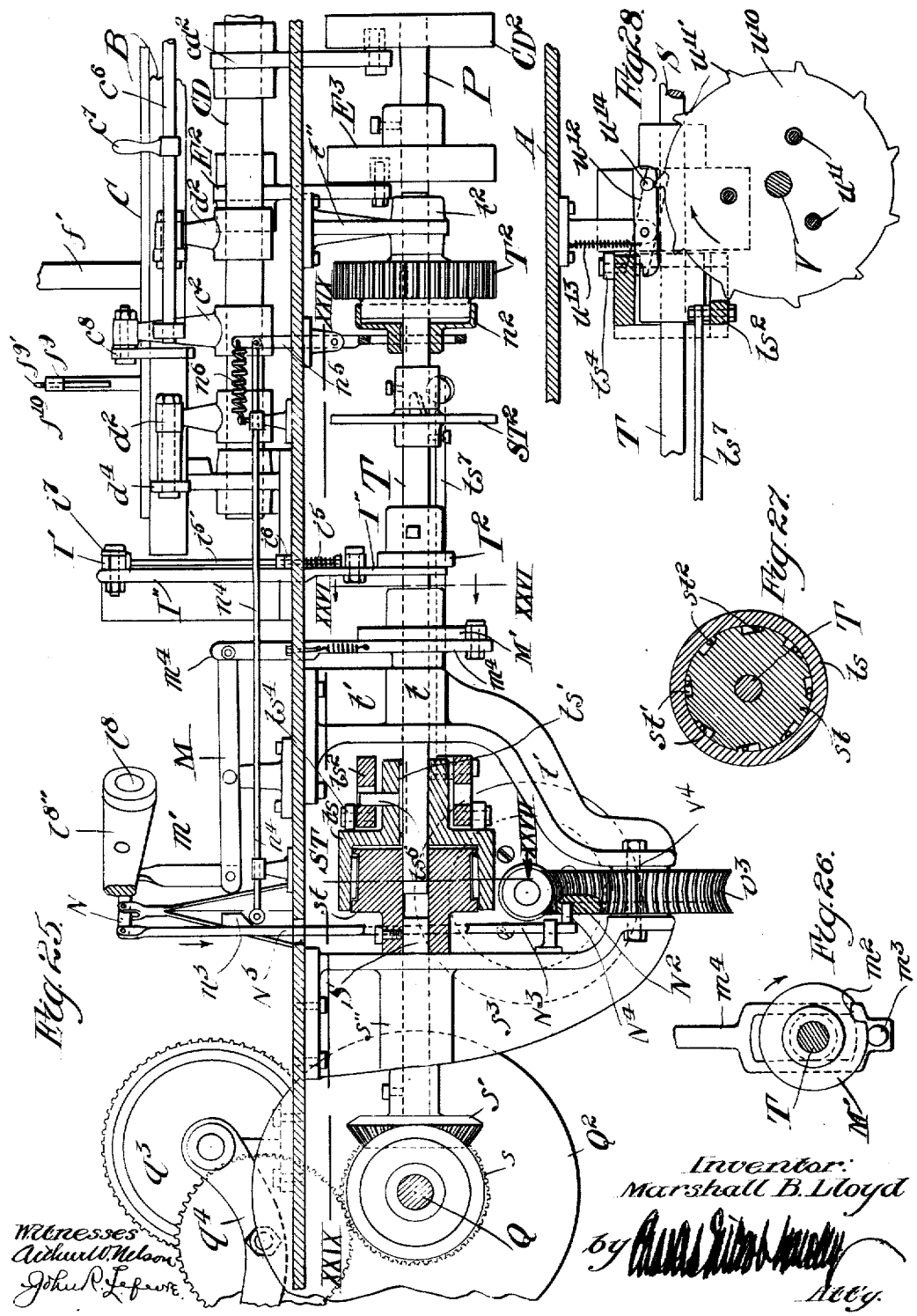

M. B. LLOYD.
WIRE COILING AND WEAVING MACHINE.
APPLICATION FILED DEC. 19, 1908.
933,476.
Patented Sept. 7, 1909.
17 SHEETS—SHEET 13.
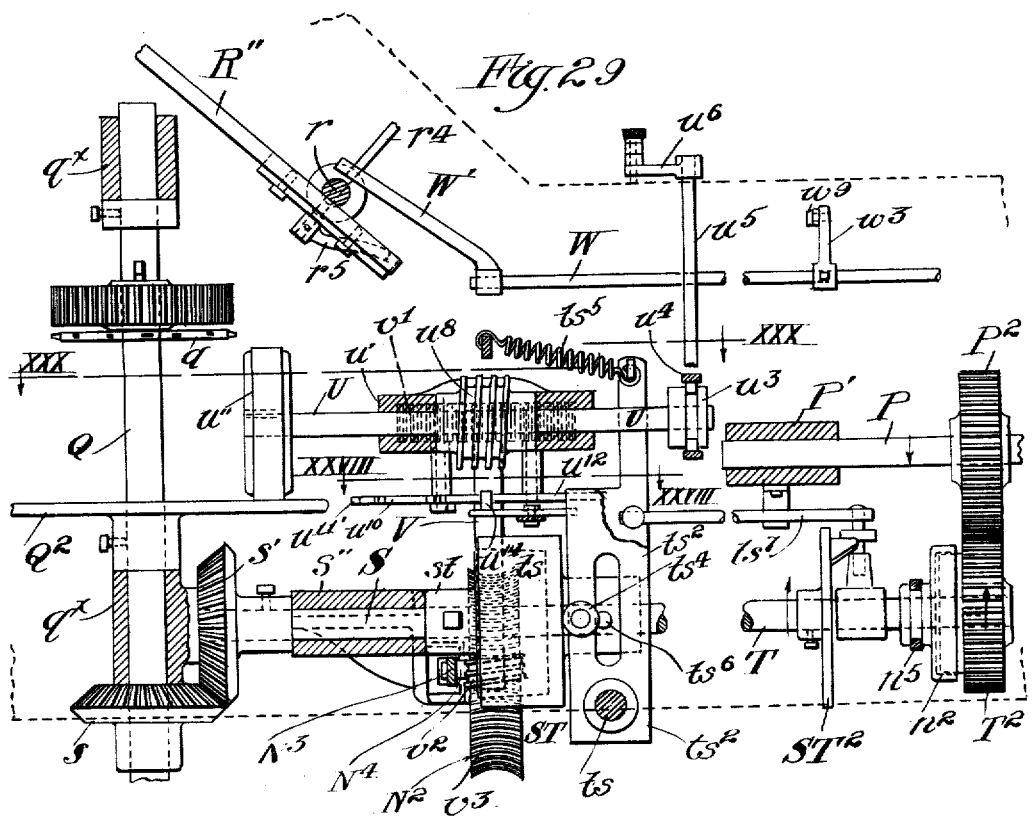
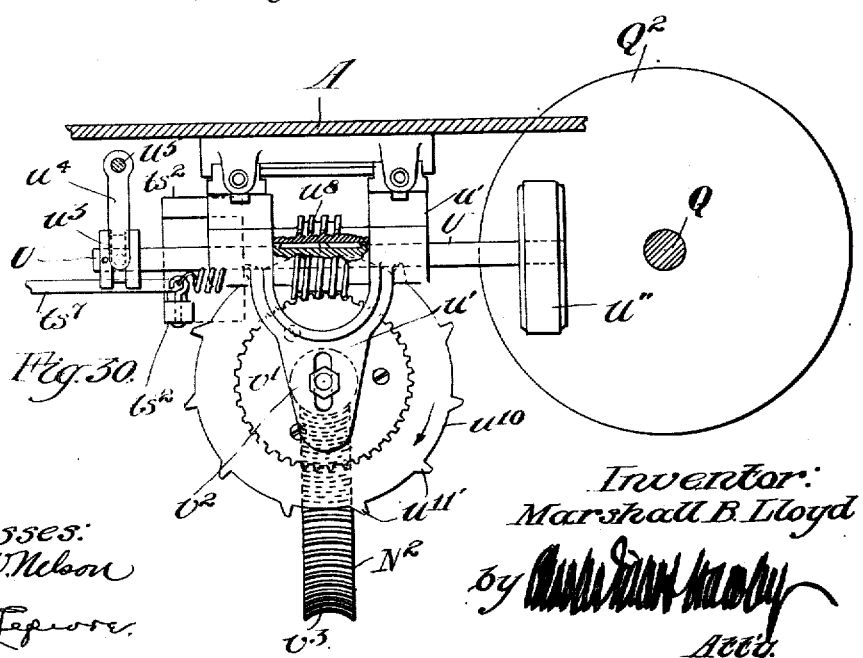
Witnesses:
Arthur W. Nelson
John R. Lepore
Inventor:
Marshall B. Lloyd
by [signature]
Atty.

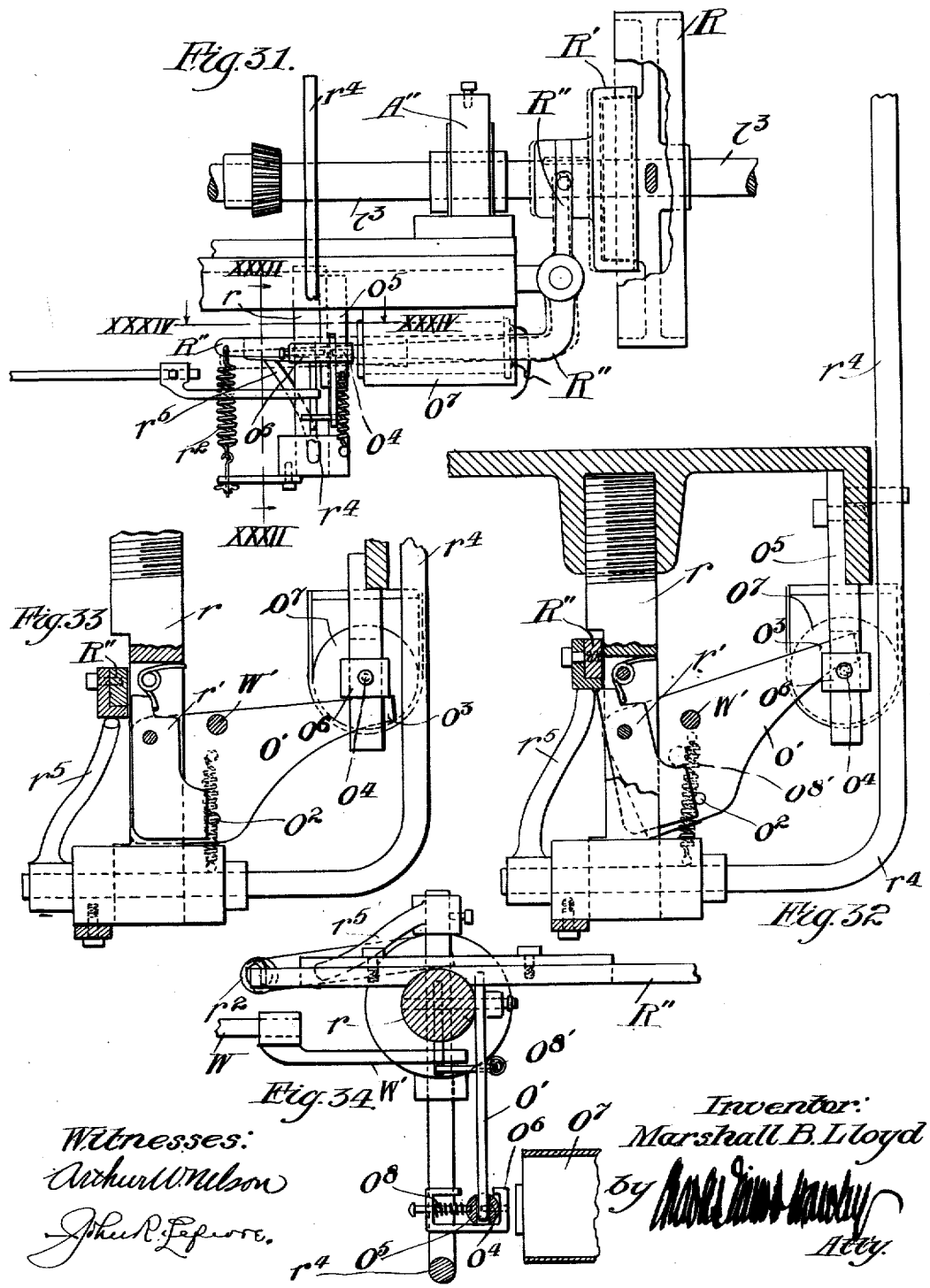

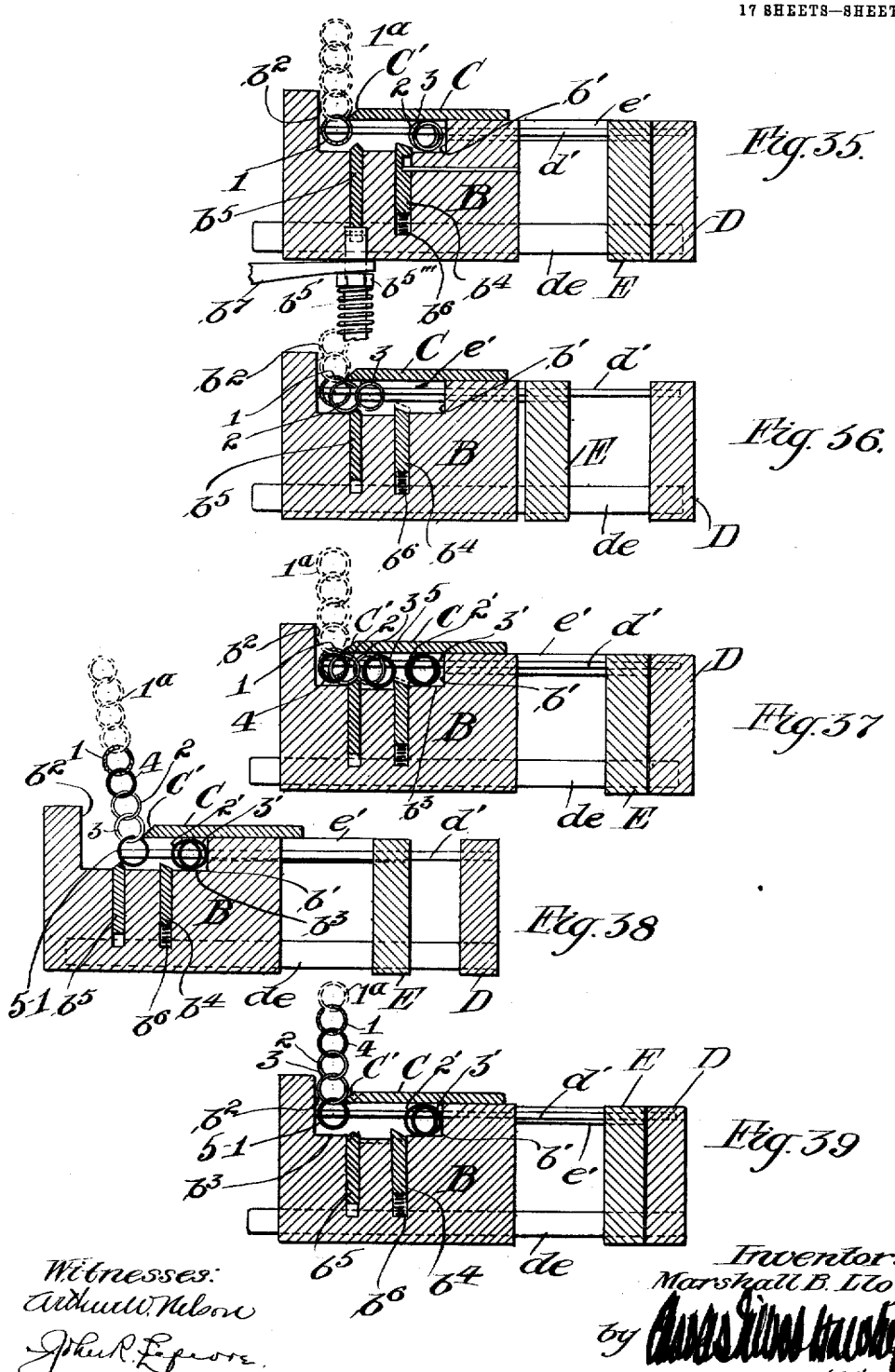

M. B. LLOYD.
WIRE COILING AND WEAVING MACHINE.
APPLICATION FILED DEC. 19, 1908.
933,476.
Patented Sept. 7, 1909.
17 SHEETS—SHEET 16.
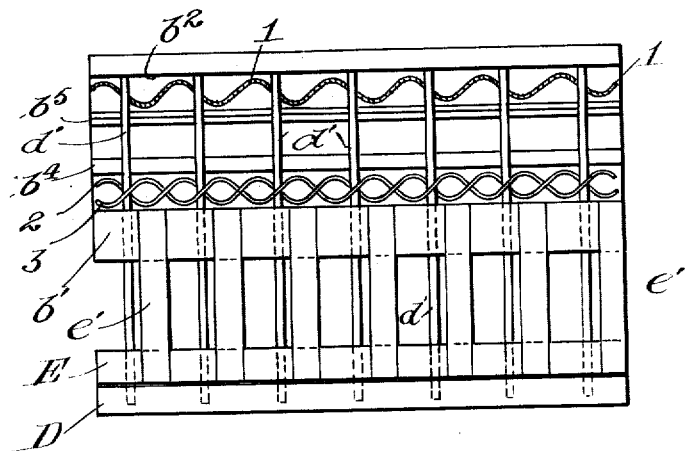
Fig. 40.
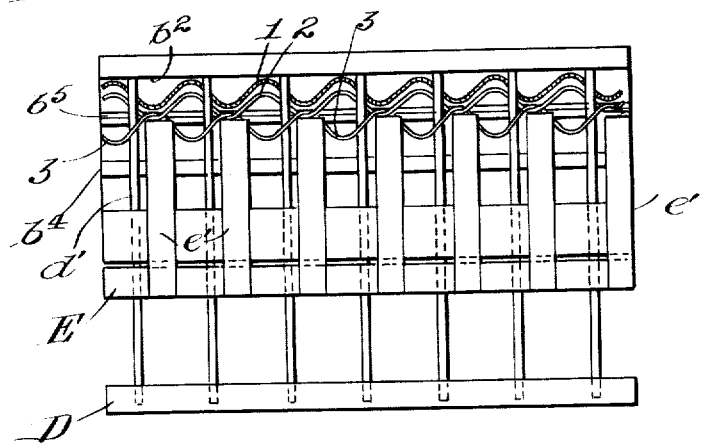
Fig. 41.
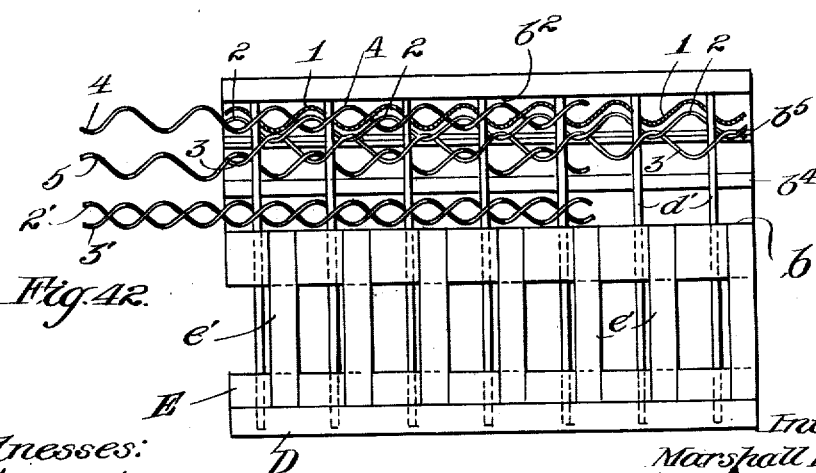
Fig. 42.
Witnesses:
Arthur W. Nelson
John R. Lefevre
Inventor:
Marshall B. Lloyd
by 
Atty.

M. B. LLOYD.
WIRE COILING AND WEAVING MACHINE.
APPLICATION FILED DEC. 19, 1908.
933,476.
Patented Sept. 7, 1909.
17 SHEETS—SHEET 17.
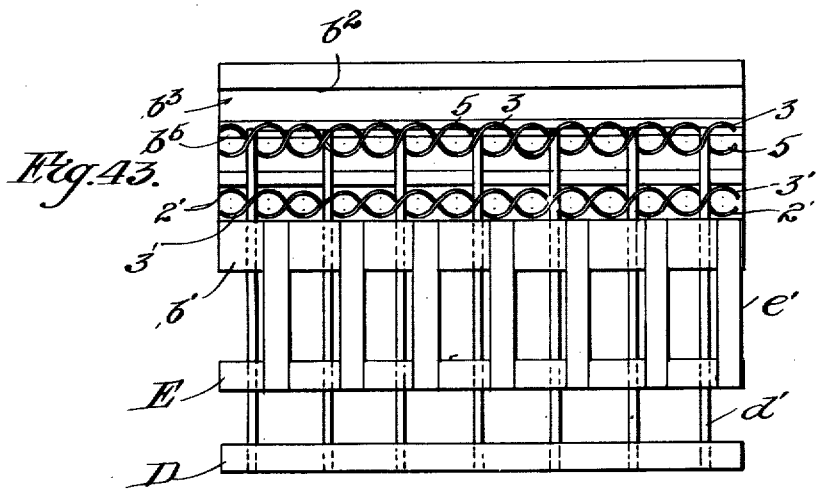
Fig. 43.
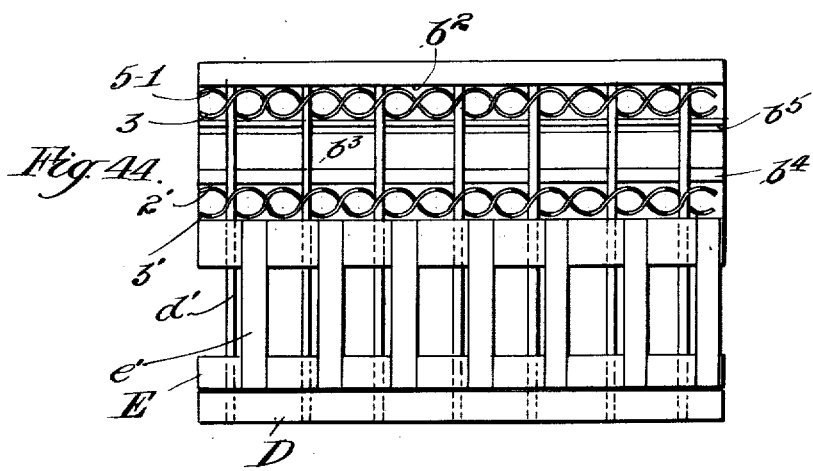
Fig. 44.
Witnesses:
Arthur O. Nelson
John R. ...
Inventor:
Marshall B. Lloyd
by 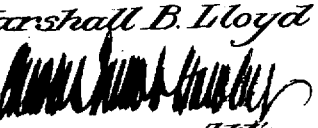
Atty.

UNITED STATES PATENT OFFICE.

MARSHALL B. LLOYD, OF MENOMINEE, MICHIGAN, ASSIGNOR TO THE LLOYD MANUFACTURING CO., OF MENOMINEE, MICHIGAN, A CORPORATION OF MICHIGAN.

WIRE COILING AND WEAVING MACHINE.

933,476.  Specification of Letters Patent.  Patented Sept. 7, 1909.

Application filed December 19, 1908. Serial No. 468,388.

*To all whom it may concern:*

Be it known that I, MARSHALL B. LLOYD, a citizen of the United States, and a resident of Menominee, Menominee county, Michigan, have invented certain new and useful Improvements in Wire Coiling and Weaving Machines, of which the following is a full, true, clear, and exact description, such as will enable others to make and use the same.

My invention relates to improvements in wire coiling and weaving machines of the kind used in manufacturing so-called coiled wire fabrics, particularly fabrics which are used in making wire mattresses.

The object of my invention is to provide a machine which will automatically convert wire into coiled wire fabric and complete the same, ready for use in the manufacture of spring mattresses and the like.

The special object of my invention is to provide a machine which shall be capable of producing coiled wire fabric more rapidly than do the automatic coiling and weaving machines that are now in general use.

Heretofore, it has been the custom to weave coiled wire fabrics by adding one coil at a time to the edge of the fabric.

My purpose is to weave or add two or more coils to the fabric, at a time, *i. e.* during the time or period ordinarily occupied in adding a single coil thereto; and to thus enable a single operator to produce, with a single machine, several times the quantity of fabric which it has hitherto been possible to make with one weaving mechanism.

This present invention resides in a machine or apparatus which I have devised for carrying out certain improvements in the art of weaving coiled wire fabrics, described and claimed in my co-pending application, Serial No. 459,033 filed October 22, 1908.

Broadly stated the present invention consists in a mechanism for securing a performed coil in parallelism and in substantial contact with the edge coil of a coiled wire fabric, in combination with mechanism for forming still another coil and running or interlocking the same with the juxtapositioned coils; one operation of the mechanism resulting in the addition of two coils to the fabric.

My invention also contemplates and includes mechanism which operates in step or time with the foregoing apparatus and by which coils are made and held in reserve at about the time that the juxtapositioned coils are coupled, to the end that a reserve coil shall be in readiness for the next operation of the apparatus, beginning with the fixing of the new edge coil of the fabric.

My invention also consists in mechanism for patterning or cording the fabric in the course of its formation by the mechanisms above mentioned.

More specifically defined my invention consists in a coiled wire fabric weaving machine comprising means for holding the edge coil of a fabric body; also means for positioning a like coil along-side of, *i. e.* nested with, the edge coil and means for running a coupling coil into these coils to interlock them while they are thus held; also a mechanism for depositing one or more reserve coils in parallelism with and adjacent to the next above mentioned coils at about the time or at the same time that the interlocking or coupling coil is run in; also, means for taking up the completed fabric and securing the new edge coils thereof; and further, mechanism for transferring the reserve coil or coils and positioning the same for a repetition of the coupling or interlocking operation.

My invention further consists in the combination of the structures next above combined, with mechanism for running in one or more extra coils during the time that the edge coil is held by the securing means, to form a cord in the fabric.

My invention may also be briefly defined as a wire coiling weaving machine, which consists in mechanism that is adapted to form and connect successive series of coils or fabric sections to a body fabric, the construction and positioning of the parts being such that the section connecting operation and the section forming operation take place substantially at the same time; each new or reserve section being fed forward in its turn and being connected to the body of the fabric by an in-running coupling coil, while the next reserve section is being formed.

My invention also consists in various mechanical organizations and details of constructions and in the organized mechanism as a whole, all as hereinafter described and particularly pointed out in the claims.

The terms "fabric", "main fabric" and "body fabric" as herein used define the body, quantity or amount of coiled wire fabric already formed at the instant of the beginning of the machine's cycle of steps, in other words the fabric which is ready to receive additional coils. The term "section of fabric", "section", and "fabric section", as herein used are intended to define or embrace either a single coil or several interlocked coils; for, as will be better explained hereinafter, my invention may be carried out in several ways; for example, the mechanism may be such that a single coupling coil and a single reserve coil may be formed at each operation; again while these are being formed a third coil or coils may be woven into or interlocked with the coil which is being coupled to the body of the fabric; or, in another case the reserve section may comprise several interlocked coils instead of a single coil.

In practice it is most convenient to weave in or run either two or four wires at each operation, but by little more than the extension and duplication of parts, I find it possible to provide a machine which will run or weave a greater number of coils at a time. In fact the limit is determined rather by the ability of the operator to care for and to watch the many coils in such a weaving machine, than by complications in the machine itself.

I shall here refer more especially to a mechanism for the making of a "single" fabric; that is, a fabric which is made up of single coils, each interlocked or interwoven with adjacent single coils. My reason for referring to "single" fabrics is that the invention is most easily understood and described in connection with the making of "single" coil fabrics, but those who are skilled in the art will at once understand that double, triple or multiple coil fabrics and also composite fabrics ("one and two" or "two and three" fabrics) may be made by my machine, with immaterial changes therein. Double and triple coil fabrics are made by running either two or three coils as one coil, the groups, of two or three coils each, having exactly the same relation to one another as do the single coils of a "single" fabric. Therefore when a single coil is hereinafter referred to, it should be understood as standing for either a single coil or for two or more coils having a common axis and hence capable of being handled and referred to as a single coil.

My invention will be more readily understood by reference to the accompanying drawings, forming part of this specification and in which;—

Figure 1 is a plan view of an automatic wire coiling and weaving machine embodying my invention; Fig. 2 is a front elevation thereof; Fig. 3 is a rear elevation of the machine; Fig. 4 is a horizontal section on the line IV—IV of Fig. 2 showing certain of the motive parts beneath the top or table of the machine; Fig. 5 is an enlarged plan view of the forward or power end of the machine; Fig. 6 is a further enlarged plan view of the wire propelling head, containing the feed rolls; Fig. 7 is a sectional view on the line VII—VII of Fig. 6; Fig. 8 is a detail showing the action of one of the patterning cams on the cam lever of one pair of rolls; Fig. 9 is a perspective detail of one of the jacks or blocks used for locking the rolls in inoperative position; Fig. 10 is a vertical section on the line X—X of Fig. 6; Fig. 11 is a section substantially on the line Z—Z of Fig. 7; Fig. 12 is an enlarged plan view of the bank of coilers into which the rolls propel the wire; Fig. 13 is a detail elevation of the coilers viewed from the point XIII of Fig. 12; Fig. 14 is a perspective detail showing one of the coilers dismembered; Fig. 15 is an enlarged plan view of the receiving end of the weaving channel and the coiler guides therein; Fig. 16 is a sectional detail on the line XVI—XVI of Fig. 15; Fig. 17 is a large transverse vertical section on the line XVII—XVII of Figs. 1, 5 and 15; Fig. 18 is an enlarged transverse vertical section of the machine on the line XVIII—XVIII of Figs. 1 and 5; Fig. 19 is a plan view of reduced size showing one of the fabric trimming and crushing devices, as seen from points XIX—XIX in Fig. 18; Fig. 20 is a vertical section on the lines XX—XX of Figs. 1, 2 and 3; Fig. 21 is a transverse section of the take up roll shown in Figs. 2 and 20, the section being on the line XXI of Fig. 2; Fig. 22 is a vertical section on the line XXII—XXII of Figs. 1, 2 and 3; Fig. 23 is a vertical section on the line XXIII—XXIII of Figs. 1, 2 and 3; Fig. 24 is a horizontal detail of the cams and cam levers on the line XXIV—XXIV of Fig. 23; Fig. 25 is a vertical elevation of the power end of the machine enlarged, upon the line XXV—XXV of Fig. 1; Fig. 26 is a detail section on the line XXVI—XXVI of Fig. 25; Fig. 27 is a section of the clutch on the line XXVII of Fig. 25; Fig. 28 is a section on the line XXVIII—XXVIII of Fig. 29; Fig. 29 is an enlarged horizontal section on the line XXIX—XXIX of Fig. 25; Fig. 30 is a sectional elevation on the line XXX—XXX of Fig. 29; Fig. 31 is a detail elevation of the stop mechanism as seen from the point XXXI of Fig. 1; Fig. 32 is an enlarged section on the line XXXII—XXXII of Fig. 31; Fig. 33 is a similar view showing the parts in tripped or stopped position; Fig. 34 is a similarly enlarged horizontal section on the line XXXIV—XXXIV of Fig. 31; Fig. 35 is an enlarged sectional view of the weaving channel on the lines XXXV—XXXV of Figs. 1 and 5, showing the positions of the parts of the weaving mechanism and of the coils in the weaving channel at the instant of the completion of one operation and the beginning of another; Figs. 36, 37, 38 and 39 are similar views depicting other, successive, stages or steps of the weaving operation; Fig. 40 is a diagrammatic plan view taken from Fig. 35; Fig. 41 is a similar view taken from Fig. 36; Fig. 42 is taken from Fig. 37; Fig. 43 is a like plan view taken from Fig. 38; Fig. 44 is a plan view of Fig. 39.

This machine operates in conformity with my novel method or process before alluded to, and is adapted to add four coils to the fabric at each operation and is also adapted to run in or form cords in the fabric at predetermined times. By slight modification the machine here depicted may be adapted to add but two coils at a time to the fabric; and likewise, by modification, it may be adapted to increase the fabric three or five or more coils at each operation. And as before stated it is adapted to handle and make alternated, composite fabric forms and those which comprise multiple coils.

The details of the fully organized wire coiling and weaving mechanism herein depicted will be best understood from the description of its constituent mechanisms. To facilitate the description of the machine in this manner, the complete machine may be considered as comprising a plurality of co-acting mechanisms conveniently designated as follows: the wire holding and supplying mechanism; the wire feeding or propelling mechanism; the coilers of coiling mechanism; the coil guides; the cut-off knives; the weaving channel or coil receiver and co-acting parts; the fabric take-up mechanism; the fabric-edge finishing mechanism; the driving mechanism; and the various coupling and connecting parts by which the constituent mechanisms are correlated; the coil length varying mechanism; the timing mechanism; the patterning mechanism; the automatic stop mechanism. I shall hereinafter describe these constituent mechanisms and parts under the foregoing heads; but to immediately afford a thorough understanding of the general plan and operation of the machine, I will first briefly describe the principal elements thereof and outline the manner in which they operate to produce the coiled wire fabric.

In the drawings, A, represents the table or bed of the machine supported by legs or frames, A'. On the table is a long channel or coil receiver, B, in which the weaving operation takes place. $b'$, $b^2$ and $b^3$, are respectively the front and back walls and bottom of the channel. $b^4$ and $b^5$ are spacing or escapement bars in the bottom of the channel, the former being supported by springs, $b^6$ and the latter being arranged for operation by arms, $b^7$. The arms, $b^7$, take motion from the rocking shaft, B', on the back of the machine, as hereinafter described.

C is an escapement member which partially closes the channel, B; it is provided with a V or knife edge, C', and is hereinafter referred to as the channel closure or knife edge. The member, C, takes motion from the rocking shaft, CD, on the table, A, and is periodically moved back and forth across the channel, to hold or release the fabric as hereinafter described.

D is an escapement member having a large number of pins, $d'$, which pass through the side, $b'$, of the channel and extend across the channel. These pins, $d'$, also serve to secure and space the turns of the coils in the channel, i. e., the pins serve to fix the pitch relations of the several coils that are in the channel at one time, as hereinafter described. The member, D, with its pins also takes motion from the shaft, CD, and is shifted periodically to move the pins transversely in the channel as required to alternately secure and liberate the coils therein.

The arrangement is such that the closure, C, moves at a more rapid rate and through a greater distance than the pins, the added movement of the closure being desirable to insure the free forward movement of each new section of fabric at the time that the slack in the fabric or web is taken up. The transfer member, E, bears a number of short bars or fingers, $e'$. These are parallel with the pins, $d'$, and extend through or across the wall, $b'$, of the channel; they are adapted to be projected across the channel to shift successive pre-formed or reserve coils therein, as herinafter described. Guide pins, $d$ $e$, serve to support the members, D and E. The member, E, takes motion from the rocking shaft, E', on the table.

F represents the fabric take-up roll. This is preferably arranged above the table, in substantially the plane of the rear wall $b^2$, of the channel and is supported by standards, $f'$. The roll is actuated by mechanism, F' preferably at the rear end thereof and is forcibly rotated each time that the channel is opened by the retraction of the closure, C, and the pins, $d'$. As shown the fabric passes over the top of the roll and falls down at the back of the machine. The web or finished fabric is there received by the edge crushing and cutting mechanisms, G, G. These devices are longitudinally adjustable to accommodate fabrics of different widths and they are essentially simple reciprocating coil end crushers and cutters, which take motion from the shaft, G', in the lower part of the machine.

Referring again to the weaving channel, B, it will be noted that the receiving end of the channel contains the coil guides, H, H' and H″, which terminate in a knife block or blocks, *h*. These guides serve to definitely space or position the running coils in the channel. Collectively they initially determine the pitch relations and positions of the several running coils. The knife blocks, *i. e.*, the ends of the three guides, through which the coils emerge, are angularly disposed in the channel, in order that the severed coils may leave the latter freely, without interference from the knives and to the end that the four coils may be cut upon a single plane, to-wit, at the top of the knife block.

A knife head, I, is arranged above the guides, and is provided with a plurality of knives, *i*, *i'*, *i''*, which co-act with respective ends (knife blocks *h*, *h'*, *h''*) of the guides, and constitute the coil cutters. The knife head is periodically actuated by a lever, I'.

The coils to be woven together in the channel, B, are formed by a bank of coilers positioned near the receiving end of the channel. In this machine I employ five coilers, $j^2$, $j^3$, $j^5$, $j^4$ and $j^{4'}$. The first four are used in weaving the fabric and the fifth coiler, $j^{4'}$, is used in forming the cords in the fabric. Five wires extend from five reels, K, preferably suspended from the table, to respective coilers, the wires passing over interposed sheaves, *k*.

L is a wire propelling head which is arranged between the coilers and the sheaves, A, containing five pairs of driving rolls which are utilized to drive the wires through the coilers. A pair of these driving rolls, L', L″, is provided for each wire and when closed together thereon forcibly propels the same through the wire straightening and guiding devices *jl* and *lj*, on opposite sides of the rolls (see Figs. 7, 12 and 13); the guides, *lj*, deliver the wires directly into respective coilers (see Fig. 13). The rolls, L', L″, of each pair are connected by gear, *l'*, *l″*, and have the same peripheral speed. They are continuously rotated and are arranged to be either separated or closed together while in rotation. When forced together they propel the wire as stated and they are separated to stop the wire, as illustrated by dotted lines in Fig. 7. A mechanism, hereinafter described, which operates in time with the knives and the moving members of the weaving channel, periodically closes the rolls together and run coils into the channel and then opens or spreads the rolls to stop the wires and give time for the operation of the knives and the channel members. A pattern mechanism associated therewith, at longer periods, as hereinafter described, interrupts the channel operations, throws several of the pairs of rolls out of action and causes the repeated operation of one or more pairs of rolls, to form a cord in the fabric.

The wire propelling mechanism will be best understood by reference to Figs. 1, 2, 3, 5, 6, 7, 10 and 11. On the table, A, are standards, $l^2$, which contain bearings for the two shafts, $l^3$ and $l^4$. The lower shaft, $l^3$, is driven continuously, being the main driving shaft of the machine, as hereinafter described. The upper shaft, $l^4$, is not driven, being simply a guide and stop part for the upper rolls. The rolls, L', are fastened to the shaft, $l^3$, to rotate therewith. Each of the upper rolls is carried by its own lever, $l^7$. The levers are pivoted on the cross rod, $l^5$, and at their free ends are attached to springs, $l^6$. These springs tend to force the rolls together. The pairs of rolls are joined by gears, as stated, whereby the lower roll drives the upper roll in each case. A shaft, $l^8$, carried by the standards is equipped with a plurality of arms or cams, $l^9$, one for each lever, $l^7$. Mechanism, M, worked from the timing shaft hereinafter described, is connected with the shaft, $l^8$, by the link, *m'*, and the lever, $l^{8''}$, and operates the cams, $l^9$, periodically to separate the rolls in advance of the operation of the knife, I, and close them together after the operation of the channel parts. The pattern mechanism, whereof, N, is the operating connection, includes the rocking shaft, $l^{12}$, and cams, $l^{13}$, $l^{13}$, $l^{13}$ and $l^{14}$. These cams engage corresponding arms, $l^9$. The cams, $l^{13}$, are disengaged from their arms $l^9$ when the cam, $l^{14}$, is raised or engaged with its arm and vice versa. The rocking shaft, $l^8$, operates regularly, whereas the rocking shaft, $l^{12}$, operates only at times when cords are to be formed or have been finished. These times are determined by a pattern cam, hereinafter described, operating through lever, N. Mechanism which is associated with the pattern cam, as hereinafter described, interrupts the action of the channel parts, C, D and E, during the formation of a cord and until the cord is completed.

It will be understood that during the cording period, the knife, I, the wire driving rolls, and the wire stopping and starting shaft, $l^8$, continue in regular operation. In the present machine the pattern shaft, $l^{12}$, normally holds in elevated position the lever of the driving rolls corresponding to the fifth coiler, $j^{4'}$. Its arm therefore is not affected by the rocking of the shaft, $l^8$. It will be noted that the lever belonging to the rolls of the coiler, $j^4$, is not represented by a cam on the shaft, $l^{12}$. When the pattern shaft, $1^{12}$, is turned, it lowers the lever of the fifth pair of rolls (belonging to coiler, $j^{4'}$) and raises the levers of the first three pairs, *i. e.*, those belonging to coilers, $j^2$, $j^3$ and $j^5$. The lowering of the fifth lever places its rolls in operation along with those of the fourth lever and until the pattern shaft is restored the fourth and fifth levers and their rolls take up and continue the normal operation together, while the remaining levers and rolls remain idle. Thus by stopping three of the pairs of rolls, by throwing the channel members out of action and by putting two sets of rolls into action, I can able to run in the number of coils which may be required to form a cord in the fabric.

During the regular operation of the machine and at the beginning of its cycle of movements, the parts occupy the positions shown in Figs. 1, 2, 3, 4, 5, 6, 7, 11, 15, 17, 18, 20, 22, 23, 31, 32, 34, 37 and 42. At such moment the knives are raised or out of action, and the pairs of rolls belonging to the coilers, $j^2$, $j^3$, $j^5$ and $j^4$, are in action, i. e., coils are being run into the channel. An instant later, coils of proper length having been run into the channel, the mechanism, M, moves the shaft, $l^8$, and separating the rolls causes the stopping of the wires in the coilers. This is followed by the cut-off action of the knife, I. Then the members, D and C, are drawn back by the rocking of the shaft, C D, to free the new section of fabric which has been formed in the channel, in the manner more fully defined hereinafter. At the moment of the withdrawal of the knife edge, C', the take-up roll, F, is operated by mechanism, F', to remove the completed fabric from the channel, the last or edge coil, however, remaining on the pins, $d'$. The fabric having been freed, the members, C and D, return to position and the member, E, moves forward to shift the reserve coils forward in the channel. Having done this the member, E, returns to the position shown in Fig. 39, marking the end of the cycle; the mechanism, M, immediately thereafter restoring the rolls to engagement with the wires, to institute the coil forming step or stage of the next cycle. The pattern mechanism begins its operation at the end of this coil-forming stage in some cycle (as predetermined by the form of the pattern cam). The channel members and the first three driving rolls (and coilers, $j^2$, $j^3$ and $j^5$) having been thrown out of step (as before described) the last two rolls (and coilers, $j^4$ and $j^{4'}$) are operated one or more times, (according to the pattern) to run or weave two or more additional coils in the section of fabric then lying in the channel. Following the formation of a cord in this manner, the channel members, C, D, and E operate (in the manner before described) to release the fabric and position the reserve coils, preparatory to the next regular cycle of movements.

As the best means of briefly defining the office and action of the mechanism which controls the operations of the wire driving rolls and coilers, namely the patterning mechanisms, I shall hereinafter refer to said patterning mechanisms as the means for intermittizing the actions of the driving rolls and coilers, and alternating the actions of certain thereof with respect to others.

The character and operation of the mechanism being now generally understood, the actual weaving operation may be described and will be best understood upon reference to Figs. 35 to 44. These are diagrammatic views in which I have depicted the several principal and intermediate steps of the weaving. Figs. 35 and 40 show the channel, B, and the parts, C, $d'$, $e'$, $b^4$ and $b^5$, in the relation or positions occupied, at the instant following the liberation of a new section of fabric; when the knife edge, C', and the pins, $d'$, have returned to normal positions and before the coil transferring fingers, $e'$, have operated. For clearness the knife edge is omitted in Fig. 40. The coils, $1^a$, (dotted lines Fig. 35) represent the body of the fabric, which rises from the channel, being held in such position by slight tension from the take-up roll, F. The lowest or edge coil of the fabric is marked, 1. This coil is held in the channel by the knife edge, C', and the pins, $d'$. The reserve coils are indicated by the numerals 2 and 3. The coil 1, and the reserve coils 2 and 3, are at opposite sides of the channel and are separated by the members, $b^4$ and $b^5$. Coils 2 and 3 are interlocked with the pins, $d'$, and they are also relatively interlocked; being at this time substantially coincident (as to their axes) and one being a half pitch or turn in advance of the other. It may be here explained that the coilers, $j^2$, $j^3$, and the guide, H, are formed to weave the coils 2 and 3 in this manner.

It should also be noted that the coil, 2, is parallel to the edge coil, 1, whereas the coil, 3, is not parallel, being a half turn out of line or step with respect to the edge coil. Having positioned the coils, 1, 2 and 3 in this manner, I next transfer the coils 2 and 3 across the channel, and "set" or leave the coil, 2, alongside of or against the edge coil, 1. This I do by means of the fingers, $e'$, which being moved forward, as shown in Figs. 36 and 41, engage the coil, 2, and push the same over the bars, $b^4$ and $b^5$. The coil, 3, being interlocked with the coil, 2, is transferred with it. The bar, $b^4$, prevents the accidental displacement of the reserve coils in the channel, and being spring supported, yields to the passage of the coils under the propulsion of the fingers, $e'$. The member, $b^5$, is positively supported and is positively retracted by shaft, B', during the transference of the coils. It is held down until the coil, 2, passes over it and is then restored to raised position to hold the coil, 2, in engagement with coil, 1, and to spread the coils, 2 and 3, as shown in Figs. 36 and 41; this last being a precaution against the accidental interlocking of the coil, 3, with the edge coil, 1, by the coupling coil about to be described.

After the fingers, e', have transferred the coils as depicted in Fig. 41, they are returned to normal position, the coils remaining as there shown.

I have hereinbefore described the cycle of operations as beginning with the running of the four coils. This step is depicted in Figs. 37 and 42, and begins after the coils, 1, 2 and 3 have been juxtapositioned in the manner above described and shown in Figs. 36 and 41. The four coils alluded to are the coils 4 and 5 and the coils, 2' and 3'. These coils are woven as shown in Fig. 42 and the new reserve coils, 2', 3', obviously occupy the position vacated by the preceding reserve coils, 2 and 3. The coil, 4, is the interlocking or coupling coil, and runs in the portion of the channel between the member, $b^3$, and the wall, $b^2$. It is a half-pitch or turn "behind" the parallel, juxtapositioned coils 1 and 2 and serves to interlock them, as clearly shown in Figs. 37 and 42. The coil, 5, runs in the portion of the channel between the members, $b^4$ and $b^5$, and interlocks with the coil, 3; and as the coil, 5, is to become the edge coil of the fabric its relation to the pins, d', and the other coils corresponds to that of the coil 1.

Obviously the running in of coils, 4 and 5, adds four coils to the edge of the fabric, inasmuch as the coil, 4, attaches the coils, 2 and 3 to the coil, 1, and the coil, 5, is attached to or interlocked with the coil, 3.

The cycle of operations is most conveniently described as beginning with the simultaneous running in of the four coils, but from another view point the addition of four new coils to the fabric may be said to begin with the moving over of the reserve coils and to end with the running in of the coils, 4 and 5, the running of the new reserve coils, 2' and 3', being in this sense a preparatory or incidental step. Immediately after running in the coils, 4, 5, 2' and 3', I withdraw the newly completed portion of the fabric from the channel, as depicted in Figs. 38 and 43. This is accomplished by retracting the pins, d', and the knife edge C' or closure, C. As these parts are drawn back, successive coils, 1, 4, 2 and 3, are released and as the fabric, $1^a$, is under tension from the roll, F, the coils are lifted out of the channel. The parts, d' and C are not drawn back far enough to release the coil, 5, but co-act with the member, $b^5$, to retain it in the channel. It will be evident that the reserve coils, 2' and 3', are not disturbed by the movement of the parts C and d'. After the releasing of the coils, 1, 2, and 3, the coil, 5, is transferred to the portion of the channel previously occupied by the coil 1. This is accomplished by the retraction of the member, $b^5$, and the restoration of the pins, d', and the closure, C, to normal positions. The pins, in moving, carry the coil, 5, across the channel and against the wall, $b^2$, thereof in readiness to receive the next reserve coil. The channel parts and the coils will then present the appearance shown in Figs. 39 and 44.

For the sake of clearness I have marked the last coil, 5—1 in Figs. 39 and 44, to show that it is the coil previously referred to as coil, 5, but has become the new edge coil, 1. This point or stage may be termed the end of the weaving cycle, inasmuch as the coils, 5—1 and 2', 3', occupy the positions first described with the coils, 1, 2 and 3 in Fig. 35. But in the other sense, above referred to, the cycle or process may be said to be still unfinished and not completed until the new reserve coils, 2' and 3' have been moved over against the edge coil in the manner depicted in Fig. 36, in which position, following the retraction of fingers, e', the coils and the channel are in readiness to receive four new coils. Both ways of viewing and defining the operation are obviously correct; the latter is perhaps the most convenient when considering that phase thereof which includes the cording of the fabric, for this step takes place after the steps depicted in Figs. 36 and 37. In other words, after running in the four new coils as shown in Figs. 37 and 42, the sequence of operations depicted in Figs. 37, 38 and 39 is interrupted by the pattern mechanism and the cording operation begins. The interruption of the normal operation leaves the parts in the positions of Fig. 36, and stops the operation of the coilers which furnish the coils, 5, 2 and 3, while additional coupling coils from the coilers, $j^4$ and $j^{4'}$, are run in as before explained. These coils with the previous coil, 4, constitute the cord; all being interposed between and interlocked with the edge coil, 1, and the adjacent coil, 2.

From the nature of my invention it must now be evident that my machine is capable of considerable modification. For example, the edge coil of the fabric may be held and a single reserve coil may be pushed against it, or vice versa, and then a single coupling coil may be run in simultaneously with the placement of a new reserve coil; thus adding two coils to the fabric at a time. Again it is a simple matter to increase the fabric three coils at a time by simply omitting the coil, 5, and providing for the proper placement and relation of the then terminal coil, 3, and the new reserve coil, 2. It is obvious also that more than two reserve coils may be simultaneously formed and moved over for attachment to the edge coil; and also, several interlocked coils may be added to or take the place of the added coil, 5. It will also be obvious that my machine, after a simple change in the rolls and coilers, will successfully handle multiple coils, in which case two or more coils take the place of each single coil hereinbefore described.

Having now explained the construction, relations and operations of the principal portions of my mechanism in such manner as to enable others to carry out the spirit of the use of my invention I will proceed to the detailed description of the precise form in which I prefer to embody it, referring to the various component or constituent mechanisms under the headings hereinbefore set forth.

*The wire holding and supplying mechanism.*—As shown in Figs. 1, 2, 4 and 5, the bundles of wire used in my machine are held upon individual reels K, these reels are suspended from clips or hooks $k'$ on the under side of the table A, and are distinguished by the pots, drums or weights $k''$, on their lower ends. Each reel has a central tube $k'''$, and the wire from the bundle is carried downwardly around the guard or weight, $k''$, and thence upwardly through the central tube, $k'''$. Between each reel and its corresponding sheave, $k$, I provide other sheaves for forming a loop in the wire. Thus the wire emerging from each reel passes over a sheave, $k'$, thence downwardly over a sheave, $k^2$, thence around a sheave, $k^3$, and upwardly over a sheave, $k^4$, from whence it passes to the sheave $k'$, in front of the feed rolls. For the fifth reel I provide an extra sheave, $k^{4'}$. The driving rolls in the head, L, draw the wires from the reels and in event the wire becomes tangled or caught on any reel the loop formed therein affords sufficient slack to continue the feed until the rolls are stopped by the automatic stop mechanism. The relation between the sheaves, $k^3$, and the stop mechanism will be explained hereinafter. It may be explained that the sheaves employed are so called tension sheaves and serve to maintain a sufficient degree of tension between the reels and the driving rolls.

*The wire feeding or propelling mechanism.*—Special attention is directed to Figs. 1 to 3, and 5 to 11. As before stated the shafts, $l^3$, and, $l^4$, are held in bearings in the standards, $l^2$. These bearings, $l^3$, and, $l^4$, are rigidly secured in the standards by the caps, $l^{15}$, and set screws, $l^{15'}$. The shaft, $l^3$, rotates in its bearings; the shaft, $l^4$, does not rotate but serves to brace the upper ends of the standards, $l^2$, and also provides an effective stop for the levers, $l^7$. The lower feed rolls, L', are in the form of thin disks having peripheral grooves, as shown, for the wires. They with their gears, $l'$ are connected by a pin, $l^{16}$, and are fixed upon the shaft, $l^3$, by collars, $l^{17}$, and, $l^{18}$; they may also be keyed to the shaft, $l^3$. The upper rolls are similar thin disks and have like peripheral grooves. Each upper roll, L", is preferably separate from its gear, $l''$, but is connected therewith by a pin, $l^{19}$; this pair of parts is then journaled upon a hub or boss, $l^{5'}$, on the lever, $l^7$. The boss contains an opening, $l'''$, which is larger than the shaft, $l^4$; hence the lever, $l^7$, is permitted to move up and down freely. The arrangement of the levers and the upper feed rolls is clearly depicted in Fig. 10. It will be noted that the levers, $l^7$, may be lifted to free the wire between the rolls without disengaging respective pairs of gears, $l'$, $l''$, hence the upper rolls are continously rotated by the lower rolls whether in working or non-working position. The cross rod, $l^5$, which serves as the pivotal center for the levers, $l^7$, is supported in lugs, $l^{5'}$, projecting from the standards, $l^2$. The rear or free ends of the levers, $l^7$, preferably engage pins, $l^{20}$, which project from respective lifting arms or cams, $l^8$, (see Figs. 6, 7 and 11). The arms, $l^8$, are journaled on the shaft, $l^8$, and are actuated therefrom through the medium of studs, $l^{21}$, projecting therefrom and accommodated in recesses in the hubs of the arms. Set screws in the studs, $l^{21}$, permit accurate adjustment between the rocking shaft, $l^8$, and the individual arms, $l^8$. $l^{8''''}$ is a stop arm on the shaft $l^8$ or lever $l^{8''}$. When the arms, $l^8$, are in normal positions the studs engage and operate the same at each movement of the shaft, $l^8$, but when any arm is arbitrarily lifted by the pattern device hereinafter referred to, it is moved beyond the reach of its operating stud and is not actuated thereby in either direction until released. The springs, $l^9$, are anchored to the bed plate or table, A, as shown in Figs. 7 and 11, and their upper ends are connected with respective arms, $l^7$, by rods $l^{9'}$, having adjusting heads, $l^{9''}$, at their upper ends. By these devices the pressure of the upper rolls upon respective wires may be accurately adjusted to insure the driving of the wires by the rolls without flattening the wire by excessive pressure. As the upper rolls are yieldingly held against the lower rolls, it follows that they are individually capable of accommodating irregularities in the size of the wires; hence, constant pressure is maintained upon the wires during the running in periods, regardless of frequent variations in the diameters of the wires; which variation would result in irregular feeding of the wires if the upper and lower rolls were held at fixed distances. I prefer that the top of the shaft, $l^4$, shall serve as the stop for all of the upper rolls and shall determine the minimum distance between the upper and lower rolls, thereby relieving the cams or arms, $l^8$, from duty as stops, and avoiding the necessity of accurate adjustments between the roll levers, $l^7$, and the arms, $l^8$. It is for this reason that I make the bearings of the shaft, $l^8$, adjustable in the standards, $l^2$. It is also desirable that the standards and bearings shall be so formed as to permit the easy removal of the rolls from the standards, for the purposes of repair.

It is occasionally necessary to work the machine by hand as at times when a coil becomes kinked or tangled in the weaving channel and when it is wished to run in a single coil to take its place. To do this it is necessary to interrupt the ordinary action of all but one of the pairs of rolls; this may be done by lifting the levers of the other pairs and holding them in raised position while the selected pair operates. For this purpose I employ a manual jack or blocking up device in connection with each lever, $l^7$. By grasping and raising the outer end of the lever, $l^{5'}$, of shaft, $l^8$, all of the cams, $l^9$, and lever, $l^7$, may be raised and while raised may be secured by these blocking up devices. Each said device preferably comprises a vertical rod, $l^{22}$, and a latch or block proper, $l^{24}$. The part, $l^{23}$, is a stationary bar which may project from the standards, $l^2$, and is provided with horizontal groove, $l^{24'}$, in which the parts, $l^{24}$, are pivoted; (see Figs. 6, 7 and 9). The ends of the rods, $l^{22}$, are slidably held in the bar, $l^{23}$, in position to be blocked up by respective parts, $l^{24}$, (see Fig. 9). The upper ends of the bars, $l^{22}$, are pivotally attached to respective arms, $l^9$, and when elevated and placed on the blocks, $l^{24}$, hold the respective upper rolls out of contact with the lower rolls. Obviously either of the levers, $l^7$, may remain depressed and continue its normal operation while the others are blocked out and by manipulating the jacks any desired coil or coils may be run into the weaving channel.

It should have been explained that the shaft, $l^8$, is journaled in the brackets, $l^{25}$, on the standards, $l^2$, (see Figs. 6, 7 and 11). These brackets also furnish bearings for the shaft, $l^{12}$, which carries the cording cams, $l^{13}$, and $l^{14}$. Normally the cam, $l^{14}$, is positioned as shown in Fig. 8, and the cams, $l^{13}$, as in Figs. 6 and 7. The end of shaft, $l^{12}$, has a crank arm, $l^{26}$, to which the actuating lever, N, is attached. The lever, N, is pivoted in a standard, $n$, on the table and when operated throws the shaft, $l^{12}$, in the direction indicated by the arrows in Figs. 6 and 7, this movement turns the cam, $l^{13}$, upward and raises the upper row of the first three pairs of rolls and also turns the cam, $l^{14}$, down out of the way of its arm, $l^9$, to liberate the lever, $l^7$, and allow the last or outermost of the pairs of rolls to act in company to the next to the last pair, which as previously explained, has no cam on the shaft, $l^{12}$, and is not affected by the movement thereof. The yieldable or movable rolls, their levers, $l^7$, the shafts, $l^8$, and $l^{12}$, and the cam parts thereon constitute a very complete and reliable selective mechanism for the hereinbefore described uses in the formation of regular fabric and cords. The mechanism employed for rocking the shaft, $l^8$, once during each operation of the machine and the mechanism for rocking the shaft, $l^{12}$, at greater intervals to form cords will be explained hereinafter under the headings, timing mechanism and patterning mechanism. A cross bar, $l^{27}$, at the receiving side of the rolls serves to support the several guides, $j^1$; another cross bar, $l^{28}$, serves to support the guides, $l^3$, at the discharged side of the rolls and also sustains the weight of the coilers.

*The coilers or coiling mechanism.*—Attention is specially directed to Figs. 1, 2, 3, 5, 7, 12, 13 and 14. The five coilers, $j^2$, $j^3$, $j^5$, $j^4$, and $j^{4'}$, are supported by the cross bar, $l^{28}$, and are adjustable by means of the threaded spindles, $j^6$, in the underlying plate, $j^7$. The coilers and the adjusting devices are identical and a description of one will serve for all. Each coiler comprises several parts, to-wit: a block, $j^8$, on bar, $l^{28}$, at end of guide, $l^3$, a spirally grooved spindle, $j^9$, projecting from the block, to guide wires or coils, $j^{10}$, and, $j^{11}$, in the spindle groove, a coacting knife edge or pressure point, $j^{12}$, in block, $j^8$, a shield or sleeve, $j^{13}$, secured by set screw, $j^{14}$, an adjustable sleeve, $j^{15}$, containing a groove, $j^{16}$, and fitted to the reduced end of the spindle, $j^9$, a spindle extension, or internal coil guide, $j^{17}$, on adjustable sleeve, $j^{15}$, an adjusting arm, $j^{18}$, extending from part, $j^{17}$, and a block, $j^{19}$, on the spindle, $j^9$. The wire to be coiled enters the groove between the wires $j^{10}$, and, $j^{11}$, at the end of the sleeve, $j^{13}$, (see Fig. 13). Being forwardly propelled it is forced through the groove and several times around the spindle, being thereby formed into a coil. The end of the wire, $j^{10}$, extends into the adjustable part, $j^{15}$, and by rotating the latter it may be deflected one way or the other to change the "set" of the coil and either increase or decrease the pitch of the coil. By staggering or slanting the several coilers with respect to each other as shown in Fig. 12, I am able to arrange the same close together within a small space the width of which but slightly exceeds the width of the coil receiving channel, B. The coilers closely approach the end of said channel. In the gap between them I arrange the electrical contact member or coil shield, O, hereinafter referred to under the heading Automatic stop mechanism.

*The coil guides.*—Attention is directed to Figs. 1, 5, 15 and 17. The coil guides, H, H', and H'', as before stated, are arranged in the receiving end of the channel B. They are blocks containing spiral passages, $h^x$, for respective coils and provided with rearwardly extending internal guide spindles, $h^{x\prime}$, which first receive the coils from the coilers and aline or co-axialate the same with the spiral grooves, $h^x$, through which the coils thus properly positioned run into the channel, B. The coil guide H, delivers two coils into the space between the front wall, $b'$, and the escapement bar, $b^4$, these coils becoming the reserve coils hereinbefore mentioned. The guide, H', delivers a single coil into the space between the bars, $b^4$, and, $b^5$, this coil becoming the added coil, 5, before mentioned, while the guide, H'', delivers at certain times coupling coils, 4, into the space between the escapement bar, $b^5$, and the rear wall, $b^2$, of the channel; at other times it delivers coils, 4 and 4', thereto to form cords in the fabric. The shearing blocks, $h$, $h'$, $h''$, (see Fig. 17) are continuations of the parts, H, H', H'', and may be separate and separately adjustable by set screws, $h'''$, and these blocks act with the cut-off knives.

*The cut-off knives.*—Attention is directed to Figs. 1, 2, 5, 15, 17 and 25. The knives, $i$, $i'$, $i''$, as before stated, are carried by the head, I; and this head is guided by pins, $i^3$, which work up and down in holes in the sides of the channel, B. When the knives descend they shear or cut the coils at points of emergence from the coil guides. The head, I, is actuated by the lever, I', pivoted on the bracket, $i^4$, (see Figs. 5 and 17) and is in turn actuated by mechanism that will be described in connection with the timing mechanism, of which the vertical connecting rod, I'', is a member; the lever, I', works against a compression spring, $i^5$, and its knife lifting movement is limited by a stop, $i^6$, on the rod, $i^{5\prime}$. The connecting rod, I'', is detachably joined to the lever, I', by a latch, $i^7$, and when freed therefrom the knives may be operated by hand, as is sometimes required.

*The weaving-channel or coil-receiver and co-acting parts.*—Attention is directed to Figs. 1, 2, 3, 5, 15, 18, 20, 22, and 23. The several members of the weaving channel, B, including the knife edge bar, C, the pin member, D, and the coil transferring member, E, have been so thoroughly described herein that it is now only necessary to define the manner in which the several moving parts are actuated. It will, of course, be understood that the channel is as long as the longest coil that need be run to form a fabric of maximum width. It will also be understood that the width of the channel is determined by the number of coils to be simultaneously woven therein. In the present case the width is such as to accommodate seven coils, three being the coils in the channel at the moment of the running in of the other four, as depicted in Figs. 36 and 37.

The shaft, CD, from which the members C and D, are operated is held in several bearings, $cd$, on the table, A. The plurality of long rocker arms, $c^2$, fixed on the shaft, CD, are connected with the closure, C, by adjustable connecting rods $c^3$. The rocking of the shaft, CD, thus effects the necessary movement of the member, C. As it is sometimes desirable to arbitrarily move the member, C, without moving the other parts, I prefer to employ the, T, slot and pin connections, $c^4$, $c^5$, between the arms, $c^2$ and the rods, $c^3$. By raising the ends of the rods, $c^3$, to the position indicated by dotted lines in Fig. 20, the closure, C, may be disconnected from the shaft, CD, and move independently. For simultaneously disconnecting the member, C, in this manner I mount a small rocking shaft, $c^6$, having a handle, $c^7$, on the arms, $c^2$, and provide thereon a number of bell cranks or throw out cams, $c^8$, which being thrown to dotted line position, (Fig. 20) elevate the ends of rods, $c^3$, and disconnect from the crank pins, $c^5$, on arms, $c^2$. Springs, $c^9$, between the arms, $c^2$ and the rods, $c^3$ cause the latter to drop into engagement with the pin, $c^5$, when the rods are restored by the return of bell crank, $c^8$, to full line position. The member, D, is connected with the shaft, CD, by a plurality of short rocker arms, $d^2$, and connecting rods, $d^3$, having yokes, $d^4$, engaged with crank pins, $d^5$, on said arms, $d^2$. As the arms, $d^2$, are shorter than the arms, $c^2$, the rocking movement of the shaft, CD, moves the member, D, a shorter distance than the member, C, as before explained and clearly depicted in Fig. 38. The shaft, CD, is rocked by means of two arms, $cd^2$, fixed thereto and which extend downward through the holes, $a^2$, in the table, A, for operation by cams, $CD^2$, on the intermittently rotated shaft, P, hereinafter described. (See Fig. 22). The member, E, bearing the transfer fingers, $e'$, is actuated by the rock shaft, E', through the medium of a number of short rocker arms, $e^2$, crank pins, $e^3$, yokes, $e^4$, and rods, $e^5$, resembling the connections between shaft, CD, and member D. (See Figs. 18 and 20). The shaft E', is operated by arms, $E^2$, fixed thereto and extending through holes, $a^3$, in the table, A. The arms, $e^2$, are actuated by the quick movement cams, $E^3$, on the shaft, P. (See Fig. 18).

As before stated the bar or escapement, $b^5$, in the channel is positively actuated by several arms, $b^7$, which are fastened to the rocking shaft, B'. (See Figs. 35, 20, and 23). I prefer to support the bar, $b^5$, by an equal number of vertical pins, $b^{5\prime}$, the same being arranged between the table and adjustable nuts, $b^{5\prime\prime\prime}$, on the pins, $b^{5\prime}$. The upper ends of the pins are positively coupled to the lower edge of the bar, $b^5$, and the arms, $b^7$, bear on the nuts, $b^{5\prime\prime\prime}$, to depress the pins and the bar, $b^5$. (See Figs. 35, and 20). Movement is imparted to the shaft, B', and hence to the escapement bar, $b^5$, by the cams, $B''$, $B''$, on shaft, P, the operating connection being established through the crank arm, $b^9$, on shaft, $B'$, the connecting rods, $b^9$, and the levers, $b^{10}$, pivoted on the hanger, $b^{11}$. I prefer that the bar, $b^5$, shall be drawn down once to permit the reserve coils to pass from the position in Fig. 35 to that shown in Fig. 36, and a second time to allow the edge coil to pass from Fig. 38, position to that shown in Fig. 39; hence the employment of the two cams, $B''$, and two levers, $b^{10}$. The movements take place close together to allow the reserve coils to quickly follow the edge coil across the channel. The interval is indicated by positions of cams in Fig. 23. It will be evident that as the cams, $B''$, $CD^2$, and $E^2$, are fixed on the same shaft, P, a single revolution of the shaft, P, will impart the hereinbefore described sequence of operations to the several weaving channel members, C—D—E and $b^5$. The proper timing of the operation is insured by the accurate relations between said cams on the shaft, P.

It should be understood that the pins, $d'$ are spaced to substantially correspond to the pitch of the coils and that the same, in conjunction with the coilers and the guides, H, $H'$, $H''$, serve to fix and tension the running coils in the weaving channel and thus insure the accurate interlocking of the running coils with those already in the channel, in each case. The single set of pins, $d'$, thus seem to perform two important functions, viz. the functions of an escapement and the functions of coil fixing or holding and tensioning means or devices. It will be obvious that the series of pins, $d'$, constitute a part of the escapement mechanism for feeding the fabric in and from the channel, the other members being the knife edge, $C'$, and the vertical blade or bar, $b^5$. It should also be understood that the invention contemplates the substitution of other or equivalent mechanical or electro-magnetic means or devices in place of the coil fixing, tensioning and escapement mechanism herein shown, but I prefer the latter because of its mechanical simplicity, durability and reliable accuracy.

*The fabric take-up mechanism.*—The take-up mechanism of which the roll, F, is the main member operates each time that the channel is opened by the retraction of the knife edge bar or closure, C. The standards, $f'$, rise from the table, A, at points near the ends of the weaving channel and at their upper ends are provided with bearings, $f''$, for the shaft, $f'''$, of the roll, F. I do not attempt to have the roll, F, move the exact distance required to withdraw four coils from the weaving channel, but instead, rely upon the channel members to retain the edge of the fabric firmly and spin or rotate the roll, F, one or more times to insure the exertion of the proper tension on the web or completed fabric. The mechanism, $F'$, employed for the purpose comprises a chain $f^4$, a sprocket and a clutch, the chain being operated intermittently from the shaft, P, and the clutch being interposed between the sprocket and the roll, F, (see Figs. 2, 3, 4, 20, and 21). The chain, $f^4$, passes over the sprocket, $f^5$, which is loose on the shaft, $f'''$. One end of the chain is fastened to the lever $f^6$, pivoted on hanger, $f^7$, depending from table, A. The other end of the chain is attached to the hooked end of the spring tension rod, $f^8$. The latter yields upwardly when the lever is thrown down to dotted position, Fig. 20, and obviously restores the chain on the return of the lever. The lever is actuated by a cam, $F''$, on the shaft, P, and at each operation of the lever the chain is whipped or reciprocated to impart a quick forward rotation to the roll, F, through the medium of the clutch. This clutch operates after the manner of a ratchet and pawl between the sprocket wheel, $f^5$, and the roll, F. I find however that a ratchet and pawl clutch lacks accuracy in operation and employ the clutch shown in Fig. 21, the same comprising a drum or ring $f^{5'}$, on the sprocket, $f^5$, a metallic end, $f^{5''}$, on the roll, F, containing peripherally disposed tangential wedge recesses, $f^{5'''}$, and rollers or rolling wedges, $f^{5''''}$. Upon the forward movement of the sprocket the rollers catch between the drum and the part, $f^{5''}$, and lock the sprocket and roll, F, together. The sprocket makes but part of a revolution and the roll momentum is such as to carry the same forward after the sprocket has completed its quick stroke, the rolls readily unclutching and permitting this movement. This particular mechanical movement has the advantage of causing the roll, F, to exert instant tension upon the fabric when operated by the cam, $F''$, and as the revolution of the roll, F, ceases gradually only after the chain and sprocket have returned, the clutch serves to prevent backward rotation of the roll and thus maintains the desired tension on the fabric.

To equalize the tension at different points in the fabric web I preferably employ a series of spur wheels, $f^6$, upon a free running shaft, $f^7$, between the roll, F, and the weaving channel. The spurs of these wheels project into the fabric and as the wheels are fixed on the shaft, the rotation of one by the fabric will cause the rotation of the other, thereby communicating the tension of one point to other parts of the web.

As a precaution against the pulling of the fabric from the pins in the weaving channel by the sudden tension of the take-up roll, I preferably use a plurality of walking fingers or hooks, $f^9$, on the rear side of the machine; each hook comprises a lever occupying an upright position and journaled on the shaft, B', together with a vertically slidable gooseneck or loop, f⁹', having a pin, f¹⁰, which pierces the fabric. (See Fig. 18). At the instant that the channel is opened the fingers occupy the position shown in Fig. 18 and rise with the fabric; their movement is limited and in event the fabric tears loose from the pins in the channel, the walking fingers retain their hold and prevent the fabric from falling off the roll, F. The member, E, has attached to it as many bars, f¹¹ as there are levers, f⁹, and when the bar, E, moves over to transfer the reserve coils in the channel, (after the knife edge is closed) the parts, f¹¹, strike the levers, f⁹, and throw them back, thereby disengaging the fingers, f¹⁰, from the fabric. And thereupon the fingers drop to normal position and as the bar, E, is immediately retracted the fingers again swing into engagement with the fabric in readiness to repeat the operation when the fabric is again fed upward. Pins, f¹², in the slotted parts, f¹³, on the table keep the fingers, f⁹, from falling too far backward when thrown out by the parts, f¹¹; and the heavy lower ends of the levers or fingers, f⁹, insure the immediate return of the fingers, f¹⁰, to the fabric, when the parts f¹¹, are retracted.

*The fabric edge finishing mechanism.—* The means which I employ for finishing the raw edges of the coil wire fabric will be best understood by reference to Figs. 2, 3, 18, and 19. The shaft, G', is preferably directly beneath and parallel with the shaft, P. G'', is a non-rotating rod or brace held in legs, A', parallel with the shaft, G'. The shaft, G', is continuously rotated from the transverse shaft, Q, at the power end of the machine, a sprocket belt, q, and bevel gears, q', forming the connection. The principal member of each crushing and cutting device, G, is a yoke, g; extending between and supported by the shafts, G', and G''. On the rear end of this member is a jaw, g', to receive the edge of the fabric as the latter falls from the roll, F. The front side of the yoke contains a bearing, q'', and in this I arrange a reciprocating block, g³, while a cam, q⁴, feathered on the shaft, G', is located between the arms of the member, g, (see Fig. 18) and is adapted to be adjusted longitudinally with the member, g. A cam strap, q⁵, and a connecting rod, g⁶, join the cam, g⁴, and the block or head, g³. The jaw, g', and the end of the block, g³, are formed to both trim and crush the edge of the fabric. The crushing blocks, g³, are wider than four coils of fabric and the shaft, G', need not rotate more than once during each weaving operation of the machine, but more rapid rotation is not objectionable. The work of the two tools, G, is well depicted in Fig. 3.

*The driving mechanism and the several working couplings or connections.—* Before proceeding to the description of the coil length varying mechanism and the timing, patterning and the stop mechanism, it will be well to briefly describe and locate the several main driving elements or shafts which actuate the same and dependent parts.

Special attention is directed to Figs. 1 to 5, and 18, 20, 22, 23, 25, 29, 30 and 31. As before stated the shaft l³, is the main power shaft of the machine on which the lower wire driving rolls are located. The outer end of this shaft is supported by a bearing, A''.

R, is a driving belt pulley loosely journaled on the shaft, l³, and R' represents a clutch for operatively joining the pulley, R, and the shaft, l³.

R'' is the clutch shifting lever. (See Figs. 1, 4, and 31 to 34).

Lˣ, represents a hand wheel on the shaft, l³, for manually operating the machine when desired.

Beneath the table are the shafts, Q, S, T, P, U, and V. These are all rotating shafts.

W, is a rocking shaft which forms part of the stop mechanism, hereinafter described. The shaft, Q, is supported by bearings, qˣ, and is driven by the shaft, l³, through the train of reducing gears, q³. One of the gears is an idler, arranged on the lever, q⁴, and by throwing the same the connection between the shafts, l³, and, Q, may be interrupted, to leave the driving rolls in operation and cut out the remainder of the machine.

Q' is a hand wheel on shaft, Q, for operating the various parts of the machine manually when the shaft, Q, is disconnected from shaft, l³.

S is a short shaft, (see Figs. 4 and 25) connected with the shaft, Q, by the bevel gears, s, s'. The shaft, S, runs continuously as long as the shaft, Q, is in rotation. It will be understood that the shafts, l³, and Q, are connected; the idler referred to being thrown out of gear only when some arbitrarily abnormal operation of the machine is required. Shaft, S, is supported in a bearing, s'', in the depending bracket, s³. The shaft, T, is in alinement with the shaft, S, and is supported by the bearings, t, and t², in the depending brackets, t', and t''. The ends of the shafts, S, and T, approach one another between the brackets, s³, and t', and at this point I arrange the intermittent coupling or timing clutch, ST. Said clutch comprises the tapered or conical member, st, secured to the end of shaft, S, and the internally tapered cup member, ts, slidably fastened to the shaft, T, by the feather, ts'. The conical part, (see Figs. 25, and 27) contains a plurality of wedge recesses, st', and in these I arrange the wedge rollers, st².

It will be obvious that when the clutch parts are in the positions shown in Figs. 25, and 27, they firmly couple the shafts, S, and T, so that the shaft, S, may impart forward rotation to the shaft, T. I employ wedge rolls as the most effective means of securing the instantaneous response of the shaft, T, when the clutch is thrown in, slippage being prevented thereby, and the conical form of the clutch permits a light, quick disengagement of the two members of the clutch at the end of a single revolution of the shaft, T. The engagement and disengagement of the clutch members is brought about by a timing mechanism hereinafter described and which operates on the clutch lever, $ts^2$. It will be noted that the clutch, ST, is constructed on the same lines as the take-up roll clutch, before described, but does not operate after the manner of a ratchet clutch, except in so far as it is capable of preventing slippage between the clutch parts. It has the added function of an ordinary separable cone and cup clutch, the retraction of the cup, $ts$, serving to instantly release the wedge rolls. Longitudinal movement of the cup, however, is not sufficient to liberate the rolls from the recesses which contain them. The clutch lever, $ts^2$, has a vertical pivot, $ts^3$, and carries anti-friction rollers, $ts^4$, which engage the back of the clutch cup, $ts$, to press upon the cone, $st$. A spring, $ts^5$, at the free end of the lever, $ts^2$, tends to hold the same in engagement with the clutch. When the lever, $ts^2$, is retracted to separate the clutch members, it engages a pin, $ts^6$, on the hub of the member, $ts$, and pulls the latter away from the cone member. Such movement of the lever, $ts$, is caused by the timing mechanism and occurs only when the pin, $ts^6$, is in position to be engaged. (See Figs. 25, and 29.) The shaft, T, carries the roll raising cam, M'; the knife operating cam, $I^2$; and the clutch cut-out cam, $ST^2$.

The form of the cam, M', is shown in Fig. 26. It is circular except for the notch or depression, $m^2$. In Fig. 26, it is shown about to enter into register with the pin or roller, $m^3$, on the lower end of the actuating rod, $m^4$, that is connected with the lever, M; in other words the cam, M', as shown in Fig. 6, is about to allow the driving rolls to go into action.

The cam, $I^2$, as shown in Figs. 17, and 25, actuates the knife rod, I'', before referred to. At each revolution of the shaft, T, said cam strikes the pin, $I^3$, and elevates the rod, I'', to actuate the knives, I, and sever the coils in the weaving channel. This movement endures for a moment only as the cam strikes and immediately releases the pin, $I^3$. At its end the shaft, T, is provided with the gear wheel, $T^2$, which meshes with a gear, $P^2$, of the same size on the shaft, P. The gear, $T^2$, is journaled on the shaft, T, and a clutch, $n^2$, is relied upon to normally connect the same with the shaft. This clutch is associated with the cording or patterning mechanism and is thrown out to disengage the shafts, T, and P, when cords are to be run into the fabric; at which time, it will be remembered, the channel members remain stationary. The shaft, P, is supported by depending bearings, P', on the table and as above explained it carries the bars or cams, $CD^2$, and $E^3$, the cams, B'', and the cam, F'''. The shafts, T, and P, make a single complete revolution for each weaving operation during the normal action of the machine, and hence in each cycle the feed rolls are raised and lowered by cam, M', the knives are operated by cam, $I^2$, the push over mechanism, E, is operated by cam, $E^3$, the knife edge bar and the pin member, C, and D, are operated by the cam, $CD^2$, the escapement bar, $b^5$, is twice operated by cams, B'', and the take-up roll, F, is operated by the cam, F'''.

U, is the shaft from which the normal or ordinary timing of the machine is governed. It is carried by a depending bearing, $u'$, on the table, and is longitudinally movable in said bearing. At one end is a friction wheel, $u''$, which is constantly engaged with the friction disk, $Q^2$, on the shaft, Q. At the opposite end a grooved collar, $u^3$, upon shaft, U, is engaged by a rocker arm yoke, $u^4$, on an adjusting shaft, $u^5$.

$u^6$, is an adjusting arm having a rocking pin which may be moved from one hole to another in the segment, $u^7$, (see Figs. 3, 4, and 29). By shifting the arm, $u^6$, the friction pulley, $u''$, may be shifted on the disk, $Q^2$, to vary the ratio between the shafts, Q, and U. These parts are used in determining, i. e., lengthening and shortening, the length of the coils in the weaving tube and will be again referred to hereinafter under the heading, Coil length varying mechanism.

The shaft, V, is rotated by the shaft, U, through the medium of the worm, $u^8$, and the worm gear, $v^1$, (see Figs. 4, 29, and 30). The shaft, V, is supported in the bracket, $u'$, and $s^3$, and at its forward end carries a worm, $v^2$; this worm actuates the worm wheel, $v^3$, on shaft, $v^4$, between lower ends of brackets, $s^2$, and $t'$. The pattern cam, $N^2$, is attached to or formed in the side of the gear wheel, $v^3$; (see Figs. 25, and 29) said pattern cam operates the member, N, which works the cam shaft, $l^{12}$, and will be referred to again hereinafter under the heading, Pattern mechanism.

*The coil length varying mechanism.*—Attention is directed to Figs. 3, 4, 6, 7, 25, 28, 29, and 30. It has been made clear that the knives and the several members of the weaving channel remain stationary during the active period of the driving rolls L' and L'', and that the rolls are separated to stop the wire before the knife and the channel members begin to operate. It will also be clear that the knives are not stopped and that the channel members do not begin to operate until the clutch, ST, is thrown into action to set the shaft, T, in motion. From these facts it will be clear that the coils having started to run from the coilers will continue to run into the channel until the clutch acts and sets the cam, M', in motion to separate the driving rolls, which action precedes the actions of the cams, $I^2$, $CD^2$, and $E^3$; hence the lengths of the coils is determined by the length of the intervals between the operations of the clutch, ST; and these intervals are determined by the position of the friction pulley, $u''$, on the friction disk, $Q^2$. If the friction pulley is adjusted close to the shaft, Q, long coils will be run into the weaving channel, whereas; the adjustment of the friction pulley, $u''$, toward the periphery of the friction disk, $Q^2$, results in the more frequent working of the coupling clutch, and hence cuts down the number of revolutions of the wire driving rolls and shortens the coils, narrowing the fabric. Various devices may be outlined to thus vary the intervals of the stopping and starting of the intermittent shafts, T, and P, but as in the case of other parts of my machine I shall describe only one such means, viz. the mechanism disclosed in Figs. 4, 5, 25, 28, 29, and 30. As therein shown the worm gear which is operated by the variable speed shaft, U, carries a multiple cam disk, $u^{10}$; these parts being connected by studs, $u^{11}$.

$u^{12}$, represents a pawl normally held up by spring, $u^{13}$, and having at one end a pin, $u^{14}$, for engagement with the teeth, $u^{11'}$, of the cam disk. The end opposite $u^{14}$ of the pawl is adapted to engage the lever, $ts^2$, and hold it out of engagement with the intermitting clutch, ST. This is its condition during the time that the driving rolls are in operation upon the wires.

Fig. 28 shows one of the cam teeth to have engaged the pawl and thrown it up to disengage the clutch lever, $ts^2$. At this instant the lever forces the clutch, ST, into action and the revolution of the shaft, T, begins, resulting in the separation of the rolls L' and L'', the stoppage of the wire and the successive operations of the knives and the channel members. Immediately upon the passage of the cam tooth from contact with the pin on pawl $u^{12}$, the pawl is freed and made ready to again lock out the clutch lever and clutch. This occurs on the completion of the revolution of the shaft, T, the opening of the clutch, ST, being then caused by the engagement of the cam, $ST^2$, with the end of the pull rod, $ts^7$, which is pivoted to the lever, $ts^2$, as shown in Figs. 25 and 29. This operation occurs the instant prior to the reception of the pin, $m^3$, in the notch, $m^2$, of the cam, M'; in fact at substantially the same instant. Thus the channel members are thrown out of action and the rolls L' and L'', are retracted to action; thereafter the multiple cam, $u^{10}$, continues to rotate until its next tooth strikes the pawl, $u^{12}$. If the rotation of the cam, $u^{10}$, is slow, by reason of the position of friction pulley, $u''$, on the disk, $Q^2$, a long coil will run into the channel before the pawl or tripping dog, $u^{12}$, is operated to again throw the coupling clutch, ST, into operation; if the cam, $u^{10}$, rotates with comparative rapidity the pawl, $u^{12}$, will more quickly trip the clutch and stop the rolls, thus shortening the coils. The operator having direct control over the speed of the cam, $u^{10}$, through the agency of the lever or crank, $u^6$, may at any time vary the length of the coils, i. e. the width of the fabric. It will now be understood that this mechanism dominates all parts of the machine and determines the number of coils that will be produced in a given time. In practice the variable speed mechanism is rarely shifted and a fabric of a given width is surely produced thereby for days at a time without call for a fabric or width of different width.

*The timing mechanism.*—All of the timing elements of the machine have now been described, being the clutch, ST, the clutch lever, the variable speed mechanism, the multiple cam, $u^{10}$, the trip dog, and the clutch lever restoring cam, $ST^2$, which parts determine or fix the times and periods of the relative operations of the rolls, the knives, the weaving channel, and the take-up roll.

*The patterning mechanism.*—As before stated the patterning of the fabric, i. e., the running of the cords, is goverened by the operation of the cam shaft, $l^{12}$, which receives movement from the pattern cam, $N^2$, on the worm wheel, $v^3$. The connection between the operating lever, N, of shaft, $l^{12}$, and the pattern cam, $N^2$, is established through the vertically movable rod, $N^3$, and the pin, $N^4$, which operates in the groove of the cam. (See Fig. 25). As the knife remains in the periodic operation during the running in of cord forming wires, and as the rolls are periodically raised and lowered to permit the operation of the knife, the shaft, T, is connected and disconnected with the driving shaft, S, in exactly the same manner as when the ordinary fabric is being formed, but the channel members should remain stationary and I therefore arrange to disconnect the shaft, P, from the shaft, T, during the cording operation; in other words, during the time that the rod, $N^3$, is drawn down by the pattern cam. This portion of the mechanism is well shown in Figs. 1, 2, 5, and 25, the essential elements being the clutch, $n^2$, on shaft, T, and a cam, $n^3$, on the rod, $N^3$, which elements are operatively connected by the reciprocating rod, $n^4$, and the clutch lever, $n^5$. The spring, $n^6$, normally serves to hold the clutch in engagement with the gear, T², and when the cording or patterning cam draws down the rod, N³, it serves to rock the shaft, l¹², and start the coilers, j⁴, and j¹'. In operation the clutch is disengaged from gear, T², and obviously the shaft, P, belonging to the weaving channel will remain quiet until the cording operation is completed and the cam, N³, is rotated far enough to restore the shaft, l¹², and sets the regular driving rolls back into operation.

*Automatic stop mechanism.*—The automatic stop mechanism of my machine is intended to act when the wire tangles or catches on or between the reels and the driving rolls, and is also adapted to act whenever an obstruction occurs between the coilers and the weaving channel. I preferably use a wholly mechanical mechanism to actuate the stop device when the wires become too taut upon any reel or sheave, whereas; I prefer an electrical mechanism at the coilers. Both mechanisms operate to throw out the main clutch on the driving shaft, l³, and this being the case, I will first describe the device which is used to hold the clutch in engagement with the driving pulley, and will then define the stop mechanisms proper and their relations to the main clutch lever. Special reference will be made to Figs. 1, 3, 4, 18, and 29 to 34. The clutch lever, R", has a horizontal arm which works at the vertical side of the post or hanger, r. This post contains a spring detent or pawl, r', which is shown in Fig. 32, and which normally stands beneath the lever, R", and holds the clutch, R', in working position; a heavy spring, r², draws down on the end of lever, R", and if the detent, r' is withdrawn this engages the clutch, R'. As a means of restoring the clutch lever after disengagement, I use the hand lever, r⁴, journaled in the lower end of the post, r, and provided with an arm, r⁵, adapted to engage and lift the lever, R". (See Figs. 31 to 34). Although the lever, r⁴, normally occupies the position here shown it is not held in place by a spring or other wires and does not interfere with the fall of the lever when the detent, r', is retracted.

The parts, W', and, O', represent the terminal elements of the two automatic stop mechanisms above referred to, W' being a portion of the mechanical stop mechanism, and O' a part of the electro-magnetic stop mechanism.

The member, W', is a crank arm on the rocking shaft, W. When said shaft is rocked the part, W', strikes the lower end of the detent, r', and throws the same to the position shown in Fig. 33, thereby disengaging the clutch. The shaft, W, as best shown in Fig. 18, is supported by hangers, w². It carries a number of crank arms, w³, one for each of the sheaves, k³. These sheaves, k³, are carried by blocks, w⁴, which are vertically slidable on the rods, w⁵. Each block has a lug, w⁶, on its back and is engaged by a spring pawl or hook, w⁷, when in the lower or working position. The spring, w⁸, tends to maintain the connection and holds the block, w⁴, so firmly that more than ordinary tension on the wire which passes over the sheave, k³, is required to pull up the block. Such abnormal tension upon the wire will, however, lift the block and throw back the pawl, w⁷, and I take advantage of this movement by connecting said pawl to the corresponding arm, w³, by a rod, w⁹. One of these outfits is provided by each sheave, k³, and it is obvious that the pulling up or disengagement of either of the five sheaves will impart rocking movement to the shaft, W. Such movement throws down the crank arm, W', and causes it to strike the detent, r', thereby disengaging the main clutch and stopping the machine. The long stretch of wire running over the loop sheaves, adjacent to each reel furnishes sufficient slack when the lower sheave, k³, is freed, and this slack will not be taken up by the feed rolls before the machine stops; hence there is no danger of putting excessive strain upon the wire between the feed rolls and the reel on which the wire is caught.

The bell crank, O', has a pin, O², which extends into substantial engagement with the pawl, r'. The free end O³ of the bellcrank, is normally held up by a pin or dog, O⁴, which is slidable in the post, O⁵, (see Figs. 31 to 34). This pin is a part of the armature, O⁶, of an electromagnet, O⁷; and a spring, O⁸, normally holds the pin beneath the bell crank end, but when the magnet, O⁷, is energized, the armature is drawn toward the same and the pin is withdrawn from beneath the bell crank; whereupon; a spring, O⁹, forcibly draws down the bell crank and causes it to disengage the detent from the clutch lever. To thus cause the energization of the magnet and stop the machine when the coils are obstructed between the coilers and the weaving channel, I arrange said coils to close the circuit of the magnet whenever they, the coils, are distorted.

Referring now to Figs. 1, 5, and 16, the part, O, represents a metal shield or cover which normally lies over the running coils. One of the electric terminals, O¹⁰, is connected with this shield; the other terminal, O¹¹, is connected with the table, A. A plate, O¹², of insulating material prevents contact between the bottoms of the coils and the table and normally the coils run through the cover, O, without contacting the same. But if a coil is obstructed it doubles up or bends and is thus thrown into contact with the metal cover, O; whereupon, the circuit of the electromagnet is closed through the cover or shield, the coil which is distorted, the coilers, and the metal frame whereon the coilers are mounted, causing the operation of the electromagnetic stop mechanism.

The particular embodiment of my invention, which is herein shown and described, possesses the advantages of simplicity, reliability, durability and accuracy in operation, and by its use I have been able to successfully produce coiled wire fabrics at much greater speed than has been possible in the past.

As numerous modifications of my invention will readily suggest themselves to one skilled in the art, I do not limit or confine the invention to the specific structure herein shown and described.

Having thus described my invention, I claim as new and desire to secure by Letters Patent:

1. In a wire coiling and weaving machine, the combination of mechanism for securing an unconnected pre-formed coil and the edge coil of a fabric in nested relation, with means for running another coil into the nested coils, to couple the same and thereby, at one operation, add two coils to the fabric, substantially as described.

2. In a wire coiling and weaving machine, the combination, of mechanism for securing a pre-formed coil and the edge coil of the fabric in parallelism and in substantial contact, with mechanism for running a coupling coil into the coils thus held, and mechanism for simultaneously pre-forming another coil beside the others, in non-interlocked relation thereto, substantially as described.

3. In a wire coiling and weaving machine, the combination of mechanism for securing the edge coil of a fabric and a pre-formed coil in parallelism and substantial contact, with mechanism for weaving another coil into the parallel coils to couple or interlock them, mechanism for forming still another coil and locating the same beside the others, means for releasing and for taking up the fabric and actuating the securing mechanism to hold the new edge coil thereof, and mechanism for shifting the last formed coil into substantial parallelism and contact with said new edge coil, substantially as described.

4. In a wire coiling and weaving machine, the combination, of mechanism for securing the edge coil of the fabric and a pre-formed coil in parallelism and substantial contact, i. e., in nested relation, with means for coiling and weaving a coupling coil into the held coils and for coiling and weaving in additional coils coaxial with said coupling coil to form a cord in the fabric, substantially as described.

5. In a wire coiling and weaving machine, the combination, with mechanism for securing the edge coil of the fabric and a pre-formed coil in parallelism and substantial contact, of means for coiling and weaving a coupling coil into the held coils and for coiling and weaving in additional coils coaxial with said coupling coil to form a cord in the fabric, and mechanism adapted to, in the same operation, coil and place a reserve coil parallel with said pre-formed coil, in readiness to take its place, substantially as described.

6. In a wire coiling and weaving machine, the combination, of mechanism for securing a pre-formed coil in parallelism and substantial contact with the edge coil of a fabric, with means for forming a like coil and therewith coupling said pre-formed and edge coils, mechanism for adding coils to said coupling coil to form a cord, means operable at substantially the same time for forming and placing a reserve coil adjacent to the other coils, said securing mechanism being operable to feed the completed fabric forward and secure the new edge coil thereof, and mechanism for transferring the reserve coil into substantially parallel contact with said new edge coil, after the operation of said securing mechanism, substantially as described.

7. In a wire coiling and weaving machine, the combination, of mechanism for holding the edge coil of a fabric, with a reserve coil holder, means for forming successive reserve coils therein, a transferring device for moving a reserve coil into parallelism and substantial contact with the held edge coil, means for holding the transferred coil in such relation, mechanism for coiling and weaving a coupling coil into the juxtaposed coils, the reserve coil forming mechanism being operable during the running of the coupling coils, and means for freeing and taking up the completed fabric and moving the new edge coil to the position occupied by the previous edge coil in readiness for the next reserve coil, substantially as described.

8. In a wire coiling and weaving machine, the combination, of mechanism for holding the edge coil of a fabric, with a reserve coil holder, means for forming successive reserve coils therein, a transferring device for moving a reserve coil into parallelism and substantial contact with the held edge coil, means for holding the transferred coil in such relation, mechanism for coiling and weaving a plurality of coupling coils into the juxtaposed coils to form a cord, the reserve coil forming mechanism being operable during the running of the coupling coils, and means for freeing and taking up the completed fabric and moving the new edge coil to the position occupied by the previous edge coil in readiness for the next reserve coil, substantially as described.

9. In a wire coiling and weaving machine, the combination, of mechanism for securing a pre-formed coil and the edge coil of a fabric body in parallelism and in substantial contact, then coupling said pre-formed and edge coils and forming a cord in the fabric by running in or interposing a plurality of interlocking coils, and at substantially the same time pre-forming another coil adjacent to the new edge of the fabric and then positioning the new edge coil of the fabric to receive the newly pre-formed coil, substantially as described.

10. In a wire coiling and weaving machine the combination, of mechanism for juxtaposing the edge coil of a fabric body and a pre-formed coil, with means for substantially simultaneously running in coupling and reserve coils, said juxtaposing mechanism being then operable to position the new edge of the fabric body to receive the reserve coil or coils, substantially as described.

11. In a wire coiling and weaving machine, mechanism for securing the edge coil of a fabric in position to receive another coil, in combination with means for holding an unconnected pre-formed coil nested against the same, and mechanism for running a coupling coil into the juxtapositioned coils, substantially as described.

12. In a wire coiling and weaving machine, the combination, of mechanism for securing the edge coil of a fabric in position to receive another coil, with means for moving and holding an unconnected pre-formed coil nested against the same, and mechanism for running a coupling coil into the juxtapositioned coils, substantially as described.

13. In a wire coiling and weaving machine, the combination, of mechanism for securing the edge coil of a fabric, with means for moving and holding a pre-formed coil against the same, mechanism for running a coupling coil into the juxtapositioned coils, and coil pre-forming mechanism operable simultaneously therewith, substantially as described.

14. In a wire coiling and weaving machine, the combination, of mechanism for securing the edge coil of a fabric, with means for moving and holding a pre-formed coil against the same, mechanism for running a coupling coil into the juxtapositioned coils, coil pre-forming mechanism operable simultaneously therewith, the mechanism which secures the edge coil being operable to release the same and fix the new edge coil in readiness for the next pre-formed coil, substantially as described.

15. In a wire coiling and weaving machine, mechanism for securing the edge coil of a fabric, in combination with means for moving and holding a pre-formed coil against the same, mechanism for running a coupling coil into the juxtapositioned coils, coil pre-forming mechanism operable simultaneously therewith, the mechanism which secures the edge coil being operable to release the same and fix the new edge coil in readiness for the next pre-formed coil, and a patterning mechanism adapted to interrupt the regular sequence of operations and add a series of coils to the new formed fabric, at times, before the release of the edge coil, substantially as described.

16. In a wire coiling and weaving machine, mechanism for relatively moving and holding a pre-formed coil and the edge coil of a fabric body in longitudinal non-interlocked contact, in combination with coiling mechanism, coil guiding and holding means coöperating therewith to simultaneously interlock a coupling coil with the juxtapositioned coils and place another coil beside the same, and coil severing means interposed between said coilers and said mechanism, substantially as described.

17. In a wire coiling and weaving machine, mechanism for placing the edge coil of a fabric body and a pre-formed coil in longitudinal non-interlocked substantial contact, in combination with weaving mechanism adapted to thereafter run a coupling coil into said coils, mechanism adapted to simultaneously run still another coil into parallel non-interlocked relation to the others, knives operable after the coils are run, and means for releasing the fabric and retaining its new edge coil in readiness for the repetition of such movements, substantially as described.

18. In a wire coiling and weaving machine, means for securing and holding the edge coil of a woven wire fabric, in combination, with a pre-formed coil holder, a coil transfer device for positioning a pre-formed coil against said edge coil, means for running a third coil into the juxtapositioned coils to couple them, means for running a reserve coil into said coil holder following the transfer of the pre-formed coil, suitable coil severing means and fabric feeding mechanism, operable in advance of the edge coil holding means, substantially as described.

19. In a wire coiling and weaving machine, means for first securing the edge coil of a woven wire fabric, in combination with means for securing a second coil beside said edge coil and means for simultaneously interlocking said coils and placing another coil beside them, coil severing means, and means for shifting the new edge of the fabric into position to receive the last named coil, substantially as described.

20. In a wire coiling and weaving machine, mechanism for securing the edge coil of a fabric body, in combination with a pre-formed-fabric-section holder, fabric section transferring means adapted to shift the pre-formed coil and move the first coil of said section against said edge coil, means for holding the coils in such position, and means for simultaneously running a coupling coil to join said section to the edge of the fabric and form a new fabric section, and suitable coil cutters, substantially as described.

21. In a wire coiling and weaving machine, mechanism for securing the edge coil of a fabric body, in combination with a pre-formed-fabric-section holder, fabric section transferring means adapted to shift the preformed section and move the first coil of said section against said edge coil, means for holding the coils in such position, and means for simultaneously running a coupling coil to join said section to the edge of the fabric and form a new fabric section, suitable coil cutters, and mechanism adapted to cause the edge coil holder to release said edge coil and move the new edge coil to the position occupied thereby, substantially as described.

22. In a wire coiling and weaving machine, a weaving channel and parts for therein securing the first or edge coil of a fabric body, in combination with means for then juxtaposing the first coil of a preformed fabric section against said edge coil, coilers and guides for then forming or weaving, adjacent to the last coil of said section, a reserve pre-formed fabric section having at least as many coils as the first mentioned section, and simultaneously running coils into the juxtaposed first coils and the last coil of said first mentioned section, suitable coil cutters and fabric take-up means, said channel parts being operable to release the completed fabric and position its new edge coil to receive the first of the coils of the second mentioned section, substantially as described.

23. In a wire coiling and weaving machine, a weaving channel and parts for therein securing the first or edge coil of a fabric body, in combination with means for then juxtaposing the first coil of a pre-formed fabric section against said edge coil, coilers and guides for then forming or weaving, adjacent to the last coil of said section, a reserve pre-formed fabric section having at least as many coils as the first mentioned section, and simultaneously running coils into the juxtaposed first coils and the last coil of said first mentioned section, suitable coil cutters, fabric take-up means, said channel parts being operable to release the completed fabric and position its new edge coil to receive the first of the coils of the second mentioned section, and patterning or cording mechanism adapted to interrupt the regular operation of said channel parts, coilers and take-up means, and run in additional coils to form a cord prior to the release of the completed fabric, substantially as described.

24. In a wire coiling and weaving machine, a weaving channel and parts for therein securing the first or edge coil of a fabric body, in combination with means for then juxtaposing the first coil of a pre-formed fabric section against said edge coil, coilers, and guides for then forming or weaving, adjacent to the last coil of said section, a reserve pre-formed fabric section having the same number and arrangement of coils as the first mentioned section, and simultaneously running coils into the juxtaposed first coils and the last coil of said first mentioned section, suitable coil cutters and fabric take-up means, said channel parts being operable to release the completed fabric and position its new edge coil to receive the first of the coils of the second mentioned section, substantially as described.

25. In a wire coiling and weaving machine, a weaving channel and parts for therein securing the first or edge coil of a fabric body, in combination with means for then juxtaposing the first coil of a pre-formed fabric section against said edge coil, coilers and guides for then forming or weaving, adjacent to the last coil of said section, a reserve pre-formed fabric section having the same number and arrangement of coils as the first mentioned section, and simultaneously running coils into the juxtaposed first coils and the last coil of said first mentioned section, suitable coil cutters, fabric take-up means, said channel parts being operable to release the completed fabric and position its new edge coil to receive the first of the coils of the second mentioned section, and patterning or cording mechanism adapted to interrupt the regular operation of said channel parts, coilers and take-up means, and run in additional coils to form a cord prior to the release of the completed fabric, substantially as described.

26. In a wire coiling and weaving machine, mechanism for holding the edge coil of a fabric body in position to receive a like coil, in combination with means for adding to said edge of the fabric body, in one operation, a plurality of like coils interlocked or interwoven in series, substantially as described.

27. In an automatic wire coiling and weaving machine, mechanism for holding the edge coil of a fabric body in position to receive a like coil, in combination with means for adding to said edge of the fabric body, in one operation, a plurality of like coils interlocked or interwoven in series, fabric feeding mechanism, and patterning mechanism operable in advance of said feeding mechanism to form a cord in the fabric, substantially as described.

28. In an automatic wire coiling and weaving machine, mechanism for holding the edge coil of a fabric body in position to receive a like coil, in combination with means for adding to said edge of the fabric body, in one operation, a plurality of like coils interlocked or interwoven in series, fabric feeding mechanism, and patterning mechanism operable in advance of said feeding mechanism to form a cord in said edge coil, substantially as described.

29. An automatic wire coiling and weaving machine comprising a weaving channel adapted to hold the edge coil of a fabric body and a plurality of other coils, in combination with mechanism for therein simultaneously weaving and connecting to said edge coil a fabric section composed of a plurality of coils, substantially as described.

30. An automatic wire coiling and weaving machine comprising a weaving channel adapted to hold the edge coil of a fabric body and a plurality of other coils, in combination with mechanism for therein simultaneously weaving and connecting to said edge coil a fabric section composed of a plurality of serially interlocked coils, substantially as described.

31. An automatic wire coiling and weaving machine, comprising a weaving channel adapted to hold the edge coil of a fabric body and a plurality of like preformed coils interlocked in series, in combination with mechanism for running a coupling coil into said edge coil and the first of the preformed coils, substantially as described.

32. An automatic wire coiling and weaving machine, comprising a weaving channel adapted to hold the edge coil of a fabric body and a plurality of like preformed coils interlocked in series, in combination with mechanism for running a coupling coil into said edge coil and the first of the preformed coils, fabric feeding mechanism, and means for placing another preformed section or series of interlocked coils in said channel preparatory to the running of the next coupling coil, substantially as described.

33. An automatic wire coiling and weaving machine comprising a weaving channel adapted to hold the edge coil of a fabric body and a plurality of other coils, in combination with mechanism for therein simultaneously weaving and connecting to said edge coil a fabric section composed of a plurality of serially interlocked coils, knives operable to sever the coils after the weaving operation, and suitable fabric feeding mechanism coacting with said channel, substantially as described.

34. An automatic wire coiling and weaving machine comprising a weaving channel adapted to hold the edge coil of a fabric body and a plurality of other coils, in combination with mechanism for therein simultaneously weaving and connecting to said edge coil a fabric section composed of a plurality of serially interlocked coils, knives operable to sever the coils after the weaving operation, suitable fabric feeding mechanism coacting with said channel, and a cording mechanism adapted for operation in advance of the fabric feeding mechanism, substantially as described.

35. An automatic wire coiling and weaving machine comprising a weaving channel adapted to hold the edge coil of a fabric body, in combination with mechanism for therein simultaneously connecting one section of fabric to said edge coil and forming a reserve section, substantially as described.

36. An automatic wire coiling and weaving machine, comprising a weaving channel adapted to hold the edge coil of a fabric body in position to receive a like coil and also adapted to hold a plurality of interlocked coils, in combination with means for shifting the first of said interlocked coils into substantial contact with said edge coil, and mechanism for running a coupling coil into the juxtapositioned coils and simultaneously weaving a new plurality of interlocked coils in said channel, substantially as described.

37. An automatic wire coiling and weaving machine comprising a weaving channel adapted to hold the edge coil of a fabric body, means for placing another coil in said channel, means in said channel for moving and holding the same against said edge coil, a coiler and a coil guide positioned to run a coupling coil into the coils thus held, a knife for severing the coupling coil, and fabric feeding means, substantially as described.

38. An automatic wire coiling and weaving machine comprising a weaving channel adapted to hold the edge coil of a fabric body, in combination with means in said channel for holding a preformed coil against said edge coil in position to be interlocked therewith by another coil, mechanism for simultaneously feeding another preformed coil into said channel and running a coupling coil into the juxtapositioned coils, suitable cut-off means, and said weaving channel being operable to free the completed fabric and secure the new edge coil preparatory to the next operation, substantially as described.

39. An automatic wire coiling and weaving machine, comprising a weaving channel adapted to hold the edge coil of a fabric body, in combination with means in said channel for holding a pre-formed coil against said edge coil in position to be interlocked therewith by another coil, mechanism for simultaneously feeding another preformed coil into said channel and running a coupling coil into the juxtapositioned coils, suitable cut-off means, and said weaving channel being operable to free the completed fabric and secure the first mentioned preformed coil in position to receive the second pre-formed coil in turn, substantially as described.

40. An automatic wire coiling and weaving machine, comprising a weaving channel adapted to hold the edge coil of a fabric body, in combination with means in said channel for holding a pre-formed coil against said edge coil in position to be interlocked therewith by another coil, mechanism for simultaneously feeding another pre-formed coil into said channel and running a coupling coil into the juxtapositioned coils to interlock them, auxiliary coil running means adapted to coact with the coupling coil running means, suitable cut-off knives, fabric feeding mechanism, and a patterning mechanism governing the running of said coils and serving to interrupt the normal action of said channel and fabric feeding means for the formation of cords in the fabric, substantially as described.

41. An automatic coiled wire fabric weaving machine, comprising a weaving channel and coacting parts adapted to contain and hold the edge coil of a fabric body and a plurality of interlocked coils, in combination with means for placing a plurality of interlocked coils in said channel and holding the first thereof in position to be interlocked with said edge coil, means for running a coupling coil into the juxtapositioned coils, means for feeding the completed fabric out of said channel, and mechanism for placing another series of interlocked coils in the channel in time to be interlocked with the new edge coil by the next coil from the coupling coil running in means, substantially as described.

42. An automatic coiled wire fabric machine, comprising a weaving channel in combination with means for therein positioning the edge coil of a fabric body and the first coil of a fabric section, and mechanism for simultaneously coupling the positioned coils and feeding another fabric section into said channel, substantially as described.

43. An automatic wire coiling and weaving machine, comprising a weaving channel, means for therein connecting a fabric section to a fabric body and forming a reserve fabric section, mechanism for shifting the reserve section to position it for connection with the preceding section, suitable cut-off means, and a fabric take-up mechanism, substantially as described.

44. An automatic wire coiling and weaving machine, comprising a weaving channel adapted to contain the edge coil of a fabric body and a fabric section in non-interlocked condition, in combination with means for running a coupling coil into said edge coil to interlock it with said section and means for simultaneously forming a reserve fabric section in said channel, auxiliary means, intermittently operable, to run further coils into said edge coil to form a cord, fabric section transferring or shifting means operable in said channel, suitable coil severing means, mechanism for periodically feeding the fabric from said channel, and a controlling mechanism which serves to periodically actuate said auxiliary means and interrupt the normal operation of the reserve section forming means, the fabric feeding means and the transferring means, substantially as described.

45. An automatic coiled wire fabric weaving machine, comprising a weaving channel adapted to simultaneously contain the edge coil of a fabric body and two reserve fabric sections, in combination with reserve section transferring means operable in said channel, reserve section forming means adapted to run interlocked coils into a part of the channel remote from the edge coil therein, means in the intermediate part of said channel for holding the coils of the reserve section in position to receive other coils, and means for running coils into the first and last coils of the intermediately positioned section to couple the same to the edge of the fabric and add to said section substantially simultaneously with the formation of the reserve section in said remote part of the channel, substantially as described.

46. An automatic coiled wire fabric weaving machine, comprising a weaving channel adapted to simultaneously contain the edge coil of a fabric body and two reserve fabric sections, in combination with reserve section transferring means operable in said channel, reserve section forming means adapted to run interlocked coils into a part of the channel remote from the edge coil therein, means in the intermediate part of said channel for holding the coils of the reserve section in position to receive other coils, and means for running coils into the first and last coils of the intermediately positioned section to couple the same to the edge of the fabric and add to said section substantially simultaneously with the formation of the reserve section in said remote part of the channel, and suitable fabric releasing and take-up mechanisms, substantially as described.

47. An automatic coiled wire weaving machine, comprising a weaving channel and means for therein holding the edge coil of a fabric body and a pre-formed fabric section, in combination with means for simultaneously running two coils into said channel to interlock said edge coil and said section and add to the width of said section, substantially as described.

48. An automatic coiled wire weaving machine, comprising a weaving channel and means for therein holding the edge coil of a fabric body and a pre-formed fabric section, in combination with means for simultaneously running two coils into said channel to interlock said edge coil and said section and add to the width of said section, and other means for simultaneously preforming a new section in said channel, substantially as described.

49. An automatic coiled wire weaving machine, comprising a weaving channel and means for therein holding the edge coil of a fabric body and a pre-formed fabric section, in combination with means for simultaneously running two coils into said channel to interlock said edge coil and said section and add to the width of said section, and other means for simultaneously preforming a new section in said channel, means being provided for shifting successive sections transversely in the channel and for securing successive edge coils of the fabric, substantially as described.

50. An automatic coiled wire weaving machine, comprising a weaving channel and parts coacting therewith to successively secure and release edge coils of the fabric, in combination with mechanism adapted, at each operation, to add a plurality of serially interlocked coils to the edge of the fabric, substantially as described.

51. An automatic coiled wire weaving machine, comprising a weaving channel and parts coacting therewith to successively secure and free edge coils of the fabric, in combination with mechanism adapted, at each operation, to add a plurality of serially interlocked coils to the edge of the fabric, and mechanism for running pluralities of non-interlocked coils into selected edge coils to pattern the fabric, substantially as described.

52. An automatic coiled wire weaving machine, comprising a weaving channel adapted to simultaneously contain the edge coil of a fabric body and a fabric section to be coupled thereto, in combination with means for intermittently feeding successive fabric sections transversely in said channel, intermittent fabric feeding means, parts adapted to alternately hold and free successive edge coils, and coupling coil running means, intermittently operable in the intervals between the feeding of said fabric sections, substantially as described.

53. An automatic coiled wire weaving machine, comprising a weaving channel adapted to simultaneously contain the edge coil of a fabric body and two non-interlocked fabric sections, in combination with means for running successive coupling coils and fabric sections into said channel, substantially as described.

54. An automatic coiled wire weaving machine, comprising a weaving channel adapted to simultaneously contain the edge coil of a fabric body and two non-interlocked fabric sections, in combination with means for running successive coupling coils and fabric sections into said channel, and means for feeding successive sections forward in the intervals between the runnings of the coils, substantially as described.

55. An automatic coiled wire weaving machine, comprising an edge coil holding device, in combination with means for running a first coil into an edge coil held by said device, means for simultaneously running a second coil adjacent thereto, fabric take-up mechanism, and means for feeding successive second coils forward in time to be interlocked by the first coil and to make room for the next second coil, and cutting means, operable in the interval between the running of the coils, substantially as described.

56. An automatic coiled wire fabric weaving machine, comprising a weaving channel and fabric take-up means, in combination with a multiple coiling mechanism adapted to run a plurality or group of coils into said channel simultaneously, coil severing means, operable after each operation of the multiple coiling mechanism, shifting mechanism adapted to transversely shift coils in said channel after being severed and to position the coils of each group to interlock with the coils of the succeeding group, substantially as described.

57. An automatic coiled wire fabric weaving machine, comprising a weaving channel and fabric take-up means, in combination with a multiple coiling mechanism adapted to run a plurality or group of coils into said channel simultaneously, coil severing means, operable after each operation of the multiple coiling mechanism, shifting mechanism adapted to transversely shift coils in said channel after being severed and to position the coils of each group to interlock with the coils of the succeeding group, and patterning mechanism adapted to interrupt the normal operation of the fabric feeding and coil shifting mechanisms and run in additional coils to form a cord in the portion of the fabric contained in the channel, substantially as described.

58. An automatic coiled wire fabric weaving machine, comprising a periodically operable edge coil holder, in combination with means for successively feeding preformed fabric sections into position to be interlocked with successive edge coils held in said holder, and periodically operable coupling coil running means at the end of the edge coil holder, substantially as described.

59. A coiled wire weaving machine, comprising a weaving channel, in combination with means for securing two coils in nested non-interlocked parallel substantial contact therein, coil forming means for running a coupling coil into said channel to interlock the said coils therein, and suitable fabric take-up means, substantially as described.

60. A coiled wire weaving machine, comprising a weaving channel, in combination with means for securing two coils in nested non-interlocked parallel substantial contact therein, coil forming means for running a coupling coil into said channel to interlock the said coils therein, and fabric take-up means, said weaving channel being adapted to always retain the last or edge coil of the fabric, substantially as described.

61. A coiled wire weaving machine, comprising a weaving channel, in combination with means longitudinally dividing said channel, mechanism coacting with said channel to secure two coils in non-interlocked parallel substantial contact in one division thereof, coil forming means for running a coil into said division to interlock the parallel coils, means for running another coil into the other division of said channel, fabric feeding means, said channel and coacting mechanism being adapted to always retain the last or edge coil of the fabric, and means for forcing successive coils from the latter division into the first division of the channel, substantially as described.

62. An automatic coiled wire weaving machine, comprising a weaving channel having a plurality of parallel coil holding divisions, in combination with means for moving coils transversely from one division to the other in series, edge coil holding means coacting with said channel, and means for running a plurality of coils into the several divisions of said channel, substantially as described.

63. A coiled wire weaving machine, comprising three parallel coil receivers, in combination with means for transferring coils from the third to the first receiver, mechanism for holding the edge coil of a fabric and another coil in close parallel relation in the first receiver, a coiler and its coil guide at the end of the first receiver, two coilers and coaxial guides at the end of the third receiver, coil severing means, and suitable fabric take-up mechanism, substantially as described.

64. A coiled wire weaving machine, comprising three parallel coil receivers, in combination with means for transferring coils from the third to the first receiver, mechanism for holding the edge coil of a fabric and another coil in close parallel relation in the first receiver, coilers and coil guides at the end of the first and third receivers for running coils thereinto, coil severing means between the coil guides and the receivers, and suitable fabric take-up mechanism, substantially as described.

65. An automatic coiled wire weaving machine, comprising parallel coil receivers, in combination with means coacting with one of said receivers to secure successive edge coils of the fabric in parallelism and substantial contact with another coil in said receiver, a multiple coiling mechanism adapted to run a plurality of coils into said receivers simultaneously, coil severing means located between said coiling mechanism and said receivers, and means for periodically transferring coils from one of said receivers to the other in advance of the running in of the coils, substantially as described.

66. A coiled wire weaving machine, comprising parallel coil receivers, in combination with means for transferring coils from one to the other, mechanism for holding the edge coil of a fabric and another coil in position to be interlocked by an incoming coil, a coiler and its coil guide at the end of the edge coil holding receiver for supplying the said incoming or coupling coil, and another coiler and coil guide at the end of the other receiver for running a coil into the same in advance of the operation of the transferring means, cutters for severing the coils from said coilers, and a suitable fabric take-up, substantially as described.

67. A coiled wire weaving machine, comprising three parallel coil receivers, in combination with means for transferring coils from one to the other of said receivers, mechanism coacting with the first receiver to secure two coils in close parallel relation therein, means for exerting take-up force on the first of the coils in the receiver, a coiler and coil guide situated at the end of said receiver for running a coupling coil into the same, a coiler and coil guide situated at the end of the second receiver for running a coil into the same, two coilers and coaxial coil guides at the end of the third receiver for running interlocked coils into the same, and coil severing means between said guides and receivers operable in advance of said transferring means, substantially as described.

68. A coiled wire weaving machine, comprising parallel coil receivers, in combination with means for transferring coils from one to the other, mechanism for holding the edge coil of a fabric and another coil in close parallel relation in one of said receivers, a coiler and its coil guide at the end of the first receiver, two coilers and coaxial guides, one a half pitch in advance of the other at the end of the third receiver, coil severing means, and suitable fabric take-up mechanism, substantially as described.

69. A coiled wire weaving machine, comprising parallel coil receivers, in combination with means for transferring coils from one to another, mechanism for holding the edge coil of a fabric and another coil in close parallel relation in one receiver, coilers and coil guides at the same end of the respective receivers for running coils thereinto, coil severing means between the coil guides and the receivers, and suitable fabric take-up mechanism, substantially as described.

70. A coiled wire weaving machine, comprising three parallel coil receivers, in combination with mechanism for holding the edge coil of a fabric and another coil in the first receiver in position to be interlocked by a third coil, a coiler and coil guide at the end of said first receiver for supplying said third coil, means for running other coils into the other two receivers simultaneously with the running of said third coil, fabric feeding mechanism operable upon said edge coil, coil severing means, and mechanism for transferring successive coils from the third to the first receivers, substantially as described.

71. A coiled wire weaving machine, comprising three parallel coil receivers, in combination with means for transferring coils from the third to the first receiver, a laterally operable means for holding said edge coil and a transferred coil in the first of said receivers, a coiler and coil guide at the end of the first receiver, a coiler and coil guide at the end of the second receiver, two coilers and coil guides at the end of the third receiver, means for actuating said coilers to simultaneously run coils into the three receivers, and suitable coil severing means between said guides and said receivers, substantially as described.

72. An automatic coiled wire weaving machine, comprising parallel coil receivers, in combination with means for transferring coils from one to the other, mechanism for holding the edge coil of a fabric and another coil in close parallel relation in one said receiver, a relatively fixed coiler and its coil guide at the end of the first receiver, two relatively fixed coilers and coaxial guides, one a half pitch in advance of the other at the end of the third receiver, coil severing means, and suitable fabric take-up mechanism, substantially as described.

73. A coiled wire weaving machine, comprising parallel coil receivers, in combination with means for transferring coils from one to the other, mechanism for holding the edge coil of a fabric and another coil in close parallel relation in one of said receivers, a coiler and its coil guide fixed with relation to and at the end of the first receiver, two coilers and coaxial guides, one a half pitch in advance of the other fixed with relation to and at the end of the third receiver, coil severing means, and suitable fabric take-up mechanism, substantially as described.

74. A coiled wire weaving machine, comprising three parallel coil receivers, in combination with means for transferring coils from one to the other of said receivers, mechanism coacting with the first receiver to secure two coils in close parallel relation therein, means for exerting take-up force on the first of the coils in the receiver, a coiler and coil guide situated at the end of said receiver and fixed with respect thereto for running a coupling coil into the same, a coiler and coil guide situated at and fixed with respect to the end of the second receiver for running a coil into the same, two coilers and coaxial coil guides at the end of and fixed with respect to the third receiver for running interlocked coils into the same, and coil severing means between said guides and receivers and operable in advance of said transferring means, substantially as described.

75. A coiled wire weaving machine, comprising fixed parallel coil receivers, in combination with means for transferring coils from one to the other, mechanism for holding the edge coil of a fabric and another coil in close parallel relation in one of said receivers, a coiler and its coil guide fixed at the end of the first receiver, two coilers and coaxial guides, one a half pitch in advance of the other fixed at the end of the third receiver, coil severing means, and suitable fabric take-up mechanism, substantally as described.

76. An automatic coiled wire weaving machine, comprising parallel coil receivers, in combination with means coacting with one of said receivers to secure successive edge coils of the fabric in parallelism and substantial contact with another coil in said receiver, a multiple coiling mechanism fixed with relation to said receivers and adapted to run a plurality of coils into said receivers, coil severing means located between said coiling mechanism and said receivers, and means for periodically transferring coils from one of said receivers to the other in advance of the running in of the coils, substantially as described.

77. An automatic coiled wire weaving machine, comprising parallel coil receivers, in combination with means coacting with one of said receivers to secure successive edge coils of the fabric in parallelism and substantial contact with another coil in said receiver, a multiple coiling mechanism fixed with relation to said receivers and adapted to run a plurality of coils into said receivers simultaneously, coil severing means located between said coiling mechanism and said receivers, and means for periodically transferring coils from one of said receivers to the other in advance of the running in of the coils, substantially as described.

78. A coiled wire weaving machine, mechanism for holding the edge coil of a fabric and another coil in position to be interlocked by an incoming coil, in combination with a coiler and its coil guide at the end of the edge coil holding receiver and fixed with relation thereto for supplying the said incoming or coupling coil and another coiler and coil guide for simultaneously running a coil beside the other coils, and means thereafter operable to feed forward the fabric and the last mentioned coils, and cutters for severing the coils from said coilers, substantially as described.

79. A coiled wire weaving machine, comprising three fixed parallel coil receivers, in combination with mechanism for holding the edge coil of a fabric and another coil in the first receiver in position to be interlocked by a third coil, a coiler and coil guide fixed at the end of said first receiver for supplying said third coil, other coilers and coil guides fixed at the ends of the second and third receivers respectively for running coils thereinto substantially simultaneously with the running of said third coil, fabric feeding mechanism operable upon said edge coil, coil severing means, and mechanism for transferring successive coils from the third to the first receivers, substantially as described.

80. A coiled wire weaving machine, comprising three longitudinally fixed parallel coil receivers, in combination with mechanism for holding the edge coil of a fabric and another coil in the first receiver in position to be interlocked by a third coil, a coiler and coil guide longitudinally fixed at the end of said first receiver for supplying said third coil, other coilers and coil guides longitudinally fixed at the ends of the second and third receivers respectively for running coils thereinto substantially simultaneously with the running of said third coil, fabric feeding mechanism operable upon said edge coil, coil severing means, and mechanism for transferring successive coils from the third to the first receivers, substantially as described.

81. An automatic wire coiling and weaving machine, comprising a weaving channel adapted to hold the edge coil of a fabric body and a plurality of like pre-formed coils interlocked in series, in combination with a coiler and coil guide at the end of the channel for running a coupling coil into said edge coil and the first of the pre-formed coils, fabric feeding mechanism, and means for placing another pre-formed section or series of interlocked coils in said channel preparatory to the running of the next coupling coil, substantially as described.

82. An automatic wire coiling and weaving machine, comprising a weaving channel adapted to hold the edge coil of a fabric body and a plurality of like pre-formed coils interlocked in series, in combination with a coiler and coil guide fixed with respect to the end of said channel for running a coupling coil into said edge coil and the first of the pre-formed coils, fabric feeding mechanism, and means for placing another pre-formed section or series of interlocked coils in said channel preparatory to the running of the next coupling coil, substantially as described.

83. In an automatic wire coiling and weaving machine, a weaving channel and mechanism for therein securing the edge coil of a fabric body, in combination with a pre-formed-fabric-section holding means in said channel, fabric section transferring means adapted to shift the pre-formed section in said channel and move the first coil of said section against said edge coil, means for holding the coils in such position, and a plurality of coilers and respective coil guides fixed with respect to said channel, for running a coupling coil into the same to join said section to the edge of the fabric and for simultaneously forming a new fabric section in said channel, suitable coil cutters, and mechanism adapted to cause the edge coil holder to release said edge coil and move the new edge coil to the position occupied thereby, in advance of the shifting of the newly formed section, substantially as described.

84. In an automatic wire coiling and weaving machine, a weaving channel and mechanism for therein securing the edge coil of a fabric body, in combination with a pre-formed-fabric-section holding means in said channel, fabric section transferring means adapted to shift the pre-formed section in said channel and move the first coil of said section against said edge coil, means for holding the coils in such position, and a plurality of coilers and respective coil guides fixed with respect to said channel, for running a coupling coil into the same to join said section to the edge of the fabric and for simultaneously forming a new fabric section in said channel, suitable coil cutters, mechanism adapted to cause the edge coil holder to release said edge coil and move the new edge coil to the position occupied thereby, in advance of the shifting of the newly formed section, selective mechanism controlling the operation of the several coilers, adapted to interrupt the regular operation and cause the addition of coils in said edge coil prior to the release thereof, substantially as described.

85. In an automatic wire coiling and weaving machine, a weaving channel and parts for therein securing the edge coil of a fabric body, in combination with means for juxtaposing the first coil of a pre-formed fabric section against said edge coil, coilers and guides fixed with respect to said channel for forming or weaving, adjacent to the last coil of said section, a reserve pre-formed fabric section having as many coils as the first mentioned section, and simultaneously running coils into the juxtaposed first coils and the last coil of said first mentioned section, suitable coil cutters, and fabric take-up means, said channel parts being operable to release the completed fabric and position its new edge coil to receive the first of the coils of the second mentioned section, substantially as described.

86. In an automatic wire coiling and weaving machine, a weaving channel and parts for therein securing the edge coil of a fabric body, in combination with means for juxtaposing the first coil of a pre-formed fabric section against said edge coil, coilers and guides fixed with respect to said channel for forming or weaving, adjacent to the last coil of said section, a reserve pre-formed fabric section having as many coils as the first mentioned section, and simultaneously running coils into the juxtaposed first coils and the last coil of said first mentioned section, suitable coil cutters, fabric take-up means, said channel parts being operable to release the completed fabric and position its new edge coil to receive the first of the coils of the second mentioned section and patterning or cording mechanism adapted to interrupt the regular operation of said channel parts, coilers and take-up means and run in additional cords to form a cord prior to the release of the completed fabric, substantially as described.

87. In a wire coiling and weaving machine, a weaving channel and co-acting mechanism for holding the edge coil of a fabric body in position to receive a like coil, in combination with multiple coiling mechanism fixed with respect to said channel for therein adding to said edge of the fabric body, in one operation, a plurality of like coils interlocked or interwoven in series, substantially as described.

88. In an automatic wire coiling and weaving machine, a receiver to contain a plurality of coils and mechanism for therein holding the edge coil of a fabric body in position to receive a like coil, in combination with means including a plurality of coil guides placed side by side at a fixed distance from said receiver for therein adding to said edge of the fabric body, in one operation, a plurality of like coils interlocked or interwoven in series, fabric take-up mechanism, suitable coil cutters, and means for actuating said mechanisms, means and cutters, substantially as described.

89. In an automatic wire coiling and weaving machine, a receiver to contain a plurality of coils and mechanism for therein holding the edge coil of a fabric body in position to receive a like coil, in combination with means including a plurality of coil guides placed side by side at a fixed distance from said receiver for adding to said edge of the fabric body, in one operation, a plurality of like coils interlocked or interwoven in series, suitable coil cutters, fabric take-up mechanism, and patterning mechanism operable in advance of said take-up mechanism to form a cord in the fabric, substantially as described.

90. In an automatic wire coiling and weaving machine, mechanism for holding the edge coil of a fabric body in position to receive a like coil, in combination with means including a plurality of coil guides placed side by side at a fixed distance from said mechanism for adding to said edge of the fabric body, in one operation, a plurality of like coils interlocked or interwoven in series, suitable coil cutters, fabric feeding mechanism, and patterning mechanism including a coiler for forcing additional coils through the first of said coil guides to form a cord in the fabric, substantially as described.

91. An automatic wire coiling and weaving machine, comprising a fixed weaving channel adapted to hold the edge coil of a fabric body and a plurality of other coils, in combination with a plurality of coilers and a plurality of coil guides fixed against longitudinal movement with respect to said channel for therein simultaneously weaving and connecting to said edge coil a fabric section partly composed of pre-formed coils, knives operable to sever the coils after the weaving operation, means for feeding successive pre-formed coils to weaving positions, and suitable fabric feeding mechanism coacting with said channel, substantially as described.

92. An automatic wire coiling and weaving machine, comprising a fixed weaving channel adapted to hold the edge coil of a fabric body and a plurality of other coils, in combination with a plurality of coilers and a plurality of coil guides fixed against longitudinal movement with respect to said channel for therein simultaneously weaving and connecting to said edge coil a fabric section partly composed of pre-formed coils, knives operable to sever the coils after the weaving operation, means for feeding successive pre-formed coils to weaving position, suitable fabric feeding mechanism coacting with said channel, and a cording mechanism governing the action of said coilers and channel adapted for operation in advance of the fabric feeding mechanism, substantially as described.

93. An automatic wire coiling and weaving machine, comprising a weaving channel adapted to hold the edge coil of a fabric body, in combination with a plurality of coilers variously positioned as to pitch but fixed with relation to said channel adapted to therein simultaneously connect one section of fabric to said edge coil and form a reserve section in the channel, substantially as described.

94. An automatic wire coiling and weaving machine, comprising a weaving channel and coacting mechanism adapted to first hold and then feed forward successive edge coils of a fabric body, in combination with a plurality of coilers variously positioned as to pitch but fixed with relation to said channel, adapted to therein connect a section of fabric to each edge coil and simultaneously form a reserve section in the channel, suitable coil cutters, and means for feeding successive reserve sections, substantially as described.

95. An automatic wire coiling and weaving machine, comprising a weaving channel and coacting mechanism adapted to first hold and then feed forward successive edge coils of a fabric body, in combination with a plurality of coilers variously positioned as to pitch but fixed with relation to said channel, adapted to therein connect a section of fabric to each edge coil and simultaneously form a reserve section in the channel, suitable coil cutters and means for feeding successive reserve sections, and patterning mechanism governing the actions of said coilers and feeding mechanisms, adapted to form predetermined cords in the fabric, substantially as described.

96. An automatic wire coiling and weaving machine, comprising a weaving channel and coacting mechanism adapted to first hold and then feed forward successive edge coils of a fabric body, in combination with a plurality of coilers and respective coil guides variously positioned as to pitch but fixed with relation to said channel, adapted to therein form coils to connect a section of fabric to each edge coil and simultaneously form a reserve section in the channel, suitable coil cutters, and means for feeding successive reserve sections, substantially as described.

97. An automatic wire coiling and weaving machine, comprising a weaving channel and coacting mechanism adapted to first hold and then feed forward successive edge coils of a fabric body, in combination with a plurality of coilers and respective coil guides variously positioned as to pitch but fixed with relation to said channel, adapted to therein form coils to connect a section of fabric to each edge coil and simultaneously form a reserve section in the channel, suitable coil cutters, means for feeding successive reserve sections, and patterning mechanism governing the actions of said coilers and feeding mechanisms, adapted to form predetermined cords in the fabric, substantially as described.

98. An automatic wire coiling and weaving machine, comprising a weaving channel and coacting mechanism adapted to first hold and then feed forward successive edge coils of a fabric body, in combination with a plurality of coilers and respective coil guides variously positioned as to pitch but fixed with relation to said channel, adapted to therein form coils to connect a section of fabric to each edge coil and simultaneously form a reserve section in the channel, suitable coil cutters, and means for feeding successive reserve sections transversely across said channel to position them for connection with respective edge coils, substantially as described.

99. An automatic wire coiling and weaving machine, comprising a weaving channel and coacting mechanism adapted to first hold and then feed forward successive edge coils of a fabric body, in combination with a plurality of coilers variously positioned as to pitch but longitudinally fixed with relation to said channel, adapted to therein form coils to connect a section of fabric to each edge coil and simultaneously form a reserve section in the channel, suitable coil cutters, and means for feeding successive reserve sections transversely across said channel to position them for connection with respective edge coils, substantially as described.

100. An automatic wire coiling and weaving machine, comprising a weaving channel adapted to hold the edge coil of a fabric body, in combination with a plurality of coilers variously positioned as to pitch but longitudinally fixed with relation to said channel adapted to therein simultaneously connect one section of fabric to said edge coil and form a reserve section in the channel, substantially as described.

101. An automatic wire coiling and weaving machine, comprising a weaving channel adapted to hold the edge coil of a fabric body, in combination with a plurality of coilers variously positioned as to pitch but longitudinally fixed with relation to said channel, adapted to therein simultaneously connect one section of fabric to said edge coil and form a reserve section in the channel, transversely operative section feeding mechanism, completed-fabric take-up means, and patterning mechanism selectively alternating certain of said coilers as and for the purpose specified.

102. An automatic wire coiling and weaving machine, comprising a weaving channel adapted to hold the edge coil of a fabric body, means for, at each operation, placing another coil in said channel, means in said channel for moving and holding the same against said edge coil, a coiler and a coil guide fixedly positioned with respect to said channel to run a coupling coil into the coils thus held, a knife for severing the coupling coil, and fabric feeding means, substantially as described.

103. An automatic wire coiling and weaving machine, comprising a weaving channel adapted to hold the edge coil of a fabric body, means for placing, at each operation, another coil in said channel, means in said channel for moving and holding the same against said edge coil, a coiler and a coil guide fixedly positioned with respect to said channel to run a coupling coil into the coils thus held, a knife for severing the coupling coil, and fabric feeding means, a second coiler, and a patterning mechanism for causing, at predetermined times, said second coiler to act in conjunction with the first mentioned coiler to form a cord in the fabric, substantially as described.

104. An automatic wire coiling and weaving machine, comprising a weaving channel adapted to hold the edge coil of a fabric body, in combination with means in said channel for holding a pre-formed coil against said edge coil in position to be interlocked therewith by another coil, fixed coilers and coil guides for simultaneously feeding another pre-formed coil into said channel and running a coupling coil into the juxtapositioned coils to interlock them, an auxiliary fixed coiler adapted to coact with the coupling coil guide, suitable cut-off knives, fabric feeding mechanism, and a patterning mechanism intermittizing said coilers and alternating the action of the first mentioned coilers with one thereof and said auxiliary coiler to pattern the fabric, substantially as described.

105. An automatic wire coiling and weaving machine, comprising a weaving channel adapted to hold the edge coil of a fabric body, in combination with means for placing, at each operation, another coil in said channel, means in said channel for moving and holding the same against said edge coil, a coiler and a coil guide positioned with respect to said channel to run a coupling coil into the coils thus held, a knife for severing the coupling coil, and fabric feeding means, a second coiler, and a patterning mechanism for causing, at predetermined times, said second coiler to repeatedly act in conjunction with the first mentioned coiler to form a cord in the fabric, substantially as described.

106. An automatic wire coiling and weaving machine, comprising a weaving channel and coacting mechanism adapted to hold and feed the edge coil of a fabric body, in combination with coilers and coil guides for placing, at each operation, other coils in said channel, means in said channel for moving and holding the first thereof against said edge coil, a coupling coil coiler and a coil guide positioned with respect to said channel to run a coupling coil into the coils thus held, a knife for severing the coupling and fabric feeding means, an auxiliary coiler, and a patterning mechanism for, at predetermined times, stopping the first mentioned coilers and causing said coupling and auxiliary coilers to repeatedly act in conjunction to form a cord in the fabric, substantially as described.

107. An automatic wire coiling and weaving machine, comprising a weaving channel and coacting mechanism adapted to contain the edge coil of a fabric body and a fabric section in non-interlocked condition, in combination with a coiler and coil guiding means for running a coupling coil into said edge coil to interlock it with said section, other coilers and coil guiding means for simultaneously forming a reserve fabric section in said channel, auxiliary coiling and coil guiding means positioned beside the coupling coil coiler, fabric section transferring or shifting means operable in said channel, suitable coil severing means, mechanism for periodically feeding the fabric from said channel, and a controlling mechanism which serves to intermittize said auxiliary means with respect to said coilers and run additional coils into the fabric body during the pause of the fabric feeding means and the transferring means, substantially as described.

108. An automatic wire coiling and weaving machine, comprising a weaving channel and coacting mechanism adapted to contain the edge coil of a fabric body and a fabric section in non-interlocked condition, in combination with a coiler and coil guiding means for running a coupling coil into said edge coil to interlock it with said section, other coilers and coil guiding means for simultaneously forming a reserve fabric section in said channel, auxiliary coiling and coil guiding positioned beside the coupling coil coiler means, said coilers, guiding means, and channel being relatively fixed, fabric section transferring or shifting means operable in said channel, suitable coil severing means, mechanism for periodically feeding the fabric from said channel, and a controlling mechanism which serves to intermittize said auxiliary means with respect to said coilers and run additional coils into the fabric body during the pause of the fabric feeding means and the transferring means, substantially as described.

109. An automatic wire coiling and weaving machine, comprising a longitudinally fixed weaving channel and coacting mechanism adapted to hold and feed the edge coil of a fabric body, longitudinally fixed coilers and coil guides for placing, at each operation, other coils in said channel, means in said channel for moving and holding the first thereof against said edge coil, a longitudinally fixed coiler and coupling coil guide for running a coupling coil into the coils thus held, a knife for severing the coils, an auxiliary longitudinally fixed coiler, a patterning mechanism, at predetermined times, stopping the first mentioned coilers and causing said coupling and auxiliary coilers to act in conjunction to form a cord between the held coils, and suitably timed actuating means for the several parts, substantially as described.

110. An automatic wire coiling and weaving machine, comprising a weaving channel and coacting mechanism adapted to contain the edge coil of a fabric body and a fabric section in non-interlocked condition, in combination with a coiler and coil guiding means for running a coupling coil into said edge coil to interlock it with said section, other coilers and coil guiding means for simultaneously forming a reserve fabric section in said channel, auxiliary coiling and coil guiding positioned beside the coupling coil coiler means, said coilers, guiding means and channel being relatively fixed, fabric section transferring or shifting means operable in said channel, suitable coil severing means, mechanism for periodically feeding the fabric from said channel, and a controlling mechanism which serves to intermittize said auxiliary means with respect to said coilers and run additional coils into the juncture of an interlocked section and fabric body after the operation of said coilers during predetermined weaving operations, substantially as described.

111. An automatic wire coiling and weaving machine, comprising a weaving channel adapted to hold the edge coil of a fabric body, in combination with a plurality of coilers variously positioned as to pitch but longitudinally fixed with relation to the end of said channel, adapted to therein simultaneously connect one section of fabric to said edge coil and form a reserve section in the channel, angularly positioned coil cutting knives adjacent to the end of the channel, transversely operative section feeding mechanism, and completed-fabric take-up means, as and for the purpose specified.

112. An automatic wire coiling and weaving machine, comprising a weaving channel adapted to hold the edge coil of a fabric body, in combination with a plurality of coilers variously positioned as to pitch but longitudinally fixed with relation to the end of said channel, adapted to therein simultaneously connect one section of fabric to said edge coil and form a reserve section in the channel, angularly positioned coil cutting knives adjacent to the end of the channel, transversely operative section feeding mechanism and completed-fabric take-up means, and patterning mechanism selectively alternating certain of said coilers, as and for the purpose specified.

113. An automatic wire coiling and weaving machine, comprising a weaving channel and coacting escapement mechanism adapted to hold the edge coil of a fabric body, in combination with a plurality of coilers and coil guides variously positioned as to pitch but fixed at the end of said channel, adapted to therein simultaneously connect one section of fabric to said edge coil and form a reserve section in the channel, coil cutting knives angularly positioned between said guides and the channel, transversely operative section feeding mechanism, and completed-fabric take-up means, substantially as described.

114. An automatic wire coiling and weaving machine, comprising a weaving channel and coacting escapement mechanism adapted to hold the edge coil of a fabric body, in combination with a plurality of coilers and coil guides variously positioned as to pitch but fixed at the end of said channel, adapted to therein simultaneously connect one section of fabric to said edge coil and form a reserve section in the channel, coil cutting knives angularly positioned between said guides and the channel, transversely operative section feeding mechanism, completed-fabric take-up means, and patterning mechanism periodically stopping said escapement mechanism and knives selectively alternating certain of said coilers to produce cords in the fabric, substantially as described.

115. An automatic wire coiling and weaving machine, comprising a weaving channel adapted to hold the edge coil of a fabric body and a plurality of other coils, in combination with a plurality of coilers and coil guides for therein simultaneously weaving and connecting to said edge coil a fabric section composed of a plurality of coils, and coil severing knives coacting with said guides and angularly disposed with reference to the channel, substantially as described.

116. An automatic wire coiling and weaving machine, comprising a weaving channel and a fabric feeding escapement coacting therewith to hold the edge coil of a fabric body and momentarily fix the relation thereof to a plurality of other coils, in combination with a plurality of coilers and coil guides for simultaneously weaving within said channel and connecting to said edge coil a fabric section composed of a plurality of coils, coil severing knives coacting with said guides and angularly disposed with reference to the channel, substantially as described.

117. In an automatic wire coiling and weaving machine, escapement mechanism for securing and feeding successive edge coils of a fabric body, in combination with a preformed-fabric-section holder, fabric section transferring means adapted to shift successive pre-formed sections and move the first coil of each said section against the edge coil, means for holding the coils in such position, a gang of coilers and guides for simultaneously running a coupling coil to join said section to the edge of the fabric and forming a new fabric section, and suitable knives disposed at various angles to the coil axes, substantially as described.

118. In an automatic wire coiling and weaving machine, a weaving channel, in combination with fabric feeding means for therein securing the first or edge coil of a fabric body, in combination with means for juxtaposing a pre-formed fabric section against said edge coil, coilers and guides for forming or weaving, adjacent to said section, a reserve pre-formed fabric section having as many coils as the first mentioned section, and simultaneously running a coil into the juxtaposed coils, suitable coil cutters relatively fixed with relation to said guides and angularly disposed with respect to the axes thereof, and fabric take-up means, substantially as described.

119. In an automatic wire coiling and weaving machine, a weaving channel and escapement parts for therein securing the edge coil of a fabric body, in combination with means for juxtaposing the first coil of a pre-formed plural coil fabric section against said edge coil, a gang of coilers and guides for forming or weaving, adjacent to the last coil of said section, a reserve pre-formed fabric section having as many coils as the first mentioned section and simultaneously running coils into the juxtaposed first coils and the last coil of said first mentioned section, suitable coil cutters angularly disposed between said guides and channel, fabric take-up means, said channel parts being operable to release the completed fabric and position its new edge coil to receive the first of the coils of the second mentioned section, substantially as described.

120. In an automatic wire coiling and weaving machine, a weaving channel and escapement parts for therein securing the edge coil of a fabric body, in combination with means for juxtaposing the first coil of a pre-formed plural coil fabric section against said edge coil, a gang of coilers and guides for forming or weaving, adjacent to the last coil of said section, a reserve pre-formed fabric section having as many coils as the first mentioned section and simultaneously running coils into the juxtaposed first coils and the last coil of said first mentioned section, suitable coil cutters angularly disposed between said guides and channel, fabric take-up means, said channel parts being operable to release the completed fabric and position its new edge coil to receive the first of the coils of the second mentioned section, and patterning or cording mechanism adapted to interrupt the regular operation of said channel parts, coilers and take-up means but continue the regular operation of said cutters and run in additional coils to form a cord prior to the release of the completed fabric, substantially as described.

121. In an automatic wire coiling and weaving machine, mechanism for holding the edge coil of a fabric body in position to receive a like coil, in combination with means for adding to said edge of the fabric body, in one operation, a plurality of like coils interlocked or interwoven in series, coil cutters individually and as a whole angularly disposed to the axes of the coils and fabric take-up mechanism, substantially as described.

122. In an automatic wire coiling and weaving machine, mechanism for holding the edge coil of a fabric body in position to receive a like coil, in combination with means for adding to said edge of the fabric body, in one operation, a plurality of like coils interlocked or interwoven in series, coil cutters individually and as a whole angularly disposed to the axes of the coils, fabric take-up mechanism, patterning mechanism operable in advance of said take-up mechanism to form in the same operation a cord in said edge coil, and said cutters being adapted to continue in regular operation at each running in of coils, substantially as described.

123. An automatic wire coiling and weaving machine, comprising a weaving channel and escapement mechanism adapted to hold the edge coil of a fabric body, in combination with means in said channel for holding a pre-formed coil against said edge coil in position to be interlocked therewith by another coil, fixed coilers and coil guides for simultaneously feeding another pre-formed coil into said channel and running a coupling coil into the juxtapositioned coils to interlock them, an auxiliary fixed coiler adapted to coact with the coupling coil guide, angularly disposed cut-off knives regularly coacting with said guides, fabric feeding mechanism, and a patterning mechanism intermittizing said coilers and alternating the action of the first mentioned coilers with one thereof and said auxiliary coiler to pattern the fabric, substantially as described.

124. In an automatic coiled wire weaving machine, a weaving channel adapted to contain a plurality of parallel coils in combination with an escapement mechanism at the outlet of said channel, a fabric take-up mechanism, a gang of coilers and coil guides, and coil severing knives between said guides and channel, said knives being angularly disposed away from the outlet portion of the channel, as and for the purpose specified.

125. In an automatic coiled wire weaving machine, a weaving channel adapted to contain a plurality of parallel interlocked and non-interlocked coils, in combination with an escapement mechanism at the outlet of said channel adapted to simultaneously free a plurality of coils from said channel and engage the final or edge coil, and multiple coiling mechanism for weaving a plurality of coils in said channel at each operation, substantially as described.

126. In an automatic coiled wire weaving machine, a weaving channel adapted to contain a plurality of parallel coils, in combination with an escapement mechanism at the outlet of said channel adapted to simultaneously free a plurality of serially interlocked coils from said channel and engage the final or edge coil, and multiple coiling mechanism for weaving or interlocking a plurality of coils in said channel at each operation, substantially as described.

127. In an automatic coiled wire weaving machine, a weaving channel adapted to contain a plurality of parallel coils, and an escapement mechanism co-acting with said channel to alternately free a plurality of serially interlocked coils, i. e., a fabric section) and hold the edge coil of the fabric substantially as described.

128. An automatic coiled wire weaving machine, comprising a weaving channel adapted to contain a plurality of coils, in combination with an escapement mechanism adapted to alternately free a plurality of coils from said channel and to hold the edge coil of a fabric, a gang of coiling mechanisms adapted to run a plurality of coils into said channel to both interlock said edge coil with the coils in the channel and form a reserved fabric section, suitable cut-off devices for severing the coils after they are run, and means for feeding forward successive reserved sections, following the operation of the escapement mechanism, substantially as described.

129. An automatic coiled wire weaving machine, comprising a weaving channel adapted to contain a plurality of coils, in combination with an escapement mechanism adapted to alternately free a plurality of coils from said channel and to hold the edge coil of a fabric, fabric take-up mechanism, a gang of coiling mechanisms adapted to run a plurality of coils into said channel to both interlock said edge coil with the coils in the channel and form a reserved fabric section, suitable cut-off devices for severing the coils after they are run, and means for feeding forward successive reserved sections, following the operation of the escapement mechanism, substantially as described.

130. An automatic coiled wire weaving machine, comprising a weaving channel and means for therein holding the edge coil of a fabric body and a pre-formed fabric section, in combination with means for simultaneously running two coils into said channel to interlock said edge coil and said section and add to the width of said section, and escapement mechanism adapted to alternately free a plurality of coils from the channel and hold the last or edge coil, substantially as described.

131. An automatic coiled wire weaving machine, comprising a weaving channel and means for therein holding the edge coil of a fabric body and a pre-formed fabric section, in combination with means for simultaneously running two coils into said channel to interlock said edge coil and said section and add to the width of said section, and other means for simultaneously pre-forming a new section in said channel, and an escapement at the outlet of said channel adapted to alternately free a plurality of coils from the channel and hold the last or edge coil in position to receive the new section, substantially as described.

132. An automatic coiled wire weaving machine, comprising a weaving channel and means for therein holding together the edge coil of a fabric body and a pre-formed fabric section, in combination with means for simultaneously running a plurality of coils into said channel to interlock said edge coil and said section and pre-form a new section in said channel, an escapement at the outlet of said channel adapted to free successive completed sections and secure successive edge coils, and means for shifting successive sections transversely in the channel into engagement with said holding means, substantially as described.

133. An automatic coiled wire weaving machine, comprising a weaving channel, in combination with an escapement mechanism adapted to intermittently free successively interlocked coils from said channel and constantly retain the edge coil therein, a fabric take-up mechanism, said channel being formed to simultaneously contain said edge coil and another coil in non-interlocked relation, transverse coil feeding means, and a plurality of coilers for running non-interlocked coils into said channel, substantially as described.

134. A coiled wire weaving machine, comprising a weaving channel and feeding means, in combination with means longitudinally dividing said channel and movable into and out of the same for securing two coils in non-interlocked parallel substantial contact in the outlet part of the channel and to permit coils to pass from one part to the other of the channel, coil forming means for running a coupling coil into the outlet part of said channel to interlock the said coils therein, and other coil forming means for running another coil into the other part of the channel, substantially as described.

135. A coiled wire weaving machine, comprising a weaving channel and fabric feeding means, in combination with relatively movable means in said channel for securing two coils in non-interlocked parallel substantial contact therein, coil forming means for running a coupling coil into said channel to interlock the said coils therein, other coil forming means for running another coil, said movable means serving to separate the latter coil from the others but adapted to permit transverse movement thereof in the channel, and transversely operable and shifting means in said channel, substantially as described.

136. A coiled wire weaving machine, comprising a weaving channel and fabric feeding means, in combination with relatively movable means in said channel for securing two coils in non-interlocked parallel substantial contact therein, coil forming means for running a coupling coil into said channel to interlock the said coils therein, other coil forming means for running another coil, said movable means serving to separate the latter coil from the others but adapted to permit transverse movement thereof in the channel, and means for transversely shifting such coils in the channels, substantially as described.

137. A coiled wire weaving machine, comprising a weaving channel and feeding means, in combination with means longitudinally dividing said channel and mechanism coacting with said channel to secure two coils in non-interlocked parallel substantial contact in one division thereof, coil forming means for running a coil into said division to interlock the parallel coils, means for running another coil into the other division of said channel, said channel and coacting mechanism being adapted to always retain the last or edge coil of the fabric, and means for forcing successive coils from the latter division past said dividing means into the first division of the channel, substantially as described.

138. An automatic coiled wire weaving machine, comprising a weaving channel having a plurality of parallel coil holding divisions, in combination with laterally movable longitudinal separators defining said divisions, means for moving coils transversely from one division to the other in series, said separators being formed to permit such movement, edge coil holding means coacting with said channel, and means for running a plurality of coils into the several divisions of said channel, substantially as described.

139. An automatic coiled wire weaving machine, comprising a weaving channel containing longitudinal separators or blades that normally divide it into three parallel coil receivers, in combination with means adapting the said separators to move out of the path of coils moving transversely in said channel, means for thus moving coils from one receiver to the other, a suitable fabric escapement mechanism, a gang of coilers adjacent to the end of said channel, and coil cutters between the coilers and channel, substantially as described.

140. An automatic coiled wire weaving machine, comprising a weaving channel containing longitudinal separators or blades that normally divide it into three parallel coil receivers, in combination with means adapting the said separators to move out of the path of coils moving transversely in said channel, means for thus moving coils from one receiver to the other, a suitable fabric escapement mechanism, a gang of coilers adjacent to the end of said channel, adapted to run coils into respective receivers, and coil cutters between the coilers and channel, substantially as described.

141. An automatic coiled wire weaving machine, comprising a weaving channel, in combination with a longitudinal separator movably arranged in said channel and dividing the same into distinct coil receivers, a coil transferring device, means for retracting said separator in advance of the operation of said device, and means for simultaneously running coils into said receivers, substantially as described.

142. An automatic coiled wire weaving machine, comprising a weaving channel and a fabric outlet or escapement mechanism, in combination with a longitudinal separator movably arranged in said channel and dividing the same into distinct coil receivers, coiling mechanisms for running coils into the respective receivers, a coil transferring device for shifting successive coils toward the outlet of the channel, and means for positively retracting said separator twice during each weaving operation, once in advance of said device and once to yield the completed section of fabric to said escapement mechanism, substantially as described.

143. An automatic coiled wire weaving machine, comprising a weaving channel and a fabric outlet or escapement mechanism, in combination with separators or blades normally dividing the channel into three parallel coil receivers, positive actuating means for one of said separators, yielding supporting means for the other, coil transferring means operable to move coils from the third to the first receiver, coiling mechanisms for respective receivers, coil cutting means, and a fabric take-up device, substantially as described.

144. An automatic coiled wire weaving machine, comprising a weaving channel and escapement mechanism, in combination with coilers situated at the end of the channel and adapted to run independent coils into the same, means in effect dividing the channel into parallel coil receivers and serving to maintain the courses of the running coils, cut-off knives, and means for transferring coils from one receiver to the other, substantially as described.

145. In an automatic coiled wire weaving machine, a weaving channel adapted to contain a plurality of parallel coils, in combination with a closure or knife edge normally securing the edge coil of a fabric in the outlet portion of said channel, a gang of coilers for running coils into the several portions of said channel, suitable coil cutters, and a fabric take-up device, substantially as described.

146. In an automatic coiled wire fabric weaving machine, a weaving channel adapted to contain a plurality of parallel coils formed or to be formed into a fabric section, in combination with a movable closure for said channel, said closure normally holding the edge coil of a fabric in the channel and when retracted serving to free the completed fabric from the channel, a plurality of coilers for running coils into the several portions of said channel, and suitable coil cutters, substantially as described.

147. In an automatic coiled wire fabric weaving machine, a weaving channel adapted to contain a plurality of coils side by side, in combination with a gang of coilers adapted to run a plurality of parallel coils into said channel, a movable closure or knife edge normally closing the channel and retaining the edge coil of the fabric therein, coacting escapement members for freeing completed fabric and yet retaining the edge coil thereof, a plurality of parallel coilers and coil guides at the end of the channel, and coil severing means, substantially as described.

148. An automatic coiled wire fabric weaving machine, comprising a weaving channel adapted to hold the edge coil of a fabric body and a plurality of like coils to be connected therewith, in combination with an escapement mechanism including a transversely movable knife edge normally retaining the edge coil of a fabric body in the channel, means in the channel for positioning a plurality of coils for connection with said edge coil, a plurality of coilers and coil guides at the end of the channel, coil cutters, and suitable coil transferring means, substantially as described.

149. An automatic coiled wire fabric weaving machine, comprising a plurality of parallel coil receivers, in combination with escapement mechanism including a closure, means for moving the same to allow coils to feed forward, i. e. transversely in the receivers, said closure normally retaining the edge coil of the fabric in the first of said receivers, a transferring device for moving coils from one receiver into substantial contact with the edge coil in the other, a plurality of parallel coilers and coil guides for running coils into said receivers, and suitable coil cutters, substantially as described.

150. An automatic coiled wire fabric weaving machine, comprising a weaving channel adapted to contain a plurality of parallel coils, in combination with a blade dividing said channel into distinct parallel receivers, coilers for running coils into said receivers, an escapement mechanism including a knife edge transversely movable with respect to said channel, a coil transferring device, and coil cutters, substantially as and for the purpose specified.

151. In an automatic coiled wire fabric weaving machine, a weaving channel, in combination with an escapement mechanism including a knife edge which serves as the closure for said channel, a coil separator which divides said channel longitudinally, a plurality of coilers running coils into the different parts of said channel, means for shifting coils transversely in the channel, a fabric take-up mechanism, means for actuating said shifting means and said knife edge, said separator coacting with said knife edge to retain the edge or last coil of the fabric when a completed section is liberated from the channel, substantially as described.

152. In an automatic coiled wire fabric weaving machine, a weaving channel adapted to contain a plurality of parallel coils, in combination with a coil separator movably arranged in said channel, a closure or knife edge normally securing the edge coil of a fabric in the outlet portion of said channel, a fabric take-up mechanism, a gang of coilers for running coils into the several portions of said channel, suitable coil cutters, and a coil transferring device arranged for movement after the operation of the coilers, substantially as described.

153. In a coiled wire fabric weaving machine, a weaving channel, in combination with a separator dividing said channel longitudinally, an escapement mechanism for normally retaining the edge coil of a fabric in one part of the channel, a coiler for running a coupling coil into said part of the channel, means for running interlocked coils into the other part of the channel, a coil transferring device adapted to move the first of the interlocked coils past said separator and lodge it against said edge coil, coil cutters, and suitable actuating mechanisms, substantially as described.

154. In an automatic coiled wire fabric weaving machine, a weaving channel and fabric feeding mechanism, in combination with a yielding coil separator in one wall of said channel, substantially as described.

155. In an automatic coiled wire fabric weaving machine, a weaving channel and fabric feeding mechanism, in combination with a coil separator in said channel and means for positively retracting said separator, as and for the purpose specified.

156. In an automatic coiled wire fabric weaving machine, a weaving channel, in combination with an escapement mechanism for retaining successive edge coils in the channel, a coupling coil coiler and guiding means, mechanism for feeding pre-formed coils successively and transversely against successive edge coils to be coupled thereto, and a separator in said channel and operating to prevent the feeding of more than one pre-formed coil at a time, substantially as described.

157. In an automatic coiled wire fabric weaving machine, a weaving channel, in combination with an escapement mechanism for retaining successive edge coils in the channel, a coupling coil coiler and guiding means, mechanism for feeding pre-formed coils successively transversely against successive edge coils to be coupled thereto, a separator in said channel and operating to prevent the feeding of more than one preformed coil at a time, means for throwing said feeding means out of action and for actuating said coiler to run in several coils to form a cord, substantially as described.

158. In an automatic coiled wire fabric weaving machine, a weaving channel and fabric feeding mechanism, in combination with a yielding coil separator in one wall of said channel and a plurality of coilers for running coils into said channel upon opposite sides of said separator, substantially as described.

159. In an automatic coiled wire fabric weaving machine, a weaving channel and fabric feeding mechanism, in combination with a coil separator in said channel, means for positively retracting said separator, and a plurality of coilers for running coils into said channel upon opposite sides of said separator as and for the purpose specified.

160. In an automatic coiled wire fabric weaving machine, a weaving channel, in combination with escapement, a separator normally projecting into the channel and dividing it into two receivers, coil guides fixed at the end of said receivers, suitable coilers, cut-off knives, and coil transferring means operable to transfer coils from one receiver to the other, substantially as described.

161. In an automatic coiled wire fabric weaving machine, a weaving channel, in combination with escapement mechanism, a separator normally projecting into the channel and dividing it into two receivers, coil guides fixed at the end of said receivers, suitable coilers, cut-off knives, coil transferring means operable to transfer coils from one receiver to the other, and mechanism for positively actuating said separator twice during each weaving operation, substantially as described.

162. In an automatic coiled wire fabric weaving machine, a weaving channel and suitable escapement mechanism, in combination with a plurality of fixed coil guides at the end of the channel, a plurality of coilers, and means in said channel for subjecting the running coils to tension, to thereby maintain the pitch relations of the several coils, substantially as described.

163. In an automatic coiled wire fabric weaving machine, a weaving channel and suitable escapement mechanism, in combination with a plurality of coil guides at the end of the channel, a plurality of coilers, and means for subjecting each running coil to tension within the channel whereby the pitch relations of the coils are maintained, substantially as described.

164. In an automatic coiled wire fabric weaving machine, a weaving channel comprising a plurality of coil receivers, in combination with a coil guide at the end of each said receiver, a coil cutter between each guide and the receiver, a plurality of coilers, means within said receiver for subjecting coils therein to tension to fix the pitch relations thereof, and suitable fabric feeding mechanism, substantially as described.

165. In an automatic coiled wire fabric weaving machine, a weaving channel comprising a plurality of transversely communicating parallel coil receivers or spaces, in combination with coilers at the end of the channel for running a plurality of parallel coils thereinto, means within the channel for subjecting each coil therein to tension, suitable coil cutters and escapement mechanism, and coil transferring means, substantially as described.

166. In an automatic coiled wire fabric weaving machine, a weaving channel comprising a plurality of transversely communicating parallel receivers or spaces, in combination with means common to said receivers for subjecting coils therein to tension, a coil transferring mechanism, fabric feeding mechanism, and suitable coiling mechanism, substantially as described.

167. In an automatic coiled wire fabric weaving machine, a plurality of transversely communicating weaving channels, a plurality of coil guides initially fixing the pitch relations of a plurality of coils corresponding to the receivers, means common to said receivers fixing the pitch relations of coils therein, and fabric feeding mechanism, substantially as described.

168. In an automatic coiled wire fabric weaving machine, a plurality of transversely communicating weaving channels, a plurality of coil guides initially fixing the pitch relations of a plurality of coils corresponding to the receivers, means common to said receivers fixing the pitch relations of coils therein, and fabric feeding mechanism adapted to intermittently secure successive edge coils of the fabric body in one of said receivers and coil transferring mechanism for shifting coils from one receiver to another, substantially as described.

169. In an automatic coiled wire fabric weaving machine, a weaving channel and suitable escapement mechanism at the outlet thereof, in combination with means dividing the said channel into parallel receivers, coil guides at the ends of said receivers initially determining the pitch relations of a plurality of coils, coilers for running coils through said guides into respective receivers, means fixing the turns of the several coils as they run in the receivers to maintain the pitch relations thereof, coil transferring means for shifting coils from one receiver to the other, and suitable coil cutters, substantially as described.

170. In an automatic coiled wire fabric weaving machine, a weaving channel, in combination with coilers for pre-forming coils in one part of said channel, means securing the edge coil of a fabric in another part of said channel, pre-formed coil shifting and holding means, coilers for running coils into said channel, coil cutters, and means fixing the pitch relations of said edge coil, said pre-formed coil and the running coils, substantially as described.

171. In an automatic coiled wire fabric weaving machine, a weaving channel, in combination with an escapement mechanism for securing the edge coil of a fabric in said channel, coilers and coil guides for pre-forming coils in said channel, means fixing the pitch relations of said edge and pre-formed coils within the channel, means for transferring successive pre-formed coils into substantial engagement with successive edge coils without changing the pitch relations thereof, and a coiler and coil guide for running a coupling coil into the edge and pre-formed coils when positioned, substantially as described.

172. In an automatic coiled wire fabric weaving machine, a weaving channel, in combination with an escapement mechanism for securing the edge coil of a fabric in said channel, means fixing the pitch relations of said edge and pre-formed coils within the channel, means for transferring successive pre-formed coils into substantial engagement with successive edge coils without changing the pitch relations thereof, and a coiler and coil guide for running a coupling coil into the edge and pre-formed coils simultaneously with the running of pre-formed or reserve coils, substantially as described.

173. In an automatic coiled wire fabric weaving machine, a weaving channel and suitable fabric feeding escapement mechanism, in combination with a gang of coilers and coil guides at the end of said channel, said channel being adapted to contain a plurality of coils and said coilers being adapted to run a plurality of coils into said channel, and means preventing endwise movement of both contained and running coils in the channel, substantially as described.

174. In an automatic coiled wire fabric weaving machine, a weaving channel and suitable fabric feeding and escapement mechanism, in combination with a gang of coilers and coil guides at the end of said channel, said channel being adapted to contain a plurality of coils and said coilers being adapted to run a plurality of coils into said channel, coil transferring mechanism, and coil cutters, substantially as described.

175. In an automatic coiled wire fabric weaving machine, a weaving channel, in combination with fabric feeding and escapement mechanism adapted to hold successive edge coils in said channel, a gang of coilers and guides for running a plurality of parallel coils into said channel, means in said channel normally preventing lateral movement of the coils therein, other means normally preventing endwise movement of the coils therein, transversely operative coil transferring mechanism, and coil severing means, operable in advance of said transferring mechanism, substantially as described.

176. In an automatic coiled wire fabric weaving machine, a weaving channel comprising a plurality of transversely connected coil receivers, in combination with transverse parts therein fixing the pitch relations of coils in said receivers, substantially as described.

177. In an automatic coiled wire fabric weaving machine, a weaving channel comprising a plurality of transversely connecting coil receivers, in combination with transverse parts therein fixing the pitch relations of coils in said receivers, suitable coil cutters, and means for periodically shifting coils in said receivers while held by the transverse parts therein, substantially as described.

178. In an automatic coiled wire fabric weaving machine, a weaving channel comprising a plurality of transversely communicating coil receivers, in combination with escapement mechanism adapted to secure the edge coil of a fabric body in one of said receivers, a coiler and coil guide for running a coil into said receiver, coiling and guiding mechanism for pre-forming a coil or coils in the communicating receiver, transverse parts in said receiver fixing the pitch relations of the coils therein, coil cutters, and coil transferring means, substantially as described.

179. In an automatic coiled wire fabric weaving machine, a weaving channel, in combination with a separator longitudinally dividing said channel into communicating coil receivers, an escapement mechanism coacting with one of said receivers and said separator to hold the edge coil of a fabric and a preformed coil, transverse parts in said receivers fixing the pitch relations of coils therein, and coil guides, coilers and coil cutters for respective receivers, substantially as described.

180. In an automatic coiled wire fabric weaving machine, a weaving channel, in combination with a separator longitudinally dividing said channel into communicating coil receivers, an escapement mechanism co-acting with one of said receivers and said separator to hold the edge coil of a fabric and a pre-formed coil, transverse parts in said receivers fixing the pitch relations of coils therein, coil guides and coilers for respective receivers, coil cutters, and coil transferring means, transversely operable in said receivers, as and for the purpose specified.

181. In an automatic coiled wire fabric weaving machine, a weaving channel, in combination with longitudinal members projecting into said channel and dividing the same into transversely communicating coil receivers, a fabric feeding escapement mechanism, transversely operative coil transferring means, transverse parts in and common to said receivers fixing the pitch relations of coils therein, coil cutters, and a gang of coilers and coil guides for running coils into said receivers, substantially as described.

182. In an automatic coiled wire fabric weaving machine, a weaving channel, in combination with longitudinal members projecting into said channel and dividing the same into transversely communicating coil receivers, a fabric feeding escapement mechanism, transversely operative coil transferring means, transverse parts in and common to said receivers fixing the pitch relations of coils therein, coil cutters, and a gang of coilers and coil guides for running coils into said receivers, one of said longitudinal members and said transverse parts coacting with said escapement mechanism to retain the edge of the fabric at fabric feeding moments, substantially as described.

183. In an automatic coiled wire fabric weaving machine, a weaving channel adapted to contain a plurality of parallel coils, in combination with a plurality of parallel coil guides at the end of said channel, coilers for running coils through said guides into said channel, an escapement mechanism at the outlet of said channel, coil cutters, means normally preventing either longitudinal or transverse movement of coils in the channel, and a coil transferring device, substantially as described.

184. In an automatic coiled wire fabric weaving machine, a weaving channel, in combination with longitudinal and laterally movable separator members normally dividing the channel into parallel coil receivers, a transversely operable closure normally closing said channel and serving to retain the edge coil of the fabric therein, means for running a coupling coil into that receiver from which the fabric is discharged, mechanism for running interlocked coils into another of said receivers, a plurality of transverse parts fixing the pitch relations of said coils within the channel, coil transferring means, means for retracting said closure and said transverse parts to liberate completed fabric, and one of said longitudinal members coacting with said closure to retain the edge coil at such time, substantially as described.

185. In an automatic coiled wire fabric weaving machine, a weaving channel, in combination with longitudinally arranged separator bars normally projecting into said channel and depressible to allow transverse movement of coils therein, a plurality of transverse parts in said channel for fixing the pitch relations of coils therein, a plurality of coil transferring devices operable in said channel, a knife edge closure for said channel, said knife edge and one of said bars coacting to retain the edge coil of the fabric at feeding moments, a gang of coilers, coil guides at the end of said channel, and suitable fabric take-up means, substantially as described.

186. In an automatic coiled wire fabric weaving machine, the combination of a series of coilers with a series of pins or projections located in the paths of the several coils from said coilers, whereby the coiled wires after leaving the coilers are subjected to and maintained at suitable tension and in predetermined relation by contact with said pins, and coil cutters interposed between said coilers and said pins, substantially as described.

187. In an automatic coiled wire fabric weaving machine, the combination of a plurality of substantially parallel coilers, with a series of pins or projections located in the path of the coils from said coilers and constructed to give tension thereto and maintain them in predetermined relation, and suitable co-acting escapement mechanism for feeding the completed fabric, substantially as described.

188. In an automatic coiled wire fabric weaving machine, the combination of a plurality of substantially parallel coilers with a series of pins or projections arranged transversely with respect to the paths of the coils from said coilers and constructed to give tension to and maintain the relations of said coils, and means for moving said pins, substantially as described.

189. In an automatic coiled wire fabric weaving machine, the combination with a plurality of substantially parallel coilers with a series of pins or projections located in the path of the coils from said coilers and constructed to give tension to and maintain the relations of said coils, and means for moving said pins to liberate certain of said coils at each operation, substantially as described.

190. In an automatic coiled wire fabric weaving machine, the combination with a plurality of substantially parallel coilers and a series of pins or projections located in the path of the coils from said coilers, said pins being constructed and positioned to tension said coils and fix the pitch relations thereof, means for altering the relation between certain coilers and the coils run therefrom to position them to be interlocked by coils next run and suitable fabric take-up mechanism for removing completed fabric from said pins, substantially as described.

191. In an automatic coiled wire fabric weaving machine, the combination of a plurality of substantially parallel coil guides and coilers with means for feeding wires thereto, and means arranged in the path of the coils running from said guides, adapted to urge the forward ends thereof ahead and thereby produce longitudinal tension in and fix the pitch relations of said coils, substantially as described.

192. In an automatic coiled wire fabric weaving machine, the combination of a plurality of wire coilers and respective coil guides with means for holding a plurality of previously formed coils in fixed pitch relation with respect to said guides to be interlocked by coils run from said guides, said means serving to tension and fix the pitch relations of the running coils with respect to the coils already held thereby, substantially as described.

193. In an automatic coiled wire fabric weaving machine, the combination of a plurality of wire coilers and respective coil guides with means for holding a plurality of previously formed coils in fixed pitch relation with respect to said guides to be interlocked by coils run from said guides, said means serving to tension and fix the pitch relations of the running coils with respect to the coils already held thereby, suitable coil-cutters, and fabric feeding means, substantially as described.

194. In an automatic coiled wire fabric weaving machine, the combination of a series of parallel pins and means for holding the edge coil of a fabric on the ends of said pins with means for running a coil upon said pins parallel with said edge coil, said pins serving to fix the pitch relations of all said coils, means for moving the last-named coil along said pins into engagement with said edge coil, means for running a coupling coil on said pins to interlock the coils thereon, and means for liberating the completed fabric from said pins, substantially as described.

195. In an automatic coiled wire fabric weaving machine, the combination of a series of parallel pins and means for holding the edge coil of a fabric on the ends of said pins with means for running a coil upon said pins parallel with said edge coil, said pins serving to fix the pitch relations of said coils, means for moving the last named coil along said pins into engagement with said edge coil, means for running a coupling coil on said pins to interlock the coils thereon, and means for liberating the completed fabric from said pins, said liberating means being formed to always retain the edge coil of the fabric upon said pins, substantially as described.

196. In an automatic coiled wire fabric weaving machine, the combination of a weaving channel, with means therein for tensioning and fixing the relations of a plurality of coils, a gang of coilers and coil guides variously positioned at the end of said channel, means for cutting off the coils at the end of the channel, and means for shifting the positions of coils in said channel to release certain of said coils and position others to receive succeeding coils from the coilers, substantially as described.

197. In an automatic coiled wire fabric weaving machine, the combination of a plurality of wire coilers with a receiver or channel having a longitudinal outlet, a plate projecting partially across the outlet of the receiver into the longitudinal space between two of the coils of the fabric for holding the edge coil in said receiver, coil guiding means in said receiver adapting the same for the simultaneous reception of a plurality of parallel coils, coil transferring means, and a plurality of variously positioned coil-cutters, substantially as described.

198. In a machine of the class described, the combination of a plurality of wire coilers with coil receivers, a plate partially projecting across said receivers into the longitudinal groove between two of the fabric coils for holding the edge coil in one of said receivers, and means for feeding the fabric from said receivers several coils at a time, substantially as described.

199. In a machine of the class described, the combination of a plurality of wire coilers with a plural receiver in alinement therewith to contain and receive a plurality of coils from said coilers, a plate or closure arranged to project partially across the receiver into the space between two coils of the fabric body, and means for retracting said plate to permit the coils to pass out of the receiver, substantially as described.

200. In an automatic wire coiling and weaving machine, the combination with a plurality of coilers, of a receiver or channel to receive coils from said coilers, suitable coil cutters, a series of pins located in said receiver for fixing the relations of the coils, edge coil holding means coacting therewith, and means for moving one or more coils in said receiver to position the same with respect to said edge coil without moving said edge coil, substantially as described.

201. In a machine of the class described, a weaving channel, in combination with edge coil holding and take-up means and transversely operative pre-formed coil shifting means, substantially as described.

202. In a machine of the class described, a plural coil channel or receiver, in combination with a plurality of spiral coil guides at the end thereof and variously positioned knives operable at the ends of respective guides, substantially as described.

203. In a machine of the class described, a weaving channel, in combination with a plurality of parallel spiral guides at the end thereof and knives adapted to coact with said guides to sever the wires and intermittently close the guides, substantially as described.

204. A coiled wire fabric weaving machine, comprising fixed parallel coil receivers, in combination with a series of coil pitch fixing pins extending transversely through said receivers, means for transferring coils from one to the other, escapement mechanism for holding the edge coil of a fabric, means in the edge receivers for holding another coil in close parallel relation to said edge coil, a coiler and its coil guide fixed at the end of the first receiver, two coilers and coaxial guides, one a half pitch in advance of the other fixed at the end of the third receiver, coil severing means, and suitable fabric take-up mechanism, substantially as described.

205. A coiled wire fabric weaving machine, comprising parallel coil receivers, in combination with means for transferring coils from one to another, mechanism for holding and feeding the edge coil of a fabric and another coil in close parallel relation in one receiver, coilers and coil guides at the same end of the respective receivers for running coils thereinto, coil severing means between the coil guides and the receivers, suitable fabric take-up mechanism, and a series of pins crossing said receivers for fixing the pitch relations of the coils therein, substantially as described.

206. A coiled wire fabric weaving machine, comprising three longitudinally fixed parallel coil receivers, in combination with a series of pins traversing said channel and adapted to engage the turns of and fix the pitch relations of the coils, mechanism coacting with said pins holding the edge coil of a fabric and another coil in the first receiver in position to be interlocked by a third coil, a coiler and coil guide longitudinally fixed at the end of said first receiver for supplying said third coil, other coilers and coil guides longitudinally fixed at the ends of the second and third receivers respectively for running coils thereinto substantially simultaneously with the running of said third coil, fabric feeding mechanism operable upon said edge coil, coil severing means, and mechanism for transferring successive coils from the third to the first receivers, substantially as described.

207. A coiled wire fabric weaving machine, comprising three parallel coil receivers, in combination with a series of coil pitch fixing pins movable in said receivers, means for transferring coils from the third to the first receiver, laterally operable means for holding said edge coil and a transferred coil in the first of said receivers, a coiler and coil guide at the end of the first receiver, a coiler and coil guide at the end of the second receiver, two coilers and coil guides at the end of the third receiver, means for actuating said coilers to simultaneously run coils into the three receivers, suitable coil severing means between said guides and said receivers, and means for simultaneously actuating said pins and the coil transferring means, substantially as described.

208. An automatic coiled wire fabric weaving machine, comprising fixed parallel coil receivers, in combination with means for transferring coils from one to the other, a series of pins in said receivers for fixing the pitch relations of the coils therein, mechanism for holding the edge coil of a fabric and another coil in close parallel relation in one of said receivers, a relatively fixed coiler and its coil guide at the end of the first receiver, two relatively fixed coilers and coaxial guides, one a half pitch in advance of the other at the end of the third receiver, coil severing means, and suitable fabric take-up mechanism, substantially as described.

209. A coiled wire fabric weaving machine, comprising parallel coil receivers, in combination with means for transferring coils from one to the other, mechanism for holding and feeding the edge coil of a fabric and another coil in close parallel relation in one of said receivers, a coiler and its coil guide at the end of the first receiver, two coilers and coaxial guides, one a half pitch in advance of the other at the end of the third receiver, and a series of pins in said channel fixing the pitch relations of all coils therein, coil severing means, and suitable fabric take-up mechanism, substantially as described.

210. A coiled wire fabric weaving machine, comprising parallel coil receivers, in combination with means for transferring coils from one to the other, mechanism for holding and feeding the edge coil of a fabric and another coil in close parallel relation in one of said receivers, a coiler and its coil guide at the end of the first receiver, two coilers and coaxial guides, one a half pitch in advance of the other at the end of the third receiver and a series of pins in said channel fixing the pitch relations of all coils therein and coacting with the holding and feeding means, coil severing means, and suitable fabric take-up mechanism, substantially as described.

211. A coiled wire fabric weaving machine, comprising three parallel coil receivers, in combination with a series of coil fixing pins extending transversely through said receivers, means for transferring coils from one to the other of said receivers, mechanism coacting with the first receiver to secure two coils in close parallel relation therein, means for exerting take-up force on the first of the coils in the receiver, a coiler and coil guide situated at the end of said receiver and fixed with respect thereto for running a coupling coil into the same, a coiler and coil guide situated at and fixed with respect to the end of the second receiver for running a coil into the same, two coilers and coaxial differently pitched coil guides at the end of and fixed with respect to the third receiver for running interlocked coils into the same, and coil severing means between said guides and receivers and operable in advance of said transferring means, substantially as described.

212. An automatic coiled wire fabric weaving machine, comprising parallel coil receivers, in combination with means coacting with one of said receivers to secure successive edge coils of the fabric in parallelism and substantial contact with another coil in said receiver, a multiple coiling mechanism fixed with relation to said receivers and adapted to run a plurality of coils into said receivers, coil pitch fixing means in said receivers, coil severing means located between said coiling mechanism and said receivers, and means for periodically transferring successive coils from one of said receivers to the other in advance of the running in of the coils, substantially as described.

213. An automatic wire coiling and weaving machine, comprising a weaving channel adapted to hold the edge coil of a fabric body and a plurality of like pre-formed coils interlocked in series, in combination with a coiler and coil guide at the end of the channel for running a coupling coil into said edge coil and the first of the pre-formed coils, fabric feeding mechanism, means for placing another pre-formed section or series of interlocked coils in said channel preparatory to the running of the next coupling coil, and a series of pitch fixing and fabric feeding pins in said channel, substantially as described.

214. In an automatic wire coiling and weaving machine, a weaving channel and mechanism for therein securing the edge coil of a fabric body, in combination with a series of pitch fixing coil holding pins in said channel, a pre-formed-fabric-section holding means in said channel, fabric section transferring means adapted to shift the pre-formed section in said channel and move the first coil of said section upon said pins bodily against said edge-coil, means for holding the coils in such position, and a plurality of coilers and respective coil guides fixed with respect to said channel, for running a coupling coil into the same to join the edge of the fabric and for said section to the edge of the fabric and for simultaneously forming a new fabric section in said channel, suitable coil cutters, and mechanism adapted to cause the edge coil holder to release said edge coil and move the new edge coil bodily to the position upon said pins previously occupied thereby in advance of the shifting of the newly formed section, substantialy as described.

215. In an automatic wire coiling and weaving machine, a weaving channel, in combination with mechanism for therein securing the edge coil of a fabric body, said mechanism including a series of pitch fixing pins in said channel, a pre-formed-fabric-section holding means in said channel, fabric section transferring means adapted to shift the pre-formed section upon said pins and move the first coil of said section against said edge coil, means for holding the coils in such position, and a plurality of coilers and respective coil guides fixed with respect to said channel, for running a coupling coil into the same to join said section to the edge of the fabric and for simultaneously forming a new fabric section in said channel, suitable coil cutters, actuating means adapted to cause said edge coil holder, including said pins, to release said edge coil and move the new edge coil to the position occupied thereby, in advance of the shifting of the newly formed section, selective mechanism controlling the operation of the several coilers, adapted to interrupt the regular operation and cause the addition of coils in said edge coil prior to the release thereof, substantially as described.

216. In an automatic wire coiling and weaving machine, a weaving channel, in combination with a knife edge closure, a series of coil pitch fixing pins in said channel for therein securing the edge coil of a fabric body, means for juxtaposing the first coil of a pre-formed fabric section against said edge coil, means for holding the coils in such relation, coilers and guides fixed with respect to said channel for forming or weaving, adjacent to the last coil of said section, a reserve pre-formed fabric section having as many coils as the first mentioned section and simultaneously running coils into the juxtaposed edge and first coils and the last coil of said fabric mentioned section, suitable coil cutters, fabric take-up means, the channel parts including said pins and knife edge being operable to release the completed fabric and position its new edge coil to receive the first of the coils of the second mentioned section, and patterning or cording mechanism adapted to interrupt the regular operation of the channel parts, coilers and take-up means and run in additional cords to form a cord prior to the release of the completed fabric, substantially as described.

217. In a wire coiling and weaving machine, mechanism for holding the edge coil of a fabric body in position to receive a like coil, in combination with a series of pins fixing the pitch relation of said coils, multiple coiling mechanism fixed with respect to said holding mechanism for adding to said edge of the fabric body, in one operation, a plurality of like coils interlocked or interwoven in series upon said pins, substantially as described.

218. In an automatic wire coiling and weaving machine, mechanism for holding the edge coil of a fabric body in position to receive a like coil, in combination with a series of coil pitch fixing pins to receive and hold the coils, means including a plurality of coil guides placed side by side at a fixed distance from said mechanism for adding to said edge coil of the fabric body, in one operation, a plurality of like coils interlocked or interwoven in series, suitable coil cutters, fabric feeding mechanism, and patterning mechanism operable in advance of said feeding mechanism, to form a cord in the fabric, substantially as described.

219. An automatic wire coiling and weaving machine, comprising a fixed weaving channel adapted to hold the edge coil of a fabric body and a plurality of other coils, in combination with a plurality of coilers and a plurality of coil guides fixed against longitudinal movement with respect to said channel for therein simultaneously weaving and connecting to said edge coil a fabric section partly composed of pre-formed coils, knives operable to sever the coils after the weaving operation, means for feeding successive pre-formed coils to weaving positions, suitable fabric feeding mechanism coacting with said channel, and a series of pins fixing the pitch relations of all coils therein, substantially as described.

220. An automatic wire coiling and weaving machine, comprising a weaving channel and a series of coil pitch fixing pins therein adapted to hold the edge coil of a fabric body and a plurality of other coils, in combination with a plurality of coilers variously positioned as to pitch but fixed with relation to said channel and pins, to therein and thereon simultaneously connect one section of fabric to said coil and form a reserve section in the channel, substantially as described.

221. An automatic wire coiling and weaving machine, comprising a weaving channel, an escapement closure and a series of coil pitch fixing pins in said channel together adapted to first hold and then feed forward successive edge coils of a fabric body, in combination with a plurality of coilers and respective coil guides variously positioned as to pitch but fixed with relation to said channel and pins, adapted to therein and thereon form coils to connect a section of fabric to each edge coil and simultaneously form a reserve section in the channel, variously positioned coil cutters for respective guides, means for feeding successive reserve sections forward upon said pins, and patterning or cording mechanism governing the actions of said coilers and feeding mechanisms, substantially as described.

222. An automatic wire coiling and weaving machine, comprising a weaving channel and coacting mechanism including a series of coil pitch fixing and transversely movable pins adapted to contain the edge coil of a fabric body and a fabric section in non-interlocked condition, in combination with a coiler and coil guiding means for running a coupling into said edge coil to interlock it with said section, other coilers and coil guiding means for simultaneously forming a reserve fabric section in said channel, auxiliary coiling and coil guiding means positioned beside the coupling coil coiler means, said coil guiding means and channel being relatively fixed, fabric section transferring or shifting means operable to shift the coils across the channel upon said pins, suitable coil severing means, mechanism coacting with said pins for periodically feeding the fabric from said channel, and a controlling mechanism which serves to intermittize said auxiliary means with respect to said coilers and run additional coils into the fabric body during the pause of the fabric feeding means and the transferring means, substantially as described.

223. An automatic wire coiling and weaving machine, comprising a longitudinally fixed weaving channel and coacting mechanism adapted to hold and feed the edge coil of a fabric body, longitudinally fixed coilers and coil guides for placing, at each operation, other coils in said channel, means in said channel fixing the pitch relations of the coils therein, means in said channel for moving and holding the first of said coils against said edge coil, a longitudinally fixed coiler and coupling coil guide for running a coupling coil into the coils thus held, a knife for severing the coils, an auxiliary and longitudinally fixed coiler, a patterning mechanism at predetermined times stopping certain of the first mentioned coilers and causing said coupling and auxiliary coilers to act in conjunction to form a cord between the held coils, and suitably timed actuating means for the several parts, substantially as described.

224. An automatic wire coiling and weaving machine, comprising a longitudinally fixed weaving channel and coating mechanism adapted to hold and feed the edge coil of a fabric body, longitudinally fixed coilers and coil guides for placing, at each operation, other coils in said channel, means in said channel fixing the pitch relations of the coils therein, means in said channel for moving and holding the first of said coils against said edge coil, a longitudinally fixed coiler and coupling coil guide for running a coupling coil into the coils thus held, a knife for severing the coils, an auxiliary and longitudinally fixed coiler, a patterning mechanism at predetermined times stopping certain of the first mentioned coilers and causing said coupling and auxiliary coilers to act in conjunction to form a cord between the held coils, means for regulating or changing the length of the coils, and suitably timed actuating means for the several parts, substantially as described.

225. In a wire coiling and weaving machine, the combination with mechanism for securing a pre-formed coil and the edge coil of the fabric in parallelism and in substantial contact, of mechanism for running a coupling coil into the coils thus nested, mechanism for simultaneously pre-forming another coil beside the others in non-interlocked relation thereto, and means for varying the length of the running coils, substantially as described.

226. In a wire coiling and weaving machine, the combination with mechanism for securing a pre-formed coil and the edge coil of the fabric in parallelism and in substantial contact, of mechanism for running a coupling coil into the coils thus nested, mechanism for simultaneously preforming another coil beside the others in non-interlocked relation thereto, and means for increasing the length of the coils as they run, substantially as described.

227. In a wire coiling and weaving machine, the combination with mechanism for securing a pre-formed coil and the edge coil of the fabric in parallelism and in substantial contact, of mechanism for running a coupling coil into the coils thus held, mechanism for simultaneously pre-forming another coil beside the others in non-interlocked relation thereto, and means for increasing the length of the coils as they run and other means for varying the length thereof at will, substantially as described.

228. In a wire coiling and weaving machine, the combination of mechanism for securing a preformed coil in parallelism and substantial contact with the edge coil of a fabric, with means for forming a like coil and therewith coupling said pre-formed and edge coils, mechanism for adding coils to said coupling coil to form a cord, means operable at substantially the same time for forming and placing a reserve coil adjacent to the other coils, said securing mechanism being operable to feed the completed fabric forward and secure the new edge coil thereof, mechanism for transferring the reserve coil into substantially parallel contact with said new edge coil, after the operation of said securing mechanism, and means for varying the length of the coils at will during the weaving operation, substantially as described.

229. In a wire coiling and weaving machine, mechanism for securing the edge coil of a fabric, in combination with means for holding or nesting a pre-formed coil against the same, means holding said coils at the same pitch, and mechanism for running a coupling coil into the juxtapositioned coils while thus held, substantially as described.

230. In a wire coiling and weaving machine, mechanism for securing the edge coil of a fabric, in combination with means for holding a pre-formed coil against the same and mechanism for running a coupling coil into the juxtapositioned coils and means for varying the lengths of the pre-formed and running coils, substantially as described.

231. In an automatic wire coiling and weaving machine, a weaving channel, in combination with fabric feeding means for therein securing the first or edge coil of a fabric body, means for juxtaposing a pre-formed fabric section against said edge coil, coilers and guides for forming or weaving, adjacent to said section, a reserve pre-formed fabric section having as many coils as the first mentioned section, and simultaneously running a coil into the juxtaposed coils, suitable coil cutters relatively fixed with relation to said guides and angularly disposed with respect to the axes thereof, fabric take-up means, and means for varying the length of the running coils, substantially as described.

232. In an automatic wire coiling and weaving machine, a weaving channel and escapement parts and a series of pitch fixing pins for therein securing the edge coil of a fabric body, in combination with means for juxtaposing the first coil of a pre-formed plural coil fabric section against said edge coil, a gang of coilers and guides for forming or weaving, adjacent to the last coil of said section, a reserve pre-formed fabric section having as many coils as the first mentioned section and simultaneously running coils into the juxtaposed first coils and the last coil of said first mentioned section, suitable coil cutters, fabric take-up means, and means for varying the length of the coils, said channel parts being operable to release the completed fabric and position its new edge coil to receive the first of the coils of the second mentioned section, substantially as described.

233. In an automatic wire coiling and weaving machine, a weaving channel and escapement parts and a series of pitch fixing pins for therein securing the edge coil of a fabric body, in combination with means for juxtaposing the first coil of a pre-formed plural coil fabric section against said edge coil, a gang of coilers and guides for forming or weaving, adjacent to the last coil of said section, a reserve pre-formed fabric section having as many coils as the first-mentioned section and simultaneously running coils into the juxtaposed first coils and the last coil of said first mentioned section, suitable coil cutters, fabric take-up means, means for varying the length of the coils, said channel parts being operable to release the completed fabric and position its new edge coil to receive the first of the coils of the second-mentioned section, and patterning or cording mechanism adapted to interrupt the regular operation of said channel parts, coilers and take-up means but continue the regular operation of said cutters and run in additional coils to form a cord prior to the release of the completed fabric, substantially as described.

234. In a wire coiling and weaving machine, mechanism for holding the edge coil of a fabric body in position to receive a like coil, in combination with multiple coiling mechanism fixed with respect to said holding mechanism for adding to said edge of the fabric body, in one operation, a plurality of like coils interlocked or interwoven in series, and means for regulating said coiling mechanism to vary the length of the coils, substantially as described.

235. An automatic wire coiling and weaving machine, comprising a weaving channel, intermittent coilers for running coils to therein connect a fabric section to a fabric body and form a reserve fabric section, mechanism for shifting the reserve section to position it for connection with the preceding section, suitable cut-off means, and means for varying the coil length, operable during the pause of said coilers, and a fabric take-up mechanism, substantially as described.

236. An automatic coiled wire weaving machine, comprising a weaving channel adapted to simultaneously contain the edge coil of a fabric body and two non-interlocked fabric sections, in combination with means for running successive coupling coils and fabric sections into said channel, means preventing bodily endwise movement of the coils in the channel, means for bodily moving them transversely therein, and coil length varying means, substantially as described.

237. A coiled wire weaving machine, comprising fixed parallel coil receivers, in combination with a series of coil pitch fixing pins extending transversely through said receivers, means for transferring coils from one to the other, escapement mechanism for holding the edge coil of a fabric, means in the edge receivers for holding another coil in close parallel relation to said edge coil, a coiler and its coil guide fixed at the end of the first receiver, two coilers and coaxial guides, one a half pitch in advance of the other fixed at the end of the third receiver, coil severing means, coil length varying means, and suitable fabric take-up mechanism, substantially as described.

238. A coiled wire weaving machine, comprising three parallel coil receivers, in combination with a series of coil pitch fixing pins movable in said receivers, means for transferring coils from the third to the first receiver, laterally operable means for holding said edge coil and a transferred coil in the first of said receivers, a coiler and coil guide at the end of the first receiver, two coilers and coil guides at the end of the third receiver, means for actuating said coilers to simultaneously run coils into the three receivers, coil length regulating means, suitable coil severing means between said guides and said receivers, and means for simultaneously actuating said pins and the coil transferring means, substantially as described.

239. In an automatic wire coiling and weaving machine, a weaving channel, in combination with mechanism for therein securing the edge coil of a fabric body, said mechanism including a series of pitch fixing pins in said channel, a pre-formed-fabric-section holding means in said channel, fabric section transferring means adapted to shift the pre-formed section upon said pins and move the first coil of said section against said edge coil, means for holding the coils in such position, and a plurality of coilers and respective coil guides fixed with respect to said channel, for running a coupling coil into the same to join said section to the edge of the fabric and for simultaneously forming a new fabric section in said channel, coiler regulating mechanism for varying the length of the coils, suitable coil cutters, actuating means adapted to cause said edge coil holder including said pins to release said edge coil and move the new edge coil to the position occupied thereby, in advance of the shifting of the newly formed section, selective mechanism controlling the operation of the several coilers, adapted to interrupt the regular operation and cause the addition of coils in said edge coil prior to the release thereof, substantially as described.

240. An automatic wire coiling and weaving machine, comprising a weaving channel, in combination with a gang of coilers, a corresponding gang of coil guides at the end of the channel, cut-off knives coacting with said guides, said guides and channel being fixed against longitudinal movement, and means for individually adjusting said coilers to vary the pitch of the coils, substantially as described.

241. In an automatic wire coiling and weaving machine, a fixed weaving channel having divisions for several parallel coils, in combination with coil pitch fixing means, an escapement member at the channel outlet, coil shifting means, coil cutters, coil guides fixed at the receiving ends of respective divisions of the channel and initially fixing the pitch relations of the coils in the channel, relatively fixed and individually adjustable coilers for running coils into respective guides, and means for forcing wires through said coilers, substantially as described.

242. In a machine of the class described, a weaving channel and an escapement or fabric feeding mechanism, in combination with a coil guide at the end of said channel, two coilers adapted to simultaneously run coils through said guide, and means for alternately operating one of said coilers and both thereof, substantially as described.

243. In a machine of the class described, a weaving channel and fabric feeding mechanism, in combination with a coil guide at the end of said channel, two coilers for running coils through said guide, means for driving wires into respective coilers, means normally intermitting one of said coilers, and a patterning mechanism for throwing the other into operation at predetermined times, substantially as described.

244. In a machine of the class described, a weaving channel, in combination with a coil guide at the end thereof, two coilers adjacent to said guide for delivering coils thereto, and means for alternating the operations of said coilers, substantially as described.

245. In a machine of the class described, a weaving channel and fabric feeding means, in combination with parallel coil guides at the end of said channel, coilers for delivering coils to said guides respectively, means for intermittently forcing wires through said coilers, and means for alternating the operations of said forcing means, substantially as described.

246. In a machine of the class described, a weaving channel and an escapement mechanism, in combination with two coil guides at the end of said channel, a coiler for delivering a coil to one of said guides, two coilers for delivering two coils to the other guide, means for regularly intermitting the operation of coilers belonging to two guides to weave ordinary fabric, and means for alternating the coilers to cord the fabric, substantially as described.

247. In a machine of the class described, a weaving channel adapted to contain a plurality of parallel coils, in combination with mechanism for fixing the edge coil of a fabric in the outlet of said channel, transfer mechanism for moving coils toward said edge coil to interlock therewith, a coupling coil guide, a plurality of coilers for running one or more coupling coils into said channel, another coiler and guide adapted to run another coil into said channel, and means for alternating the operations of said coilers to pattern the fabric, substantially as described.

248. In an automatic coiled wire fabric weaving machine, a weaving channel having a plurality of longitudinal divisions, in combination with a series of transverse pins movably arranged in said channel for fixing the pitch relations of coils therein, escapement mechanism, coil transferring means, coil guides at the ends of said channel, a gang of coilers for delivering coils to said guides, there being two coilers for the guide at the end of the outlet channel, patterning mechanism normally withholding one of the two coilers from action and adapted to put both thereof in operation and withhold the remainder from action, substantially as described.

249. An automatic wire coiling and weaving machine, comprising a weaving channel containing means to prevent endwise shifting of coils therein and adapted to hold the edge coil of a fabric body, in combination with escapement mechanism, a coiler and guide for placing, at each operation, another coil in said channel, means in said channel for moving and holding the latter against said edge coil, a coiler and a coupling coil guide positioned to run a coupling coil into the coils thus held, a second coiler, a patterning mechanism for, at predetermined times, interrupting the operation of the first mentioned coiler and causing said second coiler to repeatedly act in conjunction with said coupling coil guide to form a cord in the fabric, and intermittently operable coil cutters, substantially as described.

250. In a machine of the class described, a weaving channel adapted to receive a plurality of coils, in combination with a plurality of coilers for running coils into said channel, a pair of wire driving rolls for each of said coilers, said rolls being angularly disposed with reference to respective coilers, and means for operating and intermitting said rolls, substantially as described.

251. In a coiled wire fabric machine, the combination with plural coiling and weaving devices, of intermittently operated constantly driven feed rolls for feeding the wires to the several coilers, and means for controlling the movements of such rolls in time with said coiling and weaving devices, substantially as described.

252. In a coiled wire fabric machine, the combination with plural coiling and weaving devices, of intermittently operated constantly driven feed rolls for feeding the wires to the several coilers, and means for controlling the movements of such rolls to produce patterned fabric, substantially as described.

253. In a coiled wire fabric machine, the combination with plural coiling and weaving devices, of intermittently operated constantly driven feed rolls for feeding the wires to the several coilers, means for controlling the movements of said rolls in time with the operation of said coiling and weaving devices, and said means being adjustable to vary the length of the periods of operation of the rolls, substantially as described.

254. In a coiled wire fabric machine, the combination with plural coiling and weaving devices, of intermittently operated constantly driven feed rolls for feeding the wires to the several coilers, means timing the operation of said rolls upon the wires, said means being variable to vary the length of the coils, and means for alternating the operation of certain of said rolls to pattern the fabric, substantially as described.

255. In a coiled wire fabric machine, the combination with plural coiling and weaving devices, of intermittently operated feed rolls and means for relatively adjusting said rolls to produce patterned fabrics, substantially as described.

256. In a coiled wire fabric machine, the combination with a plurality of coilers, of a weaving channel to receive the coils therefrom, there being more coilers than are used in the weaving of ordinary fabric, and means for intermitting the operation of the remaining coilers to produce patterned fabric, substantially as described.

257. In a coiled wire fabric machine, the combination with a plurality of coilers, of a weaving channel to receive the coils therefrom, means co-acting with said channel to position the coils and feed the fabric, constantly driven wire feeding rolls for respective coilers, means for individually adjusting said rolls, and means timing said rolls and weaving devices, substantially as described.

258. In a coiled wire fabric machine, the combination of a gang of coilers and a gang of coil guides with weaving devices to receive the coils therefrom, coil-cutters, pairs of wire driving rolls for respective coilers, means for intermittently opening and closing said rolls upon the wires, and mechanism for suitably alternating said rolls to produce patterned fabric, substantially as described.

259. In a coiled wire fabric machine, the combination of a plurality of coilers with a weaving channel to receive coils from said coilers simultaneously, means in said channel for fixing and transferring coils to receive succeeding coils, suitable coil cutting means, driving rolls for forcing wires into said coilers, timing means ordinarily causing the intermittent operation of certain of said rolls and coilers, the cutters and the weaving means, and patterning mechanism adapted to interrupt such intermittent action and intermit other of said rolls to form cords in the fabric, substantially as described.

260. In a coiled wire fabric machine, the combination of a plurality of the coilers with a weaving channel to receive coils from said coilers simultaneously, coil pitch fixing means in said channel, coil transferring means operable in said channel, suitable coil cutting means, driving rolls for forcing wires into said coilers, timing means ordinarily causing the intermittent operation of certain of said rolls and coilers, the cutters and the weaving means, mechanism for throwing the weaving means out of action, and mechanism for then throwing other of said rolls into action to run additional coils into said channel to form cords, as and for the purpose specified.

261. In a coiled wire fabric machine, the combination of a plurality of coilers with a weaving channel to receive coils from said coilers simultaneously, means for positioning successive coils in said channel to receive succeeding coils, coil cutters, driving rolls for forcing wires into said coilers, timing means ordinarily causing the intermittent operation of certain of said rolls, coilers, cutters and weaving means, and means for interrupting such operation, substantially as described.

262. In a coiled wire fabric machine, the combination of a plurality of coilers with a weaving channel to receive coils from said coilers simultaneously, means for positioning successive coils in said channel to receive succeeding coils, coil cutters, driving rolls for forcing wires into said coilers, timing means ordinarily causing the intermittent operation of certain of said rolls, coilers, cutters and weaving means, means for interrupting such operation and causing the intermittent action of other rolls to cord the fabric, substantially as described.

263. In a coiled wire fabric machine, the combination of a plurality of coilers with a weaving channel to receive coils from said coilers simultaneously, coil cutters interposed between said coilers and channel, means for transferring coils in said channel, driving rolls for forcing wires into respective coilers, means for individually adjusting the pressure of said rolls upon respective wires, and mechanism for timing and intermitting the operations of said rolls and weaving channel, substantially as described.

264. In a coiled wire fabric machine adapted to automatically produce a single web of fabric, the combination of a plurality of coiling and weaving devices with intermittently operative mechanism for feeding wires to said coiling devices and mechanism automatically controlling the operation of said weaving devices and said feeding mechanism for the production of patterned fabric, substantially as described.

265. In a coiled wire fabric machine adapted to automatically produce a single web of fabric, the combination of a plurality of substantially parallel coilers with a weaving mechanism adapted to receive a plurality of coils from said coilers simultaneously and adapted to contain both a plurality of completed coils and a plurality of running coils, a plurality of pairs of wire driving rolls for forcing wires into respective coilers, and automatic timing and selecting mechanism controlling the relative action of said pair of driving rolls, to produce patterned fabric, substantially as described.

266. In a coiled wire fabric machine adapted to produce a single web of fabric, the combination of a plurality of coilers with a plurality of coil guides, weaving mechanism adapted to simultaneously contain a plurality of completed coils and receive a plurality of running coils from said coilers, suitable coil cutters, a plurality of pairs of individually operative and continuously rotated wire driving rolls, pressure exerting means therefore, and timing means properly relating said rolls, weaving mechanism and cutters, substantially as described.

267. In a coiled wire fabric machine adapted to produce a single web of fabric, the combination of a plurality of coilers with a plurality of coil guides, weaving mechanism adapted to contain a plurality of completed coils and simultaneously receive a plurality of running coils from said coilers, suitable coil cutters, a plurality of pairs of individually operative and spring pressed continuously rotated wire driving rolls, and timing means properly relating said rolls, weaving mechanism and cutters, substantially as described.

268. In a coiled wire fabric machine adapted to produce a single web of fabric, the combination of a plurality of coilers with a plurality of coil guides, weaving mechanism adapted to contain a plurality of completed coils and simultaneously receive a plurality of running coils from said coilers, suitable coil cutters, a plurality of pairs of individually operative and spring pressed continuously rotated wire driving rolls, and timing means properly relating said rolls, weaving mechanism and cutters, and manual means for throwing any pair of said rolls out of action, substantially as described.

269. In a coiled wire fabric machine adapted to produce a single web of fabric, the combination of a plurality of coilers with a plurality of coil guides, weaving mechanism adapted to contain a plurality of completed coils and simultaneously receive a plurality of running coils from said coilers, suitable coil cutters, a plurality of pairs of individually operative, spring pressed, continuously rotated wire driving rolls, and timing means properly relating said rolls, weaving mechanism and cutters, and means coacting therewith to vary the relative times of operation thereof, substantially as described.

270. In a coiled wire fabric machine adapted to produce a single web of fabric, the combination of a plurality of coilers with a plurality of coil guides, weaving mechanism adapted to contain a plurality of completed coils and simultaneously receive a plurality of running coils from said coilers, suitable coil cutters, a plurality of pairs of individually operative, spring pressed, continuously rotated wire driving rolls, cams operable to separate said rolls, and timing mechanism properly relating said cams, weaving mechanism and cutters, substantially as described.

271. In a coiled wire fabric machine adapted to produce a single web of fabric, the combination of a plurality of coilers with a plurality of coil guides, weaving mechanism adapted to contain a plurality of completed coils and simultaneously receive a plurality of running coils from said coilers, suitable coil cutters, a plurality of pairs of individually operative, spring pressed, continuously rotated wire driving rolls, cams operable to separate said rolls, other cams for separating said rolls, and patterning mechanism for actuating the same, substantially as described.

272. In a coiled wire fabric machine adapted to produce a single web of fabric, the combination of a plurality of coilers with a plurality of coil guides, weaving mechanism adapted to contain a plurality of completed coils and simultaneously receive a plurality of running coils from said coilers, suitable coil cutters, a plurality of pairs of intermittently operative and spring pressed rolls for driving wires into respective coilers, timing mechanism properly relating said rolls, weaving mechanism and cutters, and individual manual lock out devices for said rolls, substantially as described.

273. In a coiled wire fabric machine adapted to produce a single web of fabric, the combination of a plurality of coilers, weaving mechanism adapted to contain a plurality of parallel completed coils and simultaneously receive a plurality of running coils from said coilers, suitable coil cutters, and individual manual lock out devices for said coilers, substantially as described.

274. In a coiled wire fabric machine adapted to produce a single web of fabric, the combination of a plurality of coilers, weaving mechanism adapted to contain a plurality of parallel completed coils and simultaneously receive a plurality of running coils from said coilers, suitable coil cutters, selective lock out devices for said coilers, and mechanism adapted to operate the same according to a predetermined pattern, substantially as described.

275. In a coiled wire fabric machine adapted to automatically produce a single web of fabric, the combination of a plurality of coiling and weaving devices for coiling and weaving varying pluralities of coils in successive operations, with intermittently operated mechanism for feeding the wires to the coiling devices, and mechanism controlling respective feeding mechanisms of said coiling devices to produce patterned fabric, substantially as described.

276. In a coiled wire fabric machine adapted to automatically produce a single web of fabric, the combination of a plurality of coiling and weaving devices, with intermittently operated mechanism for feeding the wires to coiling devices, and means controlling the feeding mechanism for patterning said fabric, substantially as described.

277. In an automatic coiled wire fabric weaving machine adapted to produce a single web of fabric, a weaving channel, in combination with an escapement mechanism, means for fixing the pitch relations of coils and simultaneously receive a plurality of running coils, a plurality of coil guides occupying different positions at the end of said channel, a plurality of coilers for supplying coils to respective guides, means upon each coiler for varying the pitch of the coil produced thereby, suitable coil cutters, pairs of driving rolls for forcing wires into said coilers, and automatic means for intermitting and alternating the operations of said rolls to produce patterned fabric, substantially as described.

278. In a machine of the class described adapted to automatically produce a single web of coiled wire fabric, a weaving channel adapted to simultaneously contain a plurality of completed coils and receive a plurality of running coils, in combination with a plurality of coilers, a plurality of pairs of driving rolls for forcing wires through respective coilers, automatic intermittent means for separating said rolls in time with the operation of the weaving mechanism, springs constantly pressing one of each pair of said rolls upon the other, and a manually operative lock-out device for the movable roll of each pair, substantially as described.

279. In a machine of the class described, an elongated table, in combination with a weaving mechanism longitudinally arranged thereon, a gang of wire driving rolls upon said table at the end of said mechanism, coilers interposed between said rolls and mechanism, coil guides and cutters also interposed, suitable driving means, timing mechanism for intermitting the operation of said weaving mechanism, knives, coilers and rolls, pattern mechanism actuated by said driving mechanism for constantly withholding certain of said rolls from action and adapted to alternate certain thereof to produce patterned fabric, a plurality of wire reels arranged at the side of the table, and sheaves guiding wires from the reels to respective driving rolls, substantially as described.

280. In a machine of the class described, an elongated table, in combination with a weaving mechanism longitudinally arranged thereon, a gang of wire driving rolls upon said table at the end of said mechanism, coilers interposed between said rolls and mechanism, coil guides and cutters also interposed, suitable driving means, timing mechanism for intermitting the operation of said weaving mechanism, knives, coilers and rolls, pattern mechanism actuated by said driving mechanism for constantly withholding certain of said rolls from action and adapted to alternate certain thereof to produce patterned fabric, a plurality of wire reels arranged at the side of the table, and a plurality of tension maintaining wire carrying sheaves interposed between each reel and the corresponding driving rolls, substantially as described.

281. In a machine of the class described, an elongated table, in combination with a weaving mechanism longitudinally arranged thereon, a gang of wire driving rolls upon said table at the end of said mechanism, coilers interposed between said rolls and mechanism, coil guides and cutters also interposed, suitable driving means, timing mechanism for intermitting the operation of said weaving mechanism, knives, coilers and rolls, pattern mechanism actuated by said driving mechanism for constantly withholding certain of said rolls from action and adapted to alternate certain thereof to produce patterned fabric, a plurality of wire reels arranged at the side of the table, a plurality of wire carrying sheaves interposed between each reel and corresponding driving rolls, a stop mechanism for throwing said driving means out of operation to stop the machine and certain of said sheaves being movable by too taut wires and operatively connected with said stop mechanism, substantially as described.

282. In a machine of the class described, an elongated table, in combination with a weaving mechanism longitudinally arranged thereon, a gang of wire driving rolls upon said table at the end of said mechanism, coilers interposed between said rolls and mechanism, coil guides and cutters also interposed, suitable driving means, timing mechanism for intermitting the operation of said weaving mechanism, knives, coilers and rolls, pattern mechanism actuated by said driving mechanism for constantly withholding certain of said rolls from action and adapted to alternate certain thereof to produce patterned fabric, a plurality of wire reels arranged at the side of the table, a plurality of wire carrying and tensioning sheaves interposed between each reel and corresponding driving rolls, a stop mechanism for throwing said driving means out of operation to stop the machine and certain of said sheaves being movable by too taut wires and operatively connected with said stop mechanism, substantially as described.

283. In a machine of the class described, an elongated table, in combination with a weaving mechanism longitudinally arranged thereon, a gang of wire driving rolls upon said table at the end of said mechanism, coilers interposed between said rolls and mechanism, coil guides and cutters also interposed, suitable driving means, timing mechanism for intermitting the operation of said weaving mechanism, knives, coilers and rolls, pattern mechanism actuated by said driving mechanism for constantly withholding certain of said rolls from action and adapted to alternate certain thereof to produce patterned fabric, a plurality of wire reels arranged at the side of the table, a vertical guide rod adjacent to each reel, a sheave movably mounted on each rod, coacting loop forming sheaves on the table, there being a plurality of sheaves between each reel and its respective driving rolls, stop mechanism, means operatively connecting the same with all said movable sheaves for operation by either thereof, and parts resisting the movement of said movable sheaves except when respective wires become too taut, substantially as described.

284. In an automatic coiled wire fabric weaving machine, a plurality of coilers, in combination with a driven shaft having fixed bearings, a plurality of wire driving rolls fixed on said shaft, a plurality of corresponding movable rolls parallel with said shaft for operation with respective fixed rolls, independent mountings for said movable rolls, pairs and gears constantly connecting respective pairs of rolls, springs acting upon said respective mountings, a shaft parallel with said movable rolls, cams thereon for moving said mountings against said springs to separate respective pairs of rolls, and means for intermittently operating said shaft and cams, substantially as described.

285. In an automatic coiled wire fabric weaving machine, a plurality of coilers, in combination with a driven shaft having fixed bearings, a plurality of wire driving rolls fixed on said shaft, a plurality of corresponding movable rolls parallel with said shaft for operation with respective fixed rolls, independent mountings for said movable rolls, pairs and gears constantly connecting respective pairs of rolls, springs acting upon said respective mountings, a shaft parallel with said movable rolls, cams thereon for moving said mountings against said springs to separate respective pairs of rolls, means for intermittently operating said shaft and cams, and means for varying the period of operation of said shaft to vary the operating periods of said rolls, substantially as described.

286. In an automatic coiled wire fabric weaving machine, a plurality of coilers, in combination with a driven shaft having fixed bearings, a plurality of wire driving rolls fixed on said shaft, a plurality of corresponding movable rolls parallel with said shaft for operation with respective fixed rolls, independent mountings for said movable rolls, pairs and gears constantly connecting respective pairs of rolls, springs acting upon said respective mountings, a shaft parallel with said movable rolls, cams thereon for moving said mountings against said springs to separate respective pairs of rolls, a second shaft, cams thereon for engagement with said mountings to alternately separate and permit the closing of certain of said pairs of rolls, and a pattern mechanism for actuating said second shaft, substantially as described.

287. In an automatic coiled wire fabric weaving machine, a plurality of coilers, in combination with a driven shaft having fixed bearings, a plurality of wire driving rolls fixed on said shaft, a plurality of corresponding movable rolls parallel with said shaft for operation with respective fixed rolls, independent mountings for said movable rolls, pairs and gears constantly connecting respective pairs of rolls, springs acting upon said respective mountings, a shaft parallel with said movable rolls, cams thereon for moving said mountings against said springs to separate respective pairs of rolls, a second shaft, cams thereon for engagement with said mountings to alternately separate and permit the closing of certain of said pairs of rolls, and a constantly driven pattern mechanism for actuating said second shaft, substantially as described.

288. In an automatic coiled wire fabric weaving machine, a plurality of coilers, in combination with a driven shaft having fixed bearings, a plurality of wire driving rolls fixed on said shaft, a plurality of corresponding movable rolls parallel with said shaft for operation with respective fixed rolls, independent mountings for said movable rolls, pairs and gears constantly connecting respective pairs of rolls, springs acting upon said respective mountings, a shaft parallel with said movable rolls, cams thereon for moving said mountings against said springs to separate respective pairs of rolls, means for intermittently operating said shaft and cams, and means for varying the period of operation of said shaft to vary the operating periods of said rolls, and a constantly driven pattern cam for actuating said second shaft, substantially as described.

289. In a machine of the class described, a plurality of coilers, in combination with a shaft mounted for rotation adjacent thereto, a plurality of wire driving rolls mounted on said shaft and having their tops substantially in the plane of said coilers, a corresponding plurality of movable driving rolls, levers whereon said movable rolls are respectively and independently mounted, gears connecting the pairs of upper and lower rolls, springs acting on said levers, and manual means for moving said levers at will, substantially as described.

290. In a machine of the class described, a plurality of coilers, in combination with a shaft mounted for rotation adjacent thereto, a plurality of wire driving rolls mounted on said shaft and having their tops substantially in the plane of said coilers, a corresponding plurality of movable driving rolls, levers whereon said movable rolls are respectively and independently mounted, gears connecting the pairs of upper and lower rolls, springs acting on said levers, and automatic timing mechanism for moving said levers, substantially as described.

291. In a machine of the class described, a plurality of coilers, in combination with a shaft mounted for rotation adjacent thereto, a plurality of wire driving rolls mounted on said shaft and having their tops substantially in the plane of said coilers, a corresponding plurality of movable driving rolls, levers whereon said movable rolls are respectively and independently mounted, gears connecting the pairs of upper and lower rolls, springs acting on said levers, automatic timing mechanism for moving said levers, and pattern mechanism also operative upon said levers, substantially as described.

292. In a machine of the class described, a plurality of coilers, in combination with a shaft mounted for rotation adjacent thereto, a plurality of wire driving rolls mounted on said shaft and having their tops substantially in the plane of said coilers, a corresponding plurality of movable driving rolls, levers whereon said movable rolls are respectively and independently mounted, gears connecting the pairs of upper and lower rolls, springs acting on said levers, manual means for moving said levers at will, an automatic timing mechanism for moving said levers, and pattern mechanism also operative upon said levers, substantially as described.

293. A wire propelling head for coiled wire weaving machines comprising suitable bearings and a shaft held in said bearings, a plurality of thin disks fixed on said shaft, respective thin gears also fixed thereon, levers pivoted above said shaft, bosses thereon, thin disks and gears for rotation on respective bosses for constant coaction with respective disks and gears on said shaft, springs connected with said levers and constantly contending to force the fixed and movable rolls together, and mechanism for actuating said levers to separate said rolls, substantially as described.

294. A wire propelling head for coiled wire weaving machines comprising suitable bearings and a shaft held in said bearings, a plurality of thin disks fixed on said shaft, respective thin gears also fixed thereon, levers pivoted above said shaft, bosses thereon, thin disks and gears for rotation on respective bosses for constant coaction with respective disks and gears on said shaft, springs connected with said levers and constantly contending to force the fixed and movable rolls together, and selective timing mechanism for positively actuating said levers, substantially as described.

295. In an automatic coiled wire fabric weaving machine, a plurality of coilers, in combination with a plurality of pairs of driving rolls therefor, the lower of said rolls being fixed upon a constantly driven shaft, gears connecting respective lower and upper rolls, levers whereon said upper rolls are respectively mounted, individual springs for said levers, means for adjusting the same, a common stop for said levers to prevent flattening of the wires between said rolls, and selective mechanism for intermittently and alternately actuating said levers, as and for the purpose specified.

296. In a machine for weaving coiled wire fabric, a weaving channel, in combination with a plurality of spiral coil guides fixed in the mouth of said channel and having angled ends from the tops of which the coils emerge, a knife head, a plurality of knives disposed at various angles to coöperate with respective guides, and means for intermittently operating said head for each movement of coils through said guides, substantially as described.

297. In an automatic coiled wire fabric weaving machine, a weaving channel, in combination with coaxial spiral coil guides in said channel, one of said spiral guides being a half pitch in advance of the other, and coilers for running coils into said guides, substantially as described.

298. In an automatic coiled wire fabric weaving machine, a weaving channel, in combination with coaxial spiral coil guides in said channel, one of said spiral guides being a half pitch in advance of the other, and coilers for running coils into said guides, and a single cut-off knife coacting with said guides, substantially as described.

299. In a machine of the class described, adapted to weave a single web of fabric, a weaving channel adapted to simultaneously contain completed coils and receive a plurality of running coils, in combination with a plurality of coilers, a plurality of coil guides, and a plurality of simultaneously operative cut-off knives, substantially as described.

300. In an automatic coiled wire fabric weaving machine, a weaving channel, in combination with a coil separating blade arranged in the wall of said channel, means for actuating said blade, a second blade in said channel, said blades dividing said channel into three coil receiving divisions, means preventing endwise movement of coils in said channel, transfer bars transversely operative in said channel, and an escapement device at the outlet of the channel, substantially as described.

301. In an automatic coiled wire fabric weaving machine, adapted to weave or serially interlock a plurality of coils at each operation, a weaving channel, in combination with a longitudinal member dividing the channel into two coil receiving divisions, a plurality of pins movable transversely in said channel, an escapement member or channel closure normally engaged with the edge coil of the fabric and adapted to retract to a position back of said longitudinal member to free a plurality of coils from the channel, substantially as described.

302. In an automatic coiled wire fabric weaving machine, a plurality of coilers, in combination with wire driving means, a plurality of parallel coil guides, a weaving channel positioned to simultaneously receive a plurality of coils from said guide, an escapement member at the outlet of said channel, a series of transverse pins adapted to simultaneously receive and hold a plurality of coils and coacting with said escapement member, a plurality of coil transferring bars or fingers operable in said channel, coil separating bars movable in the bottom of said channel and in effect dividing the channel into transversely communicating coil receivers, and rocking shafts parallel with said channel for actuating said escapement member, said pins and said fingers, substantially as described.

303. In an automatic coiled wire fabric weaving machine, coiling and weaving mechanisms adapted to add a plurality of coils to the fabric web at each operation, in combination with a take-up roll above the same and means for spinning said roll in a forward direction at the end of each weaving operation, substantially as described.

304. In an automatic coiled wire fabric weaving machine, coiling and weaving mechanisms adapted to add a plurality of serially interlocked coils to the fabric web at each operation, in combination with a take-up roll above the same and means for spinning said roll in a forward direction at the end of each weaving operation and means preventing backward rotation of said roll, substantially as described.

305. In an automatic coiled wire fabric weaving machine, coiling and weaving mechanisms including fabric feeding means, in combination with a take-up roll above said feeding means and means for suddenly spinning said roll upon its axis at each operation of the feeding means, substantially as described.

306. In an automatic coiled wire fabric weaving machine, coiling and weaving mechanisms including fabric feeding means, in combination with a take-up roll above said feeding means and means for suddenly spinning said roll upon its axis at each operation of the feeding means and means preventing backward rotation of said roll, substantially as described.

307. In an automatic coiled wire fabric weaving machine, coiling and weaving mechanisms, in combination with means for intermittently operating the same, a fabric take-up roll, a single direction clutch, and a reciprocating strap or chain intermittently and positively actuated for spinning said roll, substantially as described.

308. In a machine of the class described, a fabric take-up roll, in combination with suitable supports therefor, a clutch member on said roll having a plurality of peripheral recesses having inclined bottoms, rolls loosely arranged in said recesses, a coacting cup like clutch member adapted on forward rotation to engage the other member through the medium of said rolls, and means for rotatively oscillating said cup like member to spin said rolls, substantially as described.

309. In a wire coiling and weaving machine, coiling and weaving mechanisms including a fabric escapement, in combination with a take-up roll, arms pivoted adjacent to said weaving mechanism and having vertically movable hooks for engagement with the fabric web above said mechanism, and means for moving the hook arms into and out of engagement with the fabric web in advance of and after the operation of said escapement, substantially as described.

310. In an automatic coiled wire fabric weaving machine, a table, in combination with coiling and weaving mechanism thereon, a fabric take-up roll over which the fabric runs, fabric cutting and crushing devices below the table to receive the edges of the fabric, a rotative shaft beneath said table and cams thereon for actuating said knives and crushers, and said knives, crushers and cams being longitudinally adjustable beneath said table, substantially as described.

311. In an automatic coiled wire fabric weaving machine, a table, in combination with a wire reel suspended therefrom, a vertical rod adjacent to said reel, a wire loop forming sheave upon said table and rod, the latter being movable vertically upon said rod, and a stop mechanism member actuated by the vertical movement of the same, substantially as described.

312. In an automatic coiled wire fabric weaving machine, a table, in combination with coiling and weaving mechanisms thereon, driving means, a longitudinally disposed rock shaft, stop mechanism for actuation thereby, a plurality of reels beside said table, wire guiding sheaves movable adjacent to respective reels, and mechanism operatively connecting each of said movable sheaves with said rocking shaft, substantially as described.

313. In an automatic coiled wire fabric weaving machine, a plurality of coiling and weaving mechanisms adapted to produce patterned fabric at the rate of a plurality of coils per operation, in combination with an electrical contact plate interposed between said coiling and weaving devices, whereby with any and all coils are adapted to engage if obstructed, driving means, a clutch, and electro-magnetic clutch-releasing means in circuit with said plate, substantially as described.

314. In an automatic coiled wire fabric weaving machine, coiling and weaving mechanisms, in combination with driving means therefor, a clutch, a clutch shifter, a latch for securing the clutch in operative position, a plurality of wire reels, means interposed between each reel and the corresponding coiling device adapted to operate in case the wire becomes too taut, a rocking shaft adapted for operation by any and all of said interposed means and formed to free said latch, an electric contact plate interposed between said coiling and weaving devices for engagement by the running coils, and electro-magnetic latch-releasing means in circuit with the running coils and said plate, substantially as and for the purpose specified.

315. In an automatic coiled wire fabric and weaving machine, coiling and weaving devices, in combination with driving means properly relating said coiling and weaving devices, a timing mechanism determining the periods of operation thereof, a friction disk, and a friction wheel shiftable thereon for varying the speed of rotation of said timing disk, substantially as described.

316. In an automatic coiled wire fabric and weaving machine, coiling and weaving devices, in combination with driving means properly relating said coiling and weaving devices, a timing mechanism determining the periods of operation thereof, a friction disk and a friction wheel shiftable thereon for varying the speed of rotation of said timing disk, a pattern cam also driven by said friction disk, and means for disconnecting the weaving devices upon positive operation of said cam, substantially as described.

317. In an automatic coiled wire fabric weaving machine, wire driving rolls, coilers and weaving devices, in combination with a driving shaft, periodic intermitting means variably driven from said driving shaft, and a clutch actuated thereby for intermitting the operation of said rolls and weaving devices, substantially as described.

318. In an automatic coiled wire fabric weaving machine, wire driving rolls, coilers and weaving devices, in combination with a driving shaft, periodic intermitting means variably driven from said driving shaft, a clutch actuated thereby for intermitting the operation of said rolls and weaving devices, a pattern cam also variably driven but constant in relation to said timing means, cord running means set in operation by said cam, and mechanism for disconnecting the weaving devices during the operation of the cam, substantially as described.

319. In an automatic wire coiling and weaving machine, an intermitting shaft, in combination with a constantly driven shaft, a cone and cup clutch for connecting said shafts one member of said clutch containing a plurality of recesses having bottoms inclined in two directions and rollers freely movable in said recesses to connect the parts of the clutch when moved together, and means for opening and closing the clutch, substantially as described.

320. In an automatic coiled wire fabric weaving machine, coiling and weaving devices, in combination with timing mechanism therefor comprising a continuously driven variable speed worm, a worm wheel rotated thereby, a timing cam connected with said worm and having a plurality of cam projections, a constantly driven shaft, a timing or intermitting shaft, a clutch lever, and a latch therefor periodically actuated by the projections on said timing cam, substantially as described.

321. In an automatic coiled wire fabric weaving machine, the combination of coiling and weaving mechanism with a variable speed and continuously revolving pattern cam selectively controlling said coiling devices, substantially as described.

In testimony whereof, I have hereunto set my hand, this 15th day of December, 1908, in the presence of two subscribing witnesses.

MARSHALL B. LLOYD.

Witnesses:
C. O. PORTERFIELD,
MAUDE CONNERTON.